(12) United States Patent
Storr

(10) Patent No.: US 9,919,426 B2
(45) Date of Patent: Mar. 20, 2018

(54) SYSTEM, METHOD, COMPUTER PROGRAM AND DATA SIGNAL FOR THE REGISTRATION, MONITORING AND CONTROL OF MACHINES AND DEVICES

(71) Applicant: C2 SYSTEMS LIMITED, Wanchai, Hong Kong Adm. Region (CN)

(72) Inventor: James Robert Storr, Melbourne (AU)

(73) Assignee: C2 Systems Limited, Wanchai (HK)

( * ) Notice: Subject to any disclaimer, the term of this patent is extended or adjusted under 35 U.S.C. 154(b) by 0 days.

(21) Appl. No.: 14/441,558

(22) PCT Filed: Nov. 12, 2013

(86) PCT No.: PCT/AU2013/001303
§ 371 (c)(1),
(2) Date: May 8, 2015

(87) PCT Pub. No.: WO2014/071465
PCT Pub. Date: May 15, 2014

(65) Prior Publication Data
US 2015/0336270 A1   Nov. 26, 2015

(30) Foreign Application Priority Data

Nov. 12, 2012 (AU) ................................ 2012904989
Apr. 12, 2013 (AU) ................................ 2013204965

(51) Int. Cl.
*B25J 9/00* (2006.01)
*B25J 9/16* (2006.01)
(52) U.S. Cl.
CPC ..... *B25J 9/1674* (2013.01); *G05B 2219/36542* (2013.01); *G05B 2219/40214* (2013.01); *Y10S 901/01* (2013.01); *Y10S 901/49* (2013.01)

(58) Field of Classification Search
CPC combination set(s) only.
See application file for complete search history.

(56) References Cited

U.S. PATENT DOCUMENTS 5,075,853 A * 12/1991 Luke, Jr. .......... G05B 19/41865
                                                      701/117
5,483,440 A     1/1996 Aono et al.
5,920,678 A *  7/1999 Watanabe .............. B25J 9/1664
                                                      700/255

(Continued)

FOREIGN PATENT DOCUMENTS

AU     2008203834 A1    8/2008
AU     2009201713 88    5/2009

(Continued)

OTHER PUBLICATIONS

International Search Report for PCT/AU213/001303, ISA/AU, Woden ACT, dated Dec. 20, 2013.

*Primary Examiner* — Jonathan L Sample
(74) *Attorney, Agent, or Firm* — Harness, Dickey & Pierce, PLC

(57) ABSTRACT

The present invention provides a method for controlling a robotic device, comprising the steps of, receiving at a computing device at least one command arranged to effect an operation on the robotic device, reviewing the command to determine whether the command is suitable for execution, wherein the command is provided to the device only if the command is suitable for execution.

28 Claims, 37 Drawing Sheets

(56) References Cited

U.S. PATENT DOCUMENTS

| | | | |
|---|---|---|---|
| 5,959,423 A | 9/1999 | Nakanishi et al. | |
| 6,061,561 A | 5/2000 | Alanara et al. | |
| 6,122,572 A | 9/2000 | Yavnai | |
| 6,175,206 B1* | 1/2001 | Ueno | B25J 9/1658 318/568.1 |
| 6,493,609 B2 | 12/2002 | Johnson | |
| 6,650,224 B1 | 11/2003 | Weigl et al. | |
| 6,739,556 B1 | 5/2004 | Langston | |
| 6,816,753 B2* | 11/2004 | Sakamoto | G06N 3/008 171/107 |
| 6,856,894 B1 | 2/2005 | Bodin et al. | |
| 6,860,206 B1* | 3/2005 | Rudakevych | F42C 15/42 102/206 |
| 6,868,181 B1* | 3/2005 | Feiten | G05D 1/0274 382/153 |
| 7,042,185 B2* | 5/2006 | Yang | B25J 9/1648 318/567 |
| 7,072,740 B2 | 7/2006 | Iribe et al. | |
| 7,104,495 B2 | 9/2006 | McGeer | |
| 7,121,507 B2 | 10/2006 | Dennis et al. | |
| 7,228,232 B2 | 6/2007 | Bodin et al. | |
| 7,299,007 B2 | 11/2007 | Eskin | |
| 7,343,232 B2 | 3/2008 | Duggan et al. | |
| 7,373,377 B2 | 5/2008 | Altieri | |
| 7,376,511 B2 | 5/2008 | Szabo et al. | |
| 7,408,439 B2* | 8/2008 | Wang | A61B 5/7475 340/3.7 |
| 7,412,325 B1 | 8/2008 | Tannenbaum et al. | |
| 7,510,141 B2 | 3/2009 | Nonami et al. | |
| 7,539,561 B2 | 5/2009 | Nonami et al. | |
| 7,603,207 B2 | 10/2009 | Abraham et al. | |
| 7,610,122 B2 | 10/2009 | Anderson | |
| 7,693,624 B2 | 4/2010 | Duggan et al. | |
| 7,720,572 B2 | 5/2010 | Ziegler et al. | |
| 7,737,878 B2 | 6/2010 | van Tooren et al. | |
| 7,835,824 B2 | 11/2010 | Matos | |
| 7,903,099 B2 | 3/2011 | Baluja | |
| 7,924,927 B1 | 4/2011 | Boesjes | |
| 7,940,259 B2 | 5/2011 | Wright et al. | |
| 7,957,837 B2 | 6/2011 | Ziegler et al. | |
| 7,991,517 B2 | 8/2011 | Matos | |
| 8,014,573 B2 | 9/2011 | Boomer et al. | |
| 8,050,688 B2 | 11/2011 | Jacob | |
| 8,060,295 B2 | 11/2011 | Estkowski et al. | |
| 8,068,949 B2 | 11/2011 | Duggan et al. | |
| 8,068,950 B2 | 11/2011 | Duggan et al. | |
| 8,082,074 B2 | 12/2011 | Duggan et al. | |
| 8,082,102 B2 | 12/2011 | Ravenscroft | |
| 8,103,398 B2 | 1/2012 | Duggan et al. | |
| 8,121,729 B2 | 2/2012 | Blanc et al. | |
| 8,169,328 B2 | 5/2012 | Duvall et al. | |
| 8,175,913 B2 | 5/2012 | Checketts et al. | |
| 8,184,423 B2 | 5/2012 | Rothkopf | |
| 8,186,589 B2 | 5/2012 | Ben Asher et al. | |
| 8,225,220 B2 | 7/2012 | Barbaro Altieri | |
| 8,228,325 B2 | 7/2012 | Barbaro Altieri | |
| 8,229,467 B2 | 7/2012 | Root et al. | |
| 8,281,127 B2 | 10/2012 | Hayes | |
| 8,286,236 B2 | 10/2012 | Jung et al. | |
| 8,612,051 B2* | 12/2013 | Norman | G08C 17/02 700/245 |
| 8,718,822 B1* | 5/2014 | Hickman | B25J 9/1674 700/214 |
| 9,160,783 B2* | 10/2015 | Pinter | H04L 63/029 |
| 9,198,728 B2* | 12/2015 | Wang | G06F 19/3437 |
| 9,251,317 B2* | 2/2016 | Ross | G06F 19/327 |
| 9,261,578 B2* | 2/2016 | Im | G01S 5/0252 |
| 9,317,110 B2* | 4/2016 | Lutnick | G06F 3/011 |
| 2002/0019783 A1 | 2/2002 | Chol | |
| 2002/0103575 A1* | 8/2002 | Sugawara | B25J 9/163 700/245 |
| 2002/0120361 A1* | 8/2002 | Kuroki | G05B 19/00 700/245 |
| 2002/0137427 A1* | 9/2002 | Peters | A63H 30/04 446/454 |
| 2002/0140814 A1 | 10/2002 | Cohen-Solal et al. | |
| 2002/0161489 A1 | 10/2002 | Johnson | |
| 2003/0046304 A1 | 3/2003 | Peskin et al. | |
| 2003/0097202 A1* | 5/2003 | Fujita | G05B 19/0426 700/245 |
| 2003/0114959 A1* | 6/2003 | Sakamoto | G06N 3/008 700/245 |
| 2003/0125963 A1 | 7/2003 | Haken | |
| 2003/0137435 A1 | 7/2003 | Haddad et al. | |
| 2003/0216833 A1* | 11/2003 | Mukai | B25J 9/1602 700/245 |
| 2004/0034571 A1 | 2/2004 | Wood et al. | |
| 2004/0083274 A1* | 4/2004 | Katiyar | G06F 17/30867 709/217 |
| 2004/0098167 A1 | 5/2004 | Yi et al. | |
| 2004/0181327 A1 | 9/2004 | Tsosie | |
| 2004/0182614 A1* | 9/2004 | Wakui | B25J 5/007 180/7.1 |
| 2004/0210345 A1* | 10/2004 | Noda | G05D 1/0088 700/245 |
| 2004/0224676 A1* | 11/2004 | Iseki | A63H 30/04 455/420 |
| 2004/0232243 A1 | 11/2004 | Silverbrook et al. | |
| 2004/0245378 A1 | 12/2004 | Nonami et al. | |
| 2005/0004723 A1 | 1/2005 | Duggan et al. | |
| 2005/0027406 A1 | 2/2005 | Nonami et al. | |
| 2005/0080799 A1* | 4/2005 | Harnden | H04L 63/0823 |
| 2005/0162119 A1* | 7/2005 | Landry | A47L 9/2805 318/580 |
| 2005/0210267 A1 | 9/2005 | Sugano et al. | |
| 2005/0218852 A1* | 10/2005 | Landry | A47L 9/2805 318/580 |
| 2005/0234592 A1* | 10/2005 | McGee | G05D 1/027 700/245 |
| 2005/0274845 A1 | 12/2005 | Miller et al. | |
| 2005/0281439 A1 | 12/2005 | Lange | |
| 2006/0009879 A1* | 1/2006 | Lynch | G05B 19/409 700/245 |
| 2006/0032978 A1 | 2/2006 | Matos et al. | |
| 2006/0049790 A1* | 3/2006 | Yang | B25J 9/1648 318/568.12 |
| 2006/0060694 A1 | 3/2006 | Nonami et al. | |
| 2006/0070558 A1 | 4/2006 | Chiu | |
| 2006/0071116 A1* | 4/2006 | Quenneville | B65H 75/425 242/557 |
| 2006/0129638 A1 | 6/2006 | Deakin | |
| 2006/0146048 A1 | 7/2006 | Wright et al. | |
| 2006/0287913 A1 | 12/2006 | Baluja | |
| 2007/0015518 A1 | 1/2007 | Winter et al. | |
| 2007/0016328 A1* | 1/2007 | Ziegler | A47L 5/14 700/245 |
| 2007/0025809 A1 | 2/2007 | Lee et al. | |
| 2007/0029449 A1 | 2/2007 | Matos | |
| 2007/0042716 A1* | 2/2007 | Goodall | G05D 1/0274 455/67.11 |
| 2007/0042803 A1 | 2/2007 | Anderson | |
| 2007/0061040 A1* | 3/2007 | Augenbraun | A47L 5/225 700/245 |
| 2007/0061043 A1* | 3/2007 | Ermakov | A47L 5/225 700/263 |
| 2007/0073439 A1* | 3/2007 | Habibi | B25J 9/1697 700/213 |
| 2007/0074182 A1* | 3/2007 | Hinchey | G06F 8/10 717/136 |
| 2007/0093258 A1 | 4/2007 | Steenstra et al. | |
| 2007/0119326 A1* | 5/2007 | Rudakevych | F42C 15/42 102/206 |
| 2007/0133846 A1 | 6/2007 | Andersson | |
| 2007/0138345 A1 | 6/2007 | Shuster | |
| 2007/0145182 A1 | 6/2007 | Page | |
| 2007/0156286 A1* | 7/2007 | Yamauchi | G05D 1/0038 700/245 |
| 2007/0162196 A1 | 7/2007 | Nonami et al. | |
| 2007/0192910 A1* | 8/2007 | Vu | B25J 5/007 700/245 |

(56) References Cited

U.S. PATENT DOCUMENTS

| | | |
|---|---|---|
| 2007/0210953 A1 | 9/2007 | Abraham et al. |
| 2007/0244599 A1* | 10/2007 | Tsai ................. B25J 9/1602 |
| | | 700/245 |
| 2007/0250212 A1* | 10/2007 | Halloran ............. A47L 5/30 |
| | | 700/245 |
| 2007/0273557 A1 | 11/2007 | Baillot |
| 2007/0284474 A1 | 12/2007 | Olson et al. |
| 2007/0293989 A1 | 12/2007 | Norris |
| 2008/0027604 A1 | 1/2008 | Oesterling |
| 2008/0121097 A1* | 5/2008 | Rudakevych .......... F41A 19/58 |
| | | 89/28.05 |
| 2008/0133052 A1* | 6/2008 | Jones .................. B25J 5/007 |
| | | 700/245 |
| 2008/0194311 A1 | 8/2008 | Cage et al. |
| 2008/0227435 A1 | 9/2008 | Six et al. |
| 2008/0247549 A1 | 10/2008 | Blanc et al. |
| 2008/0255711 A1 | 10/2008 | Matas |
| 2008/0263628 A1* | 10/2008 | Norman ................ G08C 17/02 |
| | | 726/1 |
| 2008/0269949 A1 | 10/2008 | Norman et al. |
| 2008/0291849 A1 | 11/2008 | Ostermeier et al. |
| 2009/0027253 A1 | 1/2009 | van Tooren et al. |
| 2009/0033112 A1 | 2/2009 | Westerlind et al. |
| 2009/0045290 A1 | 2/2009 | Small et al. |
| 2009/0084761 A1* | 4/2009 | Bortolus ............ G05B 19/0423 |
| | | 218/118 |
| 2009/0107386 A1 | 4/2009 | Sampson et al. |
| 2009/0112387 A1 | 4/2009 | Kabalkin et al. |
| 2009/0112388 A1 | 4/2009 | Yeager et al. |
| 2009/0125163 A1 | 5/2009 | Uggan et al. |
| 2009/0125169 A1 | 5/2009 | Edwards et al. |
| 2009/0125221 A1 | 5/2009 | Estkowski et al. |
| 2009/0151617 A1 | 6/2009 | Lambertus |
| 2009/0165126 A1 | 6/2009 | Jung et al. |
| 2009/0167787 A1 | 7/2009 | Bathiche et al. |
| 2009/0175599 A1 | 7/2009 | Grim et al. |
| 2009/0189015 A1 | 7/2009 | Alavi |
| 2009/0210109 A1 | 8/2009 | Ravenscroft |
| 2009/0216831 A1 | 8/2009 | Buckner |
| 2009/0224097 A1 | 9/2009 | Kariv |
| 2009/0235870 A1 | 9/2009 | Troy |
| 2009/0251354 A1 | 10/2009 | Zahavi |
| 2009/0271131 A1 | 10/2009 | Ashton |
| 2009/0289778 A1 | 11/2009 | King |
| 2009/0298539 A1 | 12/2009 | Anderson |
| 2009/0299582 A1 | 12/2009 | Anderson |
| 2009/0306840 A1 | 12/2009 | Blenkhorn et al. |
| 2009/0327885 A1 | 12/2009 | Aoki et al. |
| 2010/0006034 A1 | 1/2010 | Van Den Berg |
| 2010/0042269 A1 | 2/2010 | Kokkeby et al. |
| 2010/0070124 A1 | 3/2010 | Yeager et al. |
| 2010/0070450 A1 | 3/2010 | Barker |
| 2010/0084513 A1 | 4/2010 | Gariepy et al. |
| 2010/0085153 A1 | 4/2010 | Smith |
| 2010/0100269 A1 | 4/2010 | Ekhaguere et al. |
| 2010/0118147 A1 | 5/2010 | Dorneich et al. |
| 2010/0131121 A1 | 5/2010 | Garlock |
| 2010/0133849 A1 | 6/2010 | Allaei |
| 2010/0163621 A1 | 7/2010 | Ben-Asher et al. |
| 2010/0178903 A1 | 7/2010 | Tofighbakhsh et al. |
| 2010/0194762 A1 | 8/2010 | Latta et al. |
| 2010/0197390 A1 | 8/2010 | Craig et al. |
| 2010/0198514 A1 | 8/2010 | Miralles |
| 2010/0199230 A1 | 8/2010 | Latta et al. |
| 2010/0208032 A1 | 8/2010 | Kweon |
| 2010/0228985 A1 | 9/2010 | Kim et al. |
| 2010/0235017 A1 | 9/2010 | Peltonen et al. |
| 2010/0249545 A1 | 9/2010 | Copeland et al. |
| 2010/0250022 A1 | 9/2010 | Hines et al. |
| 2010/0277278 A1 | 11/2010 | Courouble et al. |
| 2010/0277723 A1 | 11/2010 | Rezac et al. |
| 2010/0286859 A1 | 11/2010 | Feigh et al. |
| 2010/0292873 A1 | 11/2010 | Duggan et al. |
| 2010/0292874 A1 | 11/2010 | Duggan et al. |
| 2010/0301057 A1 | 12/2010 | Tattam et al. |
| 2010/0302395 A1 | 12/2010 | Mathe et al. |
| 2010/0303289 A1 | 12/2010 | Polzin et al. |
| 2010/0306713 A1 | 12/2010 | Geisner et al. |
| 2011/0025689 A1 | 2/2011 | Perez et al. |
| 2011/0035149 A1 | 2/2011 | McAndrew et al. |
| 2011/0035337 A1 | 2/2011 | Choi et al. |
| 2011/0055046 A1 | 3/2011 | Bowen et al. |
| 2011/0061963 A1 | 3/2011 | Farwell et al. |
| 2011/0062281 A1 | 3/2011 | Woolley et al. |
| 2011/0071704 A1 | 3/2011 | Matos |
| 2011/0073707 A1 | 3/2011 | Bossert et al. |
| 2011/0080336 A1 | 4/2011 | Leyvand et al. |
| 2011/0083600 A1 | 4/2011 | Whitten et al. |
| 2011/0085705 A1 | 4/2011 | Izadi et al. |
| 2011/0130913 A1 | 6/2011 | Duggan et al. |
| 2011/0143811 A1 | 6/2011 | Rodriguez |
| 2011/0145059 A1 | 6/2011 | Baluja |
| 2011/0181689 A1 | 7/2011 | Kweon |
| 2011/0184590 A1 | 7/2011 | Duggan et al. |
| 2011/0186657 A1 | 8/2011 | Haviland |
| 2011/0192338 A1 | 8/2011 | Goudeau et al. |
| 2011/0216088 A1 | 9/2011 | Leung |
| 2011/0290937 A1 | 12/2011 | Salkeld |
| 2011/0296505 A1 | 12/2011 | Perez et al. |
| 2011/0314515 A1* | 12/2011 | Hernoud ............... H04W 12/06 |
| | | 726/2 |
| 2011/0315817 A1 | 12/2011 | Miralles et al. |
| 2012/0001474 A1 | 1/2012 | Stokes |
| 2012/0023166 A1 | 1/2012 | Kim et al. |
| 2012/0028624 A1* | 2/2012 | Jedlicka ................ H04M 3/38 |
| | | 455/418 |
| 2012/0038669 A1 | 2/2012 | Lee et al. |
| 2012/0041971 A1 | 2/2012 | Kim et al. |
| 2012/0044043 A1 | 2/2012 | Nettleton et al. |
| 2012/0046818 A1 | 2/2012 | Nettleton et al. |
| 2012/0048171 A1 | 3/2012 | Kalwa |
| 2012/0053703 A1 | 3/2012 | Nettleton et al. |
| 2012/0055390 A1 | 3/2012 | Kalwa et al. |
| 2012/0062123 A1 | 3/2012 | Jarrell et al. |
| 2012/0069131 A1 | 3/2012 | Abelow |
| 2012/0072046 A1 | 3/2012 | Tattam |
| 2012/0073889 A1 | 3/2012 | Franzen et al. |
| 2012/0075433 A1 | 3/2012 | Tatzgern et al. |
| 2012/0076397 A1 | 3/2012 | Moresve |
| 2012/0078882 A1 | 3/2012 | Boldyrev et al. |
| 2012/0092208 A1 | 4/2012 | LeMire et al. |
| 2012/0120361 A1 | 5/2012 | Yanagawa et al. |
| 2012/0123628 A1 | 5/2012 | Duggan et al. |
| 2012/0143482 A1 | 6/2012 | Goossen et al. |
| 2012/0158280 A1 | 6/2012 | Ravenscroft |
| 2012/0173018 A1 | 7/2012 | Allen et al. |
| 2012/0185090 A1* | 7/2012 | Sanchez ............... B25J 11/0005 |
| | | 700/253 |
| 2012/0185356 A1 | 7/2012 | Barron et al. |
| 2012/0188064 A1* | 7/2012 | Mahaffey ............ H04L 63/1441 |
| | | 340/384.1 |
| 2012/0213212 A1 | 8/2012 | Moore et al. |
| 2012/0223182 A1 | 9/2012 | Gilchrist et al. |
| 2012/0253581 A1 | 10/2012 | Anderson |
| 2012/0267473 A1 | 10/2012 | Tao et al. |
| 2012/0299761 A1* | 11/2012 | Tung .................... H04L 67/125 |
| | | 341/176 |
| 2013/0035790 A1* | 2/2013 | Olivier ................ G05D 1/0246 |
| | | 700/246 |
| 2013/0290234 A1* | 10/2013 | Harris .................. G06N 5/022 |
| | | 706/46 |
| 2014/0012417 A1* | 1/2014 | Zelivinski ............ H04N 21/214 |
| | | 700/257 |
| 2014/0032034 A1 | 1/2014 | Raptopoulos et al. |
| 2016/0066189 A1* | 3/2016 | Mahaffey ............ G06F 21/316 |
| | | 455/405 |
| 2016/0234342 A1* | 8/2016 | Oonk ................... H04L 67/12 |

FOREIGN PATENT DOCUMENTS

| | | |
|---|---|---|
| AU | 2009217390 62 | 10/2009 |
| AU | 2011100304 A4 | 3/2011 |

(56) References Cited

FOREIGN PATENT DOCUMENTS

| | | |
|---|---|---|
| AU | 2011235925 C1 | 10/2011 |
| AU | 2012100373 A4 | 4/2012 |
| AU | 2011277414 B2 | 10/2012 |
| AU | 2011332763 B2 | 10/2012 |
| AU | 2011337752 B2 | 10/2012 |
| WO | WO1997038548 A1 | 10/1997 |
| WO | WO2008097264 A1 | 8/2008 |
| WO | WO2011075707 A1 | 6/2011 |
| WO | WO2011104716 A1 | 9/2011 |
| WO | WO2011142859 A1 | 11/2011 |

\* cited by examiner

Scenario 1 and 2

| Broad | Scenario 1 | Scenario 2 |
|---|---|---|
| (1) Generate | D01 Condition or constraint generated (including any metadata) | E01 Condition or constraint generated (including any metadata) |
|  | D02 Condition or constraint communicated to remote server | E02 Condition or constraint communicated to robot's regulating chip |
| (2) Assess (optional) | D03 Remote server receives and assesses condition or constraint, then generates an assessment determination | E03 Regulating chip receives and facilitates condition or constraint assessment |
|  | D04 Remote server approves condition or constraint | E04 Regulating chip approves condition or constraint |
|  | D05 Remote sever communicates condition or constraint to robot's 'regulating chip' |  |
| (3) Respond | D06 Regulating chip facilitates condition or constraint being imposed | E05 Regulating chip facilitates condition or constraint being imposed |
| (4) Amend (optional) | D07 Condition or constraint amended or revoked | E06 Condition or constraint amended or revoked |

Figure 7b

| Broad | Policing | Conditions | Intentions |
|---|---|---|---|
| (1) Generate | (1) Generate policing initiative | (1) Generate condition/constraint | (1) Generate Intention |
| (2) Assess (optional) | (2) Assess sample of situation | (2) Assess generated condition/constraint | (2) Assess generated Intention |
| (3) Respond | (3) Respond with enforcement &/or notify | (3) Respond by imposing condition/constraint | (3) Respond by effecting or executing Intention |
| (4) Amend (optional) | (4) Amend or revoke enforcement | (4) Amend or revoke condition constraint | (4) Amend or revoke Intention |

Figure 11a

| (1) Designed, developed, manufactured | E.g. 'Approved Design Organisations' or 'Production Approval' |
|---|---|
| (2) Certified (enrolled) | 2.1 Robot's parties and particulars determined (Fig. 11c) |
| | 2.2 Robot's specifications determined (Fig. 11d) |
| | 2.3 Robot's protocols (& compatibility with) determined: Type 1-3 (Fig. 11e-h) |
| | 2.4 Robot's operations (Intentions) determined (Fig. 11i) |
| | 2.5 Robot's diagnostic/health tests determined (Fig. 11j) |
| | 2.6 Robot's baseline, tolerance, threshold & template values determined |
| (3) Registered (installed) | 3.1 Prospective registrant assessed for registration (Fig. 11k) |
| | 3.2 Specified robot customised or appropriated to registrant (Fig. 11k) |
| | 3.3 Parties and particulars are registered |
| | 3.4 Initial protocols installed |
| | 3.5 Robot activated for use (service) |
| (4) Used (in-service) | Use standard robot |
| | Change of registered parties &/or particulars |
| | Updates created, communicated, received, installed & imposed |
| | Modifications (design changes) |
| | Use modified robot |
| (5) Decommissioned | E.g. deregistered, uninstalled, unenrolled. |

Figure 11b

SYSTEM, METHOD, COMPUTER PROGRAM AND DATA SIGNAL FOR THE REGISTRATION, MONITORING AND CONTROL OF MACHINES AND DEVICES

TECHNICAL FIELD

The present invention relates to a system, method, computer program and data signal for the registration, monitoring and control of machines and devices. Embodiments of the invention find specific, but not exclusive, use in the registration, monitoring and control of robotic devices, autonomous vehicles, "smart" devices, and other programmable and computer controlled devices.

BACKGROUND ART

The following discussion of the background art is intended to facilitate an understanding of the present invention only. The discussion is not an acknowledgement or admission that any of the material referred to is or was part of the common general knowledge as at the priority date of the application.

Science fiction predicted the eventual development of robotic devices and "smart" devices which are arranged to autonomously perform one or more functions. In the past, due to limitations in computing power and the ability to create reliable, cost-effective electronics, robotic devices have largely been used in very specialized applications (such as in manufacturing applications) or as "show-pieces" (e.g. the development of ASIMO, a humanoid robot developed by Honda Corporation).

However, the explosion in and frenzied development of telecommunications and computing technology (such as the development of cell phone technology, the Internet, wireless Internet, the release of Global Positioning System technology for consumer use and miniaturised computing technology) now provides a platform for the development and creation of consumer robots.

For example, robot vacuum cleaners, small remote controlled robotic devices (e.g. helicopters and multicopters) and the more recent development of autonomous 'self-driving' vehicles are examples of practical and increasingly accessible robots and smart devices available to average consumers.

It is against this background that embodiments of the present invention have been developed.

SUMMARY OF INVENTION

In a first aspect, the present invention provides system for controlling at least one robotic device, comprising a computing device capable of communication with at least one robotic device and arranged to receive at least one command from a command module, the command being arranged to contain at least one instruction which is arranged to effect an operation on the robotic device and identification information to identify the at least one robotic device, wherein the computing device includes a processor and a database, the processor being arranged to receive the command and review the command against information in the database to determine whether the command is suitable for execution by the at least one robotic device, wherein the command is provided to the robotic device if the command is suitable for execution.

In one embodiment, the processor determines whether the command is associated with at least one authorisation code.

In one embodiment, the at least one authorisation code is received independently of the at least one command.

In one embodiment, the processor determines whether the command is one of a predetermined set of commands by accessing a set of predetermined commands stored in the database.

In one embodiment, wherein at least one of the at least one command, the authorisation code and the identification code is encrypted.

In one embodiment, the processor decrypts the at least one of the at least one command, the authorisation code and the identification code prior to reviewing the command to determine whether the command is suitable for execution.

In one embodiment, at least one of the at least one command, the authorisation code and the identification code includes a checksum, wherein the checksum is utilised to determine the correctness of the at least one command, the authorisation code and the identification code.

In one embodiment, the robotic device is a programmable device.

In one embodiment, the robotic device includes at least one processor arranged to receive and execute the at least one command.

In one embodiment, the robotic device is capable of performing at least one physical function.

In a second aspect, the present invention provides a system for controlling a robotic device, comprising a computing device capable of receiving at least one instruction, a processor capable of generating a command based on the at least one instruction, wherein the command is communicated via the computing device to initiate a response based on the at least one generated command.

In one embodiment, the processor requests further information to further assess the instruction, prior to initiating a response.

In a third aspect, the present invention provides a method for controlling a robotic device, comprising the steps of, receiving at a computing device at least one command arranged to effect an operation on the robotic device, reviewing the command to determine whether the command is suitable for execution, wherein the command is provided to the device only if the command is suitable for execution.

In one embodiment, the step of reviewing the command includes the step of determining whether the command is associated with at least one authorisation code.

In one embodiment, the at least one authorisation code is received independently of the at least one command.

In one embodiment, the step of reviewing the command includes the further step of determining whether the command is one of a predetermined set of commands.

In one embodiment, the invention provides the further step of the computing device receiving at least one identification code arranged to identify the robotic device.

In one embodiment, the invention provides the further step of receiving the identification code with the at least one command.

In one embodiment, at least one of the at least one command, the authorisation code and the identification code is encrypted.

In one embodiment, the invention provides the further step of decrypting the at least one of the at least one command, the authorisation code and the identification code prior to reviewing the command to determine whether the command is suitable for execution.

In one embodiment, at least one of the at least one command, the authorisation code and the identification code includes a checksum, wherein the checksum is utilised to determine the correctness of the at least one command, the authorisation code and the identification code.

In a fourth aspect, the present invention provides a system for controlling a robotic device, comprising a computing device in communication with the robotic device and arranged to receive at least one command which is arranged to effect an operation on the robotic device, wherein the computing device reviews the command to determine whether the command is suitable for execution, and the command is provided to the device only if the command is suitable for execution.

In a fifth aspect, the present invention provides a computer program including at least one command, which, when executed on a computing system, is arranged to perform the method steps in accordance with the third aspect of the invention.

In one embodiment, the invention provides a computer readable medium incorporating a computer program in accordance with the fifth aspect of the invention.

In a sixth aspect, the present invention provides a data signal encoding at least one command and being arranged to be receivable by at least one computing device, wherein, when the encoded command is executed on the computing system, the computing system performs the method steps in accordance with the third aspect of the invention.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which:

FIGS. 7a to 7c are diagrams illustrating a computer implemented process in accordance with an embodiment of the invention;

FIGS. 11a to 11k are diagrams illustrating a computer implemented process in accordance with an embodiment of the present invention;

DESCRIPTION OF EMBODIMENTS

General Overview

The present invention relates generally to a system, method, computer program and data signal for the registration, monitoring and control of machines and devices. In particular, embodiments of the invention relate to the registration, monitoring and control of robotic devices, autonomous vehicles, "smart" devices, and other programmable and computer controlled devices.

In more detail, one aspect of the embodiments described herein provides a method for controlling a robotic device. The method comprises the steps of, receiving at a computing device at least one command arranged to effect an operation on the robotic device. When the command is received, it is reviewed to determine whether the command is suitable for execution and is directed to the correct robotic device. The command is only provided to the device if the command is suitable for execution and directed to the correct robotic device.

In other words, one broad aspect of the embodiments described herein provides a system for controlling and monitoring the commands issued to autonomous or "smart" devices. Such a system is particularly useful for situations where the autonomous or smart devices are to be operated in a public space, where inappropriate operation of such devices may pose safety, security and financial risks to other members of the public.

Figure 1:
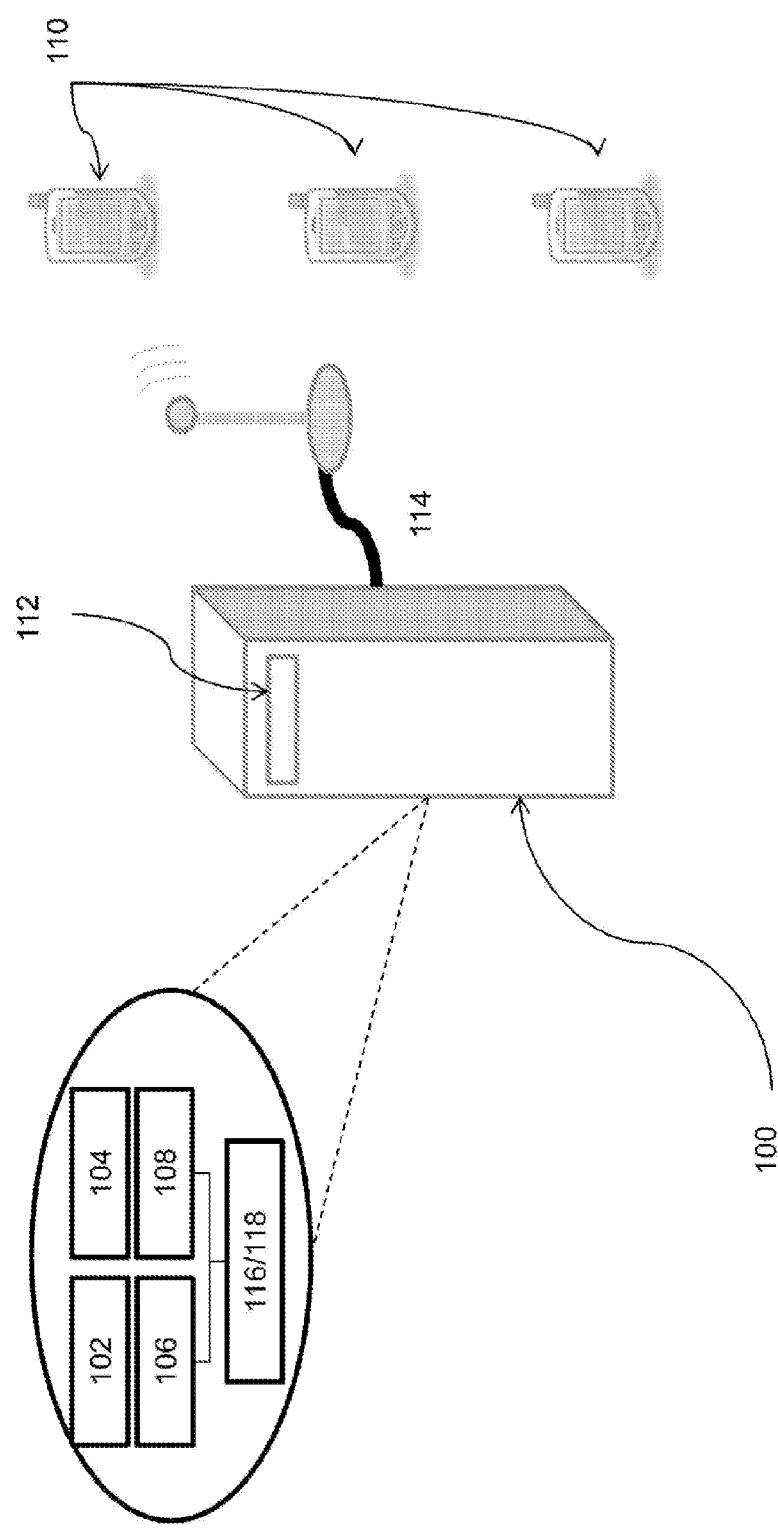
FIG. 1 is an example computing system which is capable of operating a device, system, method and/or computer program in accordance with an embodiment of the present invention.

One embodiment of the method is codified in a computing system, such as the computing system shown at FIG. 1.

In FIG. 1 there is shown a schematic diagram of a computing system, which in this embodiment is a server 100 suitable for use with an embodiment of the present invention. The server 100 may be used to execute application and/or system services such as a system and method for facilitating the controlling, monitoring and issuing of commands in accordance with an embodiment of the present invention.

With reference to FIG. 1, the server 100 may comprise suitable components necessary to receive, store and execute appropriate computer instructions. The components may include a processor 102, read only memory (ROM) 104, random access memory (RAM) 106, an input/output devices such as disc drives 108, remote or connected input devices 110 (such as a mobile computing device, a smartphone or a 'desktop' personal computer), and one or more communications link(s) 114.

The server 100 includes instructions that may be installed in ROM 104, RAM 106 or disc drives 112 and may be executed by the processor 102. There may be provided a plurality of communication links 114 which may variously connect to one or more computing devices 110 such as servers, personal computers, terminals, wireless or handheld computing devices, or mobile communication devices such as a mobile (cell) telephone. At least one of a plurality of communications links 114 may be connected to an external computing network through a telecommunications network.

In one particular embodiment the device may include a database 116 which may reside on the storage device 112. It will be understood that the database may reside on any suitable storage device, which may encompass solid state drives, hard disc drives, optical drives or magnetic tape drives. The database 116 may reside on a single physical storage device or may be spread across multiple storage devices.

The server 100 includes a suitable operating system 118 which may also reside on a storage device or in the ROM of the server 100. The operating system is arranged to interact with the database and with one or more computer programs to cause the server to carry out the steps, functions and/or procedures in accordance with the embodiments of the invention described herein.

Broadly, the invention relates to a computing method and system arranged to interact with one or more remote devices via a communications network. The remote devices may take the form of computing devices as described above, but may also take the form of robotic devices, as will be described in more detail later.

The system, in one embodiment, utilises a server including a database arranged to contain biometric or other identifying information regarding one or more entities. The database is arranged to receive the information via the communications network from the one or more remote devices and to subsequently communicate information to one or more remote robotic devices.

Figure 2:
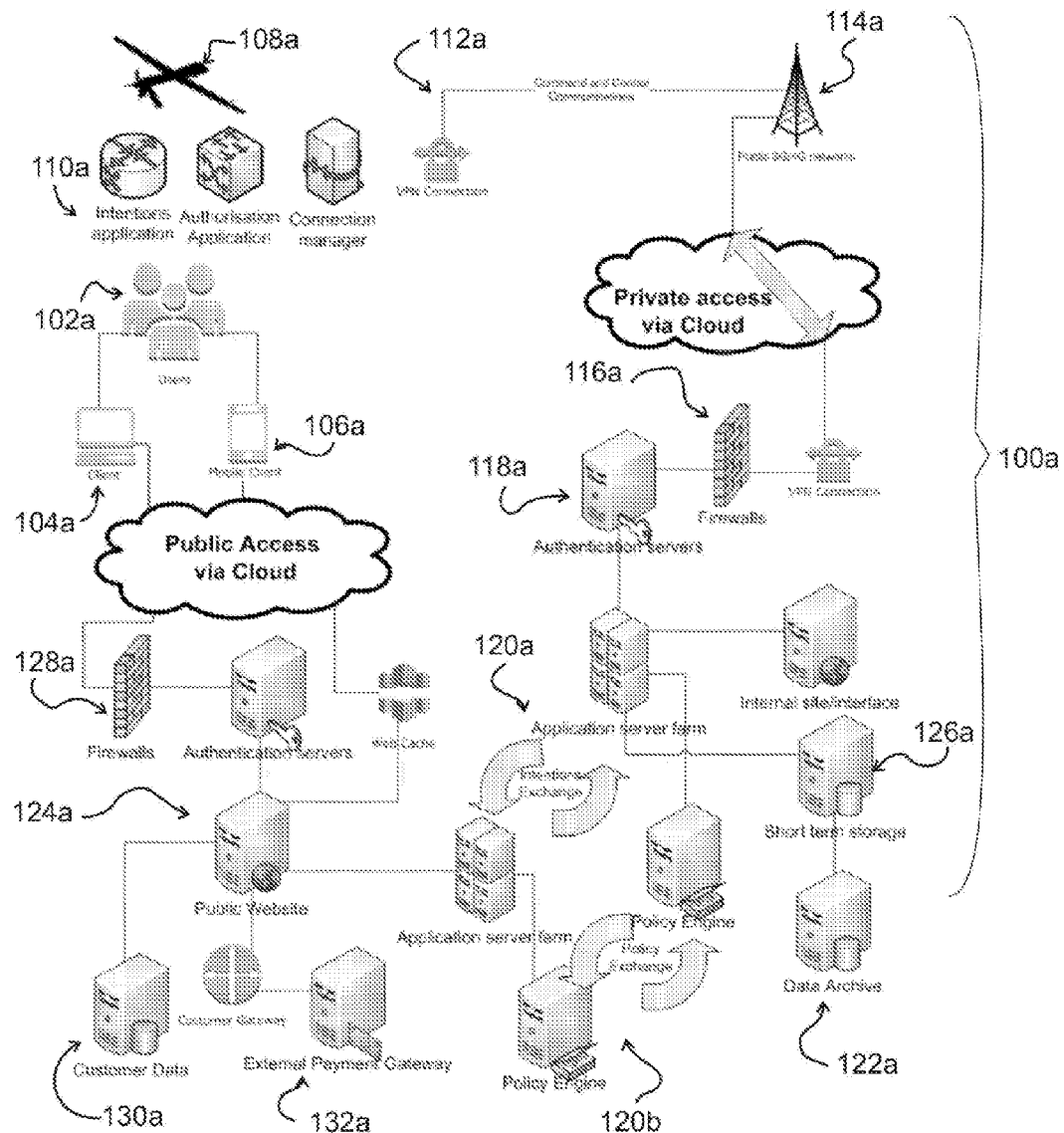
FIGS. 2 and 2a are example systems in accordance with an embodiment of the invention.
Figure 2A:
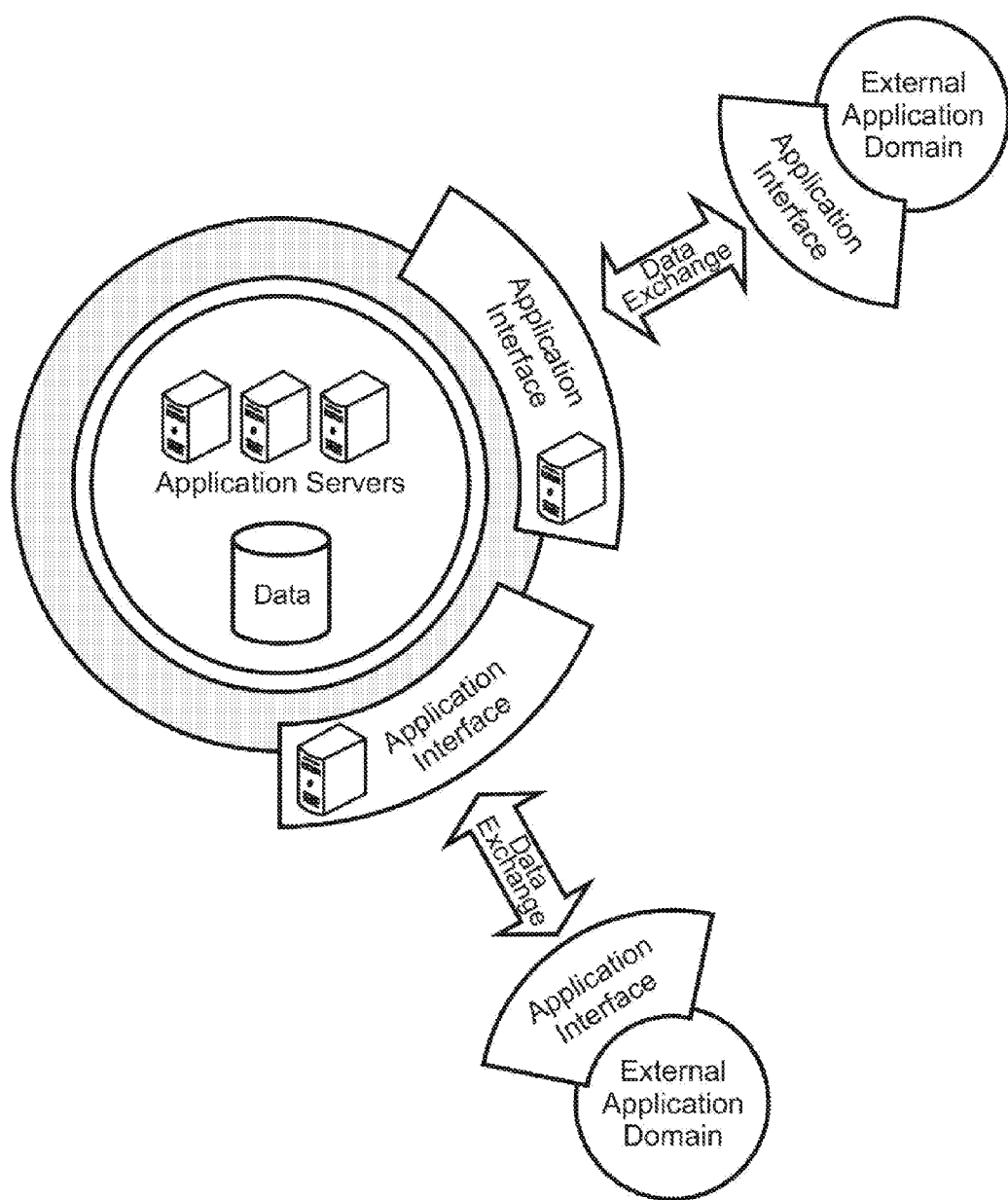

FIG. 2a illustrates a Service Orientation Architecture suitable for use with an embodiment of the invention.

Other aspects of the broad inventive concept relate to a corresponding method, computer program, computer readable media and data signal. The method facilitates the transfer of commands regarding the desired instructions to be sent to an autonomous or "smart" device (also referred to as a "robot" device) between one or more remote devices and a centralized database. The centralized database receives a request to provide the command to the one or more remote devices, and forwards the information via a communications network to the one or more remote robotic devices.

Initial Interaction with the System

For a user to interact with the system in one embodiment, it is necessary for the user to identify themselves and register with the system. This is achieved through a registration process that is analogous to many other consumer product registration processes, such as the registering of a vehicle.

Preferably, a user may be required to prove or verify their identity by undertaking an identification check.

In one embodiment, prospective users ('prospective registrants') are required to set up a "profile account" or obtain an "eLicence". For the purpose of the broader invention described herein, a "profile account" or "eLicence" is any type of digital and/or electronic identifying means utilised to verify the identity of a user. In a co-pending application filed by Digital (ID) entity Limited, a Hong Kong company, novel and inventive embodiments of eLicence and Profile Accounts are described in more detail and are incorporated herein by reference.

The user uses their eLicence or Profile Account (along with other identifying information, such as a password) to connect or log-in a device (such as device 110) to a registry server such as server cluster 100a (FIG. 2) or registry server 300 (FIG. 3) via a communications network. This connection and the entering of the code allow the prospective user to interact with the server cluster 100a.

Once the user is registered with the system, the user then registers their robotic device. As with a vehicle or boating license, the user, preferably, only has one license, but is able to register a plurality of robotic devices, as the user may have more than one robotic device.

Command and Control System

Each robotic device includes an internal secure computing device which is arranged to validate, authenticate and execute commands which are generated either from/by the robotic device itself or by external parties.

That is, each robotic device includes an internal "logic" where, before an action is taken (whether physical or otherwise), the robotic device firstly receives an "Intention". The Intention must then be Validated against some internal logic or rules (i.e. a policy). Once the Intention is Validated, the Intention can then be Communicated to the relevant section of the robotic device and consequently Approved.

The Command and Control (CC) structure is now described in more detail with reference to FIG. 2. In FIG. 2, any reference to a server, computing system, computer or other computing device refers to a server with capabilities analogous to the server 100 of FIG. 1.

Referring now to FIG. 2 there is shown a series of interconnected servers (a server cluster) generally denoted by 100a. A user 102a can interact with the server cluster 100a via their client device 104a or their mobile client device 106a.

When a robotic device 108a receives or generates a request (intention), the request originates from an "intention" application 110a. The intention application passes the intention request from the intentions application 110a to a validation controller (not shown). The validation controller ensures the robotic device and software have not been tampered with. The validation controller also ensures that all the physical components of the robotic device are in working order and approved for use within policy guidelines.

The request is then encrypted and transferred over a secure protocol (Virtual Private Network (VPN) connection 112a) to the server cluster 100a. All data packets are encrypted before transmission using key pair authentication or any other suitable encryption methodology, as may be required.

Once connected the robotic device establishes a secure Virtual Private Network (VPN) tunnel over a public communications mesh such as a mobile telecommunications network 114a, which may utilise a 3G (3rd Generation GSM standard) and/or 4G (4th Generation GSM standard) cellular network standard.

All communication to the server cluster 100a is via a secure firewall service 116a that limits VPN endpoints and ports that are available within the VPN. An appropriate standard, such as Secure Socket Layer (SSL) is utilised for the tunnel.

Once packets sent by the intention application (via the communications manager application) are encrypted and the VPN communication is secured and passes through the firewall, the robotic device authenticates to establish a connection with the CC system (i.e. the server cluster 100a). In the embodiment described herein, an authentication server 118a is utilised to authenticate the robotic device, through the exchange of certificates, although it will be understood that other authentication methods or systems may be utilised.

The CC system 100a further includes an application platform 120a that manages communication, requests, manifest distribution and ultimately the control of the robotic device. In the context of the embodiment described herein, no action can be executed by the robotic device without first passing through the application platform 120a.

The application platform 120a interfaces with a policy engine 120b as the capabilities and allowed actions of each registered robotic device are stored as policies within the system 100a. The policy engine 120b allows each robotic device to be controlled uniquely as required by law, device capabilities and end user requirements. Policies are transmitted to the robotic device via the server cluster 100a as a base set of guidelines that cannot be breached. The workings of the application platform and the policy engine are described in more detail below.

The CC system is also responsible for recording an audit trail of all actions taken and all data received from the end device. This includes data such as the make and model of the robotic device, the capabilities of the device, flight manifests (where the robotic device is capable of flight), previous approvals for flight or movement, GPS movement and position data, including associated times and dates, instrument metrics, etc. Such information is stored in the Data Archive 122a, so that it may be accessed if necessary for auditing purposes.

A website 124a is provided as an interface to administer the application logic and all associated data/metadata. This includes information such as updating device policies, capabilities manifests, and other services, including, special services such as "ghosting" and "shrouding" (which are described in more detail below).

A fast, high Input/Output (10) data retention service 126a caches incoming data feeds from the robotic device. Once cached the data is subsequently moved to the Data Archive 122a where it can be data mined as required for auditing purposes.

Returning to end users 102a, a web interface provides access from both a client device 104a and a mobile client device 106a. Through these interfaces the end user is able to securely instruct a robotic device to take actions, receive feedback on the status of the device and track results. All communication into the client device 104a and mobile client device 106a are secured via standard secure web protocols and firewall access 128a.

Once a connection is established the consumer may authenticate against the platform using password or biometric exchange to prove their identity, as previously described (i.e. using a "Profile Account" or "eLicence"). Depending on policies set by the end user and the platform the authentication can be more or less strict as required.

All end user (customer) data is secured and protected within a series of databases generally denoted by computing system 130a. In one embodiment, users may be required to pay for use of some services provided by the server cluster 100a. In such an embodiment, end users can carry out purchases or cash transactions via a standard, secure payment gateway 132a. This service is in the form of a shopping cart style interface with account management.

The end user interacts with the web application to execute robotic device commands and receive feedback. This application provides a series of interfaces and logic for robotic device administration.

At no time does the end user have direct access to a robotic device. While an end user would provide a series of policies about their robotic device and what they wish the device to do in certain instances these policies are not applied directly, but are vetted by the policy engine.

That is, all policies are exchanged and validated with the policy engine 120b to ensure that server cluster 100a has ultimate control of the device. As such, the server cluster 100a utilizes a "Command and Control" type structure to control the movement and action of robotic devices, to prevent unauthorised or illegal use.

Internal Robotic Device Validation

Each robotic device is capable of performing a predefined set of actions (physical or otherwise) and each action in the set of actions are associated with one or more instructions. Taken together, these allowable actions and associated instructions form the "policy" for the robotic device.

For example, a robotic drone (pilotless flying device) may be capable of flying in any direction, but may be limited to flying only in certain predefined air space, due to privacy, security or safety reasons.

One set of instructions necessary for the robotic device to be allowed to perform a command would be to undertake a diagnostic test each time the robotic device is activated.

The system would include a range of 'tests', beginning with regular (e.g. fixed date) tests. However, as problems can occur between regular checks (e.g. consumers may unintentionally or unknowingly damage their robots), it will be understood that diagnostic tests may also occur at random time intervals.

In addition to performing tests, test data can be gathered and in one embodiment, test data is communicated to the server cluster 100a as shown in FIG. 2.

An example of the types of data collected during tests is described below:

The system's approved diagnostic tests are undertaken (completed) by an object or component written for the express purpose of performing one or more of the following operations:

1. identifying the robot, not limited to, for example:
   1.1. make, model, type;
   1.2. history, e.g. relevant dates/times, test results;
   1.3. registered owner(s)/user(s);
   1.4. possession of valid user security and protection mechanisms, e.g. biometric user locks;
   1.5. whether the device is currently registered, and will remain registered during the course of its (pending) assignment and/or function;
   1.6. hardware, software and capabilities, not limited to: functional specifications, valid 'default failure', 'seizure', 'rendezvous' and 'privacy' (e.g. software) protocols;

1.7. that the device is approved to be used or operated as per the user's requested assignment or 'restricted' function, and that the assignment or function application (i.e. robot 'app') itself is approved, including passing any Digital Rights Management System;
2. identifying the user or controller of the robot—particularly, that the robot is associated with and receiving assignment or function instructions from a user that possesses a valid account and up-to-date profiles and may further confirm if, and require that, the user or controller is also listed as an approved party to use or control this specific robot (not limited to, biometric authentication);
3. analysing and confirming if the robot's hardware and software are intact and remain untampered (e.g. not 'rooted', 'jailbroken' or hacked);
4. locating and identifying problems with or within the hardware, software, capabilities or any combination thereof in the robot's system, or the network of systems the robot may intend or be required to operate in or with;
5. carrying out performance or function tests to verify upheld originally approved operational proficiency, for example:
    5.1. it has or will have the capabilities and functional capacity (not limited to available fuel or energy charge, payload weight constraints/capacity) to acceptably complete its assignment or restricted function;
    5.2. its current performance would satisfy operational requirements required or anticipated for and during the requested assignment or function;
6. confirming that the robot does not have any outstanding maintenance, service, inspection or other orders;
7. establishing if the robot possesses or is carrying any unapproved or illicit payloads—in one instance, by analysing movement agility, e.g. if outside of normal baseline values/parameters this may account for unapproved payload weights; in another instance, by analysing data acquired from sensors or scanners on, in or within range of the robot that may detect unapproved payloads, e.g. these devices may be biosensors, molecular-level scanners, sensitive electronic chemical noses, etc.

Once the system receives confirmation that all registration, diagnostic and/or health tests have been successfully completed, the system issues relevant clearance codes to allow the robotic device to perform the function.

Command and Control Structure in More Detail

Figure 3:
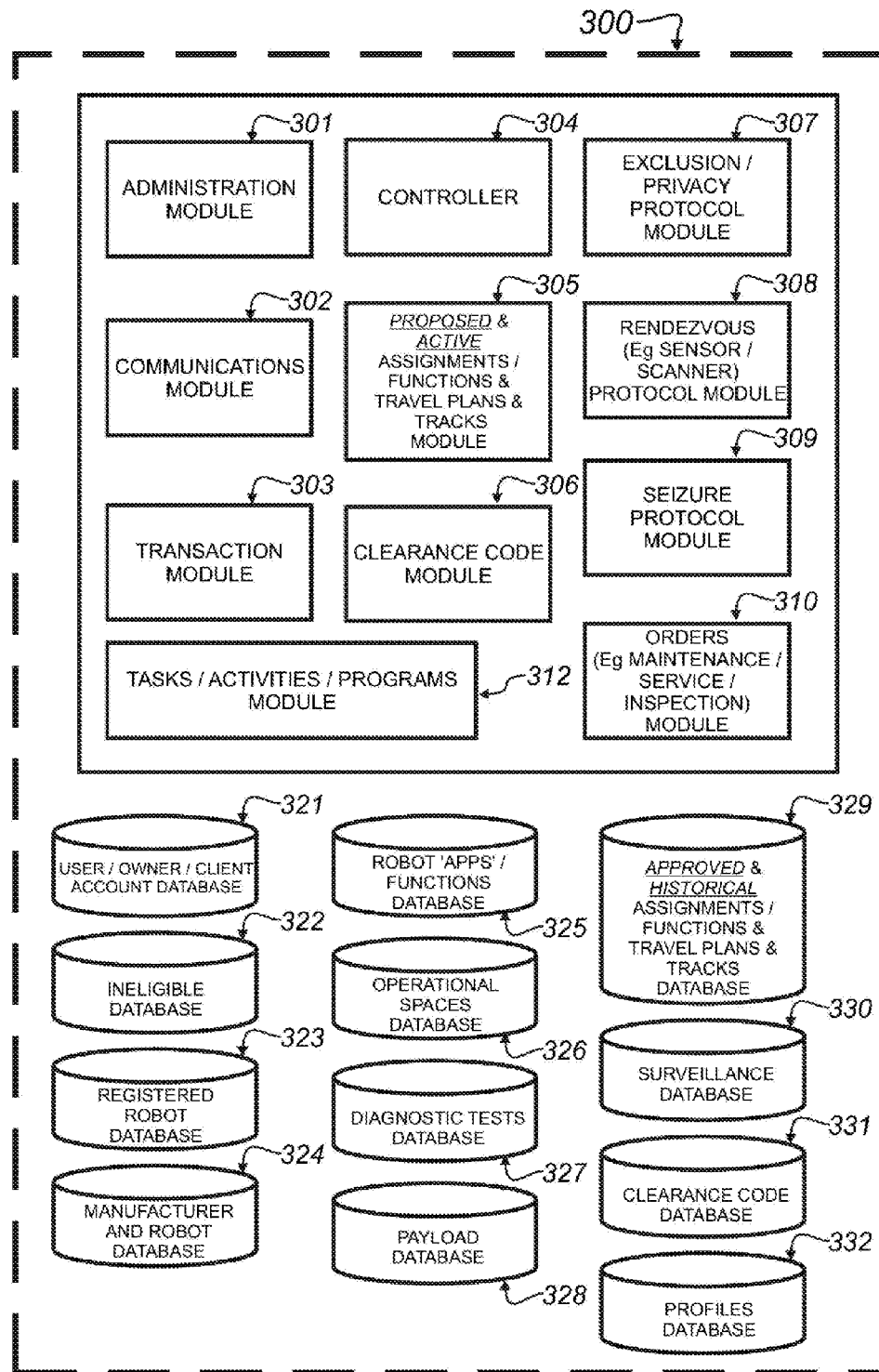
FIG. 3 is an example of a server module, including software/hardware modules and databases, arranged to implement an embodiment of the present invention.

FIG. 3 is a block diagram illustrating various components of a registry server which is equivalent to the structure shown generally at numeral 100*a* in FIG. 2. The server 300 shown in FIG. 3 illustrates an alternative view of the embodiment described with reference to FIG. 2, in that FIG. 3 is divided into functional modules rather than physical hardware. That is, FIG. 3 does not delineate the application server farm 120*a* and the policy engine 120*b* and some aspects of the public access infrastructure shown in FIG. 2, such as servers 130*a* and 132*a*, as separate components, but rather illustrates how such components functionally interact.

In other words, FIG. 2 is an illustration of one embodiment of a server infrastructure in accordance with the broader inventive concept. FIG. 3 is a high level "module" illustration of one embodiment of an infrastructure in accordance with the broader inventive concept. FIGS. 2 and 3 provide different perspectives of the same inventive concept and are not to be taken to be directed to different inventions, but rather to different views of the same broad inventive concept.

The Server 300 includes various modules and databases which provide functionality that enables robotic devices to be monitored, controlled and managed in order to uphold, for example, safety, security and privacy considerations. A short summary of each module is provided below:

301 Administration Module

An Administration Module 301 is provided to transmit system administrative function commands to one or more robotic devices. The commands can include commands that would be common to a number of robotic devices, including powering on and off, setting access controls, software updates, performance monitoring, statistic gathering and/or other administrative functions not directly related to diagnostic tests, clearance codes and/or policing 'rogue' robots.

302 Communications Module

The system further provides a Communications Module 302 which enables communication between the robotic devices and the Registry's Server 300, and/or other registry servers (not shown).

Further, in another use of the Communications Module 302, clearance codes (that may be generated, outputted or stored in a Clearance Code Database 331) may be transmitted to users' robots, devices or vehicles.

Additionally, the Communications Module 302 may also facilitate communications with the Server 300 by other entities (or the same entity) to facilitate operations, activities or tasks such as:

Maintenance, which may be in conjunction with an Orders Module 310, which accesses a Registered Robot Database 323 to determine any outstanding orders required to be addressed;

Software upgrades, which are allocated to and stored in a Manufacturer and Robot Database 324 before being distributed to registered robots, devices or vehicles that are listed in the Registered Robot Database 323—distribution is effected by a Task/Activities/Programs Module 312;

Profile uploads retrieved from a User/Owner/Client Account Database 321, and subsequently stored in a Profiles Database 332;

Robot registration application uploads, which are provided by a Tasks/Activities/Programs Module 312, in collaboration with a Manufacturer and Robot Database 324 and a Registered Robot Database 323;

User, application uploads, from a User/Owner/Client Account Database 321;

Surveillance data uploads from users' robots or devices, from the User/Owner/Client Account Database 321 and a Robot 'Apps'/Function Database 325 to confirm, for example, if a user or owner is authorised to be conducting surveillance operations;

Identifying the user or controller of the robot or device; and/or

Receiving user privacy constraints, via an Exclusion/Privacy Protocol Module 307.

303 Transaction Module

A Transaction Module 303 is employed to process financial transactions to pay for services provided by the Server 300 or associated, related third party.

In one embodiment, a Transaction Module 303 is responsible for issuing or processing product and/or service subscription accounts for users, owners or clients, which may be listed in a User/Owner/Client Account Database 321. Such subscriptions may be for the initiation or execution of exclusion zones or privacy constraints (not limited to shrouding or ghosting).

Moreover, the Transaction Module 303 may be responsible for issuing or processing fines, infringements or penalties in relation to, for example, not limited to, inappropriate, unauthorised, unregistered, illicit, illegal or unruly use, control, management or ownership of a robot, device or vehicle. Such fines, infringements or penalties may be communicated to the relevant party or parties using a Tasks/Activities/Programs Module 312, a Seizure Protocol Module 309, and/or a Communications Module 302.

304 Controller

In some embodiments, the modules and databases listed operate autonomously. However, in the embodiment described herein, a central controller 304 is utilised to provide a "supervisory" function. The central controller may operate autonomously or may be controlled by a user, to "override" the autonomous functioning of any individual module. For example, if a breach or compromise of the system is detected, a user may use the controller to override any given clearance code or other permission given to a particular robotic device.

305 Proposed & Active Assignments/Functions & Travel Plans & Tracks Module

A Proposed & Active Assignments/Functions & Travel Plans & Tracks Module 305 is responsible for a variety of processes or tasks, including receiving, analysing, storing and outputting, as necessary, an end user's proposed robotic device commands.

The Proposed & Active Assignments/Functions & Travel Plans & Tracks Module 305 utilises data or information stored in a User/Owner/Client Account Database 321 or an Ineligible Database 322 to confirm that a proposed assignment or function is permissible, i.e. can be authorized.

The Proposed & Active Assignments/Functions & Travel Plans & Tracks Module 305 also utilises data or information stored in a Registered Robot Database 323 to determine, whether a particular class, model or type of robotic device possesses the hardware, software or capabilities (including functional or operational) to undertake and successfully complete a proposed assignment, operation or function.

The Proposed & Active Assignments/Functions & Travel Plans & Tracks Module 305 also confirms that proposed or active assignments, operations or functions are permissible or authorised according to information in the Robot 'Apps'/Functions Database 325 and/or information in the Operational Spaces Database 326, which contains approved, 'restricted' or disallowed assignments, operations or functions.

The Proposed & Active Assignments/Functions & Travel Plans & Tracks Module 305 may consult with, check and/or confirm information and data contained or stored in one or more of a Server's 300 databases or modules for the purpose or running any necessary test such as those that may be conducted by a Diagnostic Tests Database 327.

306 Clearance Code Module

A Clearance Code Module 306 allows the generation of suitable authorisation codes, for the purposes of allowing or approving a user robot, device or vehicle to undertake or successfully complete an assignment, operation or function.

In some instances, the Clearance Code Module 306 may cause a robot, device or vehicle to perform another type of assignment, operation or function that may not have been proposed or initiated by a user.

Where there is a requirement to perform a diagnostics test prior to conducting a task, the Clearance Code Module may be instructed by a Tasks/Activities/Programs Module 312 following the successful passing of the diagnostic test.

307 Exclusion/Privacy Protocol Module

An Exclusion/Privacy Protocol Module 307 may be a Server 300 component that is responsible for processing all privacy-related matters such as, but not limited to, exclusion zones, shrouding and ghosting, which may otherwise be known as privacy constraints.

In one embodiment, the Exclusion/Privacy Protocol Module 307 includes a web-based interface which allows users to access or interact with available server tools or features leading to the creation, setting up, amendment, removal and/or payment of a privacy constraint and/or a subscription or an associated user account. Such an account may be listed in or stored by a User/Owner/Client Account Database 321. The Exclusion/Privacy Protocol Module 307 may communicate with a User/Owner/Client Account Database 321 when necessary to allow, for example, a user to create, set up, amend or remove an account which may only exist for the purposes of enacting privacy constraints that may be conveyed to other's robots, devices or vehicles for execution or implementation. The Communications Module 302 may facilitate the connection between a user's (remotely located) device that is used to connect to a Server's 300 Exclusion/Privacy Protocol Module 307. The Communications Module 302 may also facilitate the distribution of privacy constraints to other Servers and/or user robots, devices or vehicles.

The Exclusion/Privacy Protocol Module 307 may also impose changes to a Robot 'Apps'/Functions Database 325, for example, by altering or amending aspects of robot apps or functions, not limited to disallowing robots to travel into or within a particular space when executing a particular assignment, operation or function.

In this context, an Operational Spaces Database 326 may be altered to reflect changes to travel spaces.

In another instance, an Exclusion/Privacy Protocol Module 307 may communicate with a Diagnostic Tests Database 327, not limited to the following, for the purposes of altering, amending, analysing, reviewing and/or confirming that a Diagnostic Tests Database 327 would appropriately and accurately instruct or command a robot, device or vehicle to perform all necessary tests before, during or after an assignment, operation or function with respect to any existing, or newly imposed changes to, privacy constraints listed in or stored on an Exclusion/Privacy Protocol Module 307.

For example, a user may form or create a new privacy constraint that may pose a particular challenge or be a different set of parameters not previously dealt with by a robot, device or vehicle. Accordingly, amendments and/or additions are made to relevant or applicable diagnostic tests on a Diagnostic Tests Database 327 which would cause all relevant or applicable robots, devices or vehicles to undertake or successfully complete an updated diagnostic test when next required.

The Exclusion/Privacy Protocol Module 307 may communicate with a Payload Database 328 for the purpose of forming a new or altering or amending an existing list of authorised payloads that is carried in, on or by a robot, device or vehicle. Certain privacy constraints may dictate which robots, devices or vehicles can carry or transport particular payloads. Authorised payloads may be dictated also by any restrictions placed upon, a user, which is listed in the User/Owner/Client Account Database 321.

The Exclusion/Privacy Protocol Module 307 may also communicate with a Surveillance Database 330 for the purpose of altering or amending authorised and unauthorised surveillance areas. Further to a Surveillance Database 330, an Operational Spaces Database 326 may be utilised for the same purpose.

The Exclusion/Privacy Protocol Module 307 also communicates with a Profiles Database 332 for the purpose of implementing any privacy constraints that may involve Profiles. For example, a user may upload to a Server 300 using their robot, device or vehicle, with the assistance of a Communications Module 302, a new or updated Profile to a Profile Database 332, with any updates to a Master Profile that relate to a privacy constraint communicated with an Exclusion/Privacy Protocol Module 307 which is then distributed out to any relevant or applicable robots, devices or vehicles.

308 Rendezvous (Sensor/Scanner) Protocol Module

A Rendezvous (Sensor/Scanner) Protocol Module 308 is a Server 300 component responsible for processing all rendezvous protocols (not limited to the example of a 'Sense/Scan' operation). These protocols may relate to the relocation of robots, devices or vehicles to specified locations. Rendezvous protocols may be formed, set up, amended or removed from one or more Server 300 databases or modules, not limited to a Rendezvous (Sensor/Scanner) Protocol Module 308 by either the registry party, users, governing bodies or other stakeholders or third parties.

Using the 'sense/scan' rendezvous protocol as an example scenario, such a protocol utilises a software application that executes on dedicated or shared hardware or other peripherals, which cause robots, devices and vehicles to perform, in one example, a predefined operation. Further, a Rendezvous (E.g. Sensor/Scanner) Protocol Module 308 may communicate with one or more databases such as a User/Owner/Client Account Database 321 or a Registered Robot Database 323 to determine which users, owners or clients require their robots, devices or vehicles to be tested or examined by sensors or scanners.

The Rendezvous (E.g. Sensor/Scanner) Protocol Module 308 may also communicate with a Proposed & Active Assignments/Functions & Travel Plans & Tracks Module 305 in order to plan, program, calculate, anticipate or expect which, when or where robots, devices or vehicles may be 'called upon' (appropriately) for the purposes of a rendezvous protocol. For example, a robot may be in the vicinity of a sense/scan station and, thus, an opportune moment to activate or initiative the relevant rendezvous protocol.

In another example, using a practice of concealing (final) rendezvous locations or positions, the Rendezvous (Sensor/Scanner) Protocol Module 308 when activating a robot, device or vehicle for sensing or scanning may communicate with a robot, device or vehicle using a Communications Module 302 in order to regulate its surveillance or tracking capabilities, particularly, with respect to data that may be viewed or stored by an unauthorised party.

An Operational Spaces Database 326 or a Surveillance Database 330 may provide (the most up-to-date) privacy constraints that may need to be obeyed to protect the confidentiality, for example, of a sensor/scanner station's location or position. An Operational Spaces Database 326 may also have a station's location or position updated from time to time.

Certain clearance codes are generated by a Clearance Code Module 306 or retrieved from, or confirmed against a Clearance Code Database 331. Clearance codes sent may be the data signal which causes robots, devices or vehicles to initiate or execute a particular assignment, operation or function either for the purposes of this instance or another.

In another example, the Rendezvous (Sensor/Scanner) Protocol Module 308 may lead to a positive detection result of a robot, device or vehicle which may then cause another protocol, for example, a 'seizure protocol' run by a Seizure Protocol Module 309 to be initiated. A seizure protocol overrides any prior commands or instructions conveyed to a robot, device or vehicle by any party to, for example, instruct that a robot, device or vehicle instead execute new commands or instructions that may be issued by the Registry or a governing body.

The seizure protocol commands program a robot, device or vehicle to undertake or successfully complete a particular assignment, operation or function. For example, the assignment may be relocated to a designated space (e.g. Police impound) that may be listed in an Operational Spaces Database 326. Further, different types or models of robots, devices or vehicles (that may be specified in a Registered Robot Database 323) may have different designated space.

309 Seizure Protocol Module

This module commands a user's robot, device or vehicle be relocated to a registry designated space. This space may be stored in an Operational Spaces Database 326. In various embodiments, a command may be communicated or uploaded to a robot, device or vehicle (using a Communications Module 302). The specific data signal communicated (e.g. an output file) may trigger an installed software application on a robot, device or vehicle and that application will perform most of the computations. In other embodiments, a Server 300 runs the applicable software application (as a host) and the remotely located robots, devices and vehicles (clients) are simply a vessel which receives the commands from the Server 300.

310 Orders (Maintenance/Service/Inspection) Module

Module 310 commands that a user's or owner's robot be relocated to a designated space. This space may be listed in an Operational Spaces Database 326. The Module 310 may also incorporate all necessary information, data, tasks, activities or requirements related to maintenance, service, inspection or other matters. This Module 310 may also be a principal module for use by a robot, device or vehicle testing facility; therefore, not only used to instigate relocation of a robot, device or vehicle but able to be used after the robot has arrived at the relocation destination by dictating, undertaking or actioning (e.g. outstanding) orders.

In another aspect, Module 310 may communicate with (perhaps, by using the Communications Module 302, for example) an Approved & Historical Assignments/Functions & Travel Plans & Tracks Database 329 to inform the Server 300 of a robot's, device's or vehicle's location or position relative to a designated space as described in the above paragraph. The server and any relevant user, owner or client may be kept updated on any order matters.

312 Tasks/Activities/Programs Module

This module may be utilised for numerous applications. For example, the module may be responsible for operating, managing, monitoring and controlling (herein this specification these may be referred to as 'running' or 'run(s)', depending on the context) one or more of the Server's 300 databases or other modules.

Some non-exhaustive examples are provided as follows:

Diagnostic Tests Database 327: The 312 Module interfaces with Database 327 for the purpose of (remotely) running robot diagnostic tests, using data contained in the Database 327 as necessary. These tests may be in relation to the requirement that users or owners of robots be proficient or approved before being issues clearance code(s) in order to perform an assignment or function. In another non-limiting instance, tests may be concerned with, preferably, authorised parties that are performing maintenance, service, inspection or other orders on users' or owners' robots.

Robot Apps'/Functions Database 325: The 312 Module may interface with Database 325 for the purpose of examining robot applications ('apps') for suitability or approval-for-use by users' or owners' robots, and/or acceptance on the robot app marketplace, which may be publicly or privately accessible. Further, the 312 Module may interact with the Database 325 for the purpose of public or private examinations or evaluations, i.e. the system may allow for open-source or closed-source assessments, comments and/or feedback in the process of determining an app's or function's suitability or approval.

Profiles Database 332: The 312 Module may interface with Database 332 for the purpose of running the users', owner's or clients' Profile inputs and outputs. In one example, new or updated Profile data may be sent to the server and the 312 Module may be responsible for allocating to existing, respective, Master Profiles, or creating a new Master Profile accounts.

In another example, the 312 Module is also responsible for interacting with the Profiles Database 332 for the purpose of determining the percentage accuracy of a Master Profile.

In other words, the Module 312 may cause changes in the percentage accuracy assigned to a particular Master Profile. This change may then be distributed to an applicable or associated user, which would signal to the user the requirement to update the subject Profile. Distribution or communication with a remote device (e.g. a robot) by the server may be instigated by the Communications Module 302.

If Profiles also apply or are, for example, registered for privacy protection, e.g. Profile Exclusion Zone, Profile Shrouding or Profile Ghosting, then the applicable Profiles from the Profiles Database 332 may interface with Operational Spaces Database 326 (in the case of excluding spaces) and these privacy constraints are implemented in conjunction with the Exclusion/Privacy Protocol Module 307. Further, in performing the above mentioned programs, for example, the Module 312 and Profiles Database 332 may interact with the User/Owner/Client Account Database 321 where necessary. For example, Profiles in the Profiles Database 332 may be linked or associated with specific accounts in the User/Owner/Client Account Database 321.

In one embodiment, a Tasks/Activities/Programs Module 312 facilitates the policing of 'rogue robots' or unregistered, unlicensed, illegal, non-participating, etc. robots, devices and vehicles. In one aspect, using data and information from sensors, scanners or other surveillance capturing devices (installed on a user's robots, devices or vehicles) and transmitted to a Server 300 (using a Communication Module 302) and received by or stored in a Surveillance Database 330, a Tasks/Activities/Programs Module 312 may run a software program that monitors, for example, surveillance information or data that consists or comprises of identifying factors of a 'rogue robot' that is present or operating in a space that does not correlate with any active assignments, operations or functions listed in or stored on a Proposed & Active Assignments/Functions & Travel Plans & Tracks Module 305, which interfaces with an Operational Spaces Database 326.

In other words, a Surveillance Database 330 receive data; the data may be a captured video image of a robot, for example; where and when the image was captured may be recorded against or with the image file in the Tasks/Activities/Programs Module 312 and is then cross-indexed with data contained in a Proposed & Active Assignments/Functions & Travel Plans & Tracks Module 305, a Surveillance Database 330, a Registered Robot Database 323, a Manufacturer And Robot Database 324, a Robot 'Apps'/Functions Database 325, an Operational Spaces Database 326 and a Profiles Database 332.

In more detail:
a Tasks/Activities/Programs Module 312 may operate to perform most, if not all of the functions described herein, not limited to cross-index data and information listed in or stored on the below list of databases and modules;
a Proposed & Active Assignments/Functions & Travel Plans & Tracks Module 305 may allow identification of currently active assignments, operations and functions, and where and when they are occurring;
a Surveillance Database 330 may receive and contain raw or unprocessed robot reference data to be searched, not limited to a digital picture of a yet to be identified robot;
a Registered Robot Database 323 may provide information as to the registration status of any robot that is identified after processing surveillance data;
a Manufacturer And Robot Database 324 may provide data or graphical representation information on particular types or models of robots to assist with comparing and contrasting said representations with surveillance data;
a Robot 'Apps'/Functions Database 325 may allow another form of checking and confirming if a registered robot recently executed or is currently executing a software application that would cause a registered robot to be present at a particular place at a particular time;
an Operational Spaces Database 326 may be utilised to bolster data or information about a particular space to surveillance data; and
a Profiles Database 332 may list or store various relevant robot Profiles to assist this aspect of the invention determine (in)tangible elements, subjects or objects captured in the surveillance data.

321 User/Owner/Client Account Database

A User/Owner/Client Account Database 321 includes a data structure of all users that participate with the system described herein. The User/Owner/Client Account Database 321 contains data concerning, but not limited to:
the identity of a user, owner or client, and linked to or associated with some or all information or data listed in or stored on a Profiles Database 332 such as a profile picture or other media file;
if a user, owner or client is linked to or associated with any registered robots, devices or vehicles, with some or all data listed in a Registered Robot Database 323;
historical events (dates or times) linked to or associated with a user, owner or client, for example, some or all information relevant or applicable to a user, owner or client in this regard may be listed in or stored on an Approved & Historical Assignments/Functions & Travel Plans & Tracks Database 329;
whether a user, owner or client currently possesses or formally possessed valid security and/or protection mechanisms or 'password keys', not limited to biometric locks or Profile data used to access or log-on to their robot, device or vehicle, or their Registry account for the purposes of paying a service fee or charge, dealing with privacy constraint matters (creating, amending, etc.), and so on, and relevant or applicable data or information concerning Profiles may be obtained from or referenced with data or information listed in or stored on a Profiles database 332;

whether a user, owner or client has previously been or currently is associated with a robot, device or vehicle that had been, was or still is 'rooted', 'jailbroken' or hacked, or if there have been issues or notable reports with respect to a robot's, device's or vehicle's hardware, software or capabilities, and such information or data may be listed in or stored on a Registered Robot Database 323;

whether a user, owner or client has any outstanding orders (that may relate to maintenance, service or inspection requests) for a robot, device or vehicle that they are linked to or associated with, and such information or data about orders may be listed on or stored in a Registered Robot Database 323, an Orders (E.g. Maintenance/Service/Inspection) Module 310, and/or a Diagnostic Test Database 327;

whether a user, owner or client has any special waivers, permissions, authorisations or exemptions listed in or stored against their identity on their account file, not limited to, a waiver to have their robot, device or vehicle operate a surveillance application to allow a parent to supervise their child walking or catching the bus to/from school, or to allow their robot, device or vehicle to carry a particular payload or undertake a certain 'restricted' function, which information or data may be listed in or stored on a Payload Database 328.

322 Ineligible Database

The Ineligible Database 322 comprises a list of ineligible users, owners or clients. Ineligibility may be for a variety of applications, activities or requests, for example, particular users, owner or clients may not be mature enough (e.g. under a statutory age limit) to possess or have the authority to instruct, command or convey assignments, operations or functions to a particular type or model of robot, device or vehicle. In one embodiment, the Ineligible Database 322 is operated by a Tasks/Activities/Programs Module 312, and receives collaborative information or data from a Manufacturer And Robot Database 324 which specifies the hardware, software and capabilities (i.e. specifications) of a particular type or model of robot, device or vehicle.

Robots, devices or vehicles that are deemed ineligible may be listed in an Ineligible Database 322 and the corresponding ineligibility rating or status linked to or associated with a user's account which may be listed in the User/Owner/Client Account Database 321.

323 Registered Robot Database

The Registered Robot Database 323 includes information on robots, devices or vehicles that have been registered by their users, owners or clients. Robots, devices or vehicles that may be or become ineligible for registration may instead be listed in or stored on an Ineligible Database 322.

324 Manufacturer and Robot Database

A Manufacturer and Robot Database 324 includes data or information regarding manufacturers of robots, devices and vehicles. In more detail, the Manufacturer and Robot Database 324 lists all robots, devices and vehicles recognised by the Server 300 system.

Further, the Manufacturer and Robot Database 324 includes data with regard to 'Type Approval' methods, typically associated with compliance identifications/certifications. For example, part of a compliance process may establish a performance baseline for a particular robot type, which would need to be above the required standards for compliance approval.

Further, data in relation to compliance matters may be stored on a Manufacturer and Robot Database 324. When diagnostic tests are being undertaken, e.g. by a Tasks/Activities/Programs Module 312 in collaboration with a Diagnostic Tests Database 327, the Manufacturer And Robot Database 324 may be referenced for any required data or information.

325 Robot 'Apps'/Functions Database

A Robot 'Apps'/Functions Database 325 includes data regarding approved or unapproved robot, device or vehicle software applications.

In more detail, a Server 300 utilises the Robot 'Apps'/Functions Database 325 for the purpose of listing or storing all available 'apps' for download and/or purchase by users, owners or clients, perhaps, for their respective robot, device or vehicle. Those parties may access or log-in to their registry account, navigate a web-based interface in order to search for, select and purchase, then download a desired app.

The 'app marketplace' may interface with any one or more of the aforementioned modules and/or databases. For example:

a Communications Module 302 arranged to facilitate data transmission in order to: access an account, complete any transaction activities, download any relevant files from the Server 300 and/or another robot, device or vehicle;

a Tasks/Activities/Programs Module 312 to operate the 'app marketplace' web-based or application programming interface;

a Transaction Module 303 facilitates e-, f-, s- and/or m-Commerce activities;

a User/Owner/Client Account Database 321 is responsible for assigning restrictions, regulations, listing/storing and/or advising of any applicable or relevant information about, in respect of, or to particular apps;

an Ineligible Database 322 controls which parties are not eligible to download particular apps;

a Registered Robot Database 323 which includes a list of apps that a robot, device or vehicle already possesses, may be eligible for or compatible with;

a Manufacturer And Robot Database 324 specifies apps that are suitable for use or compatible with particular robots, devices or vehicles, or provide guidelines or parameters to prevent particular apps functioning or executing on a type of robot, device or vehicle;

a Robot 'Apps'/Functions Database 325 includes a list of approved or unapproved apps for all types of robots, devices or vehicles available in the 'app marketplace';

an Operational Spaces Database 326 discloses all spaces that are authorised to work with or are approved-for-use by an app, which is accessible via a web-based interactive map that illustrates the specific areas;

a Diagnostic Tests Database 327 determines which tests should or must be run before particular apps are executed on robots, devices or vehicles, during and/or after the execution of those apps;

a Payload Database 328 determines which, if any, payloads may be utilised with a particular app;

an Approved & Historical Assignments/Functions & Travel Plans & Tracks Database 329 provides statistical data or information concerning the number of occasions a particular app has been utilised;

a Surveillance Database 330 informs which apps in the 'app marketplace' have restrictions placed upon them in respect of surveillance activities performed by a robot, device or vehicle;

a Profile Database 332 determines which Profiles are required to be exchanged or transmitted to a Server 300 and/or another robot, device or vehicle.

326 Operational Spaces Database

An Operational Spaces Database 326 is provided which includes an entire inventory of environments, places, areas or spaces approved for particular robots, devices or vehicles. The Tasks/Activities/Programs Module 312 interfaces with this database to transmit information to the robots, devices or vehicles.

In more detail, the Operational Spaces Database 326 regulates particular assignments, operations or functions of robots, devices or vehicles. For example, a particular (air) space may be permanently excluded-for-use by all or particular robots, devices or vehicles for safety, security or privacy considerations.

327 Diagnostic Tests Database

The Diagnostic Tests Database 327 includes a plurality of tests for execution on robots, devices and vehicles. In one embodiment, a robot, device or vehicles utilises the Server 300 Diagnostic Tests Database 327 when required to perform a test, and/or the Server 300 may reference its Diagnostic Tests Database 327 to confirm that a robot, device or vehicle possesses the correct tests on its own database(s) and/or module(s).

The Server's 300 Tasks/Activities/Programs Module 312 and/or Communications Module 302 is utilised to, respectively:

(i) run or perform the test on or for a robot, device or vehicle, remotely; and (ii) facilitate any necessary transmissions to/from the host (e.g. registry Server 300) and clients (e.g. users', owners' or clients' robots, devices or vehicles) for these purposes.

329 Approved & Historical Assignments/Functions & Travel Plans & Tracks Database An Approved & Historical Assignments/Functions & Travel Plans & Tracks Database 329 contains registry, governing body or other third party approved robot, device or vehicle assignments, operations or functions, which includes permissible operational travel spaces for robots, devices and vehicles.

The Proposed & Active Assignments/Functions & Travel Plans & Tracks Module 305 communicate or references information or data contained in the Approved & Historical Assignments/Functions & Travel Plans & Tracks Database 329 before approving or amending any proposed or active assignments, operations or functions.

A Clearance Code Module 306 is utilised to generate any relevant or appropriate clearance codes after a Proposed & Active Assignments/Functions & Travel Plans & Tracks Module 305 has deemed an assignment, operation or function is acceptable or approved following collaboration with an Approved & Historical Assignments/Functions & Travel Plans & Tracks Database 329.

330 Surveillance Database

In addition to aspects already described herein, a Surveillance Database 330 may be utilised to collect particular surveillance data or information from a plurality of robots, devices or vehicles.

A user may run a particular software application (that may be listed in or stored on a Robot 'Apps'/Functions Database 325), and that application carry a stipulation that particular surveillance data (e.g. with respect to time, date or location) be relayed to the Server 300 for analysis, processing, storage, etc. A Communications Module 302 may facilitate the transmissions between the Server 300 and remote robots, devices or vehicles. A Tasks/Activities/Programs Module 312 may then route (after, for example, filtering) relevant, appropriate or of value data to a Surveillance Database 330.

331 Clearance Code Database

A Clearance Code Database 331 may list or store all historical or currently active codes issued and their respective assignment, operation or function particulars (which robot it was issued to, the user involved, time/date, etc.) and is run by a Clearance Code Module 306. The Clearance Code Database 331 can also be used for the purposes of ensuring that particular codes are not reused again, or are only recycled following suitable quarantine periods.

FIGS. 4 to 7 are flowcharts illustrating the process of issuing clearance code(s) to robots before they may operate (at a particular time or in a particular manner or space). This embodiment adopts 'public' spaces as an example, but the broader inventive concept extends to any physical or virtual space.

Figure 4:
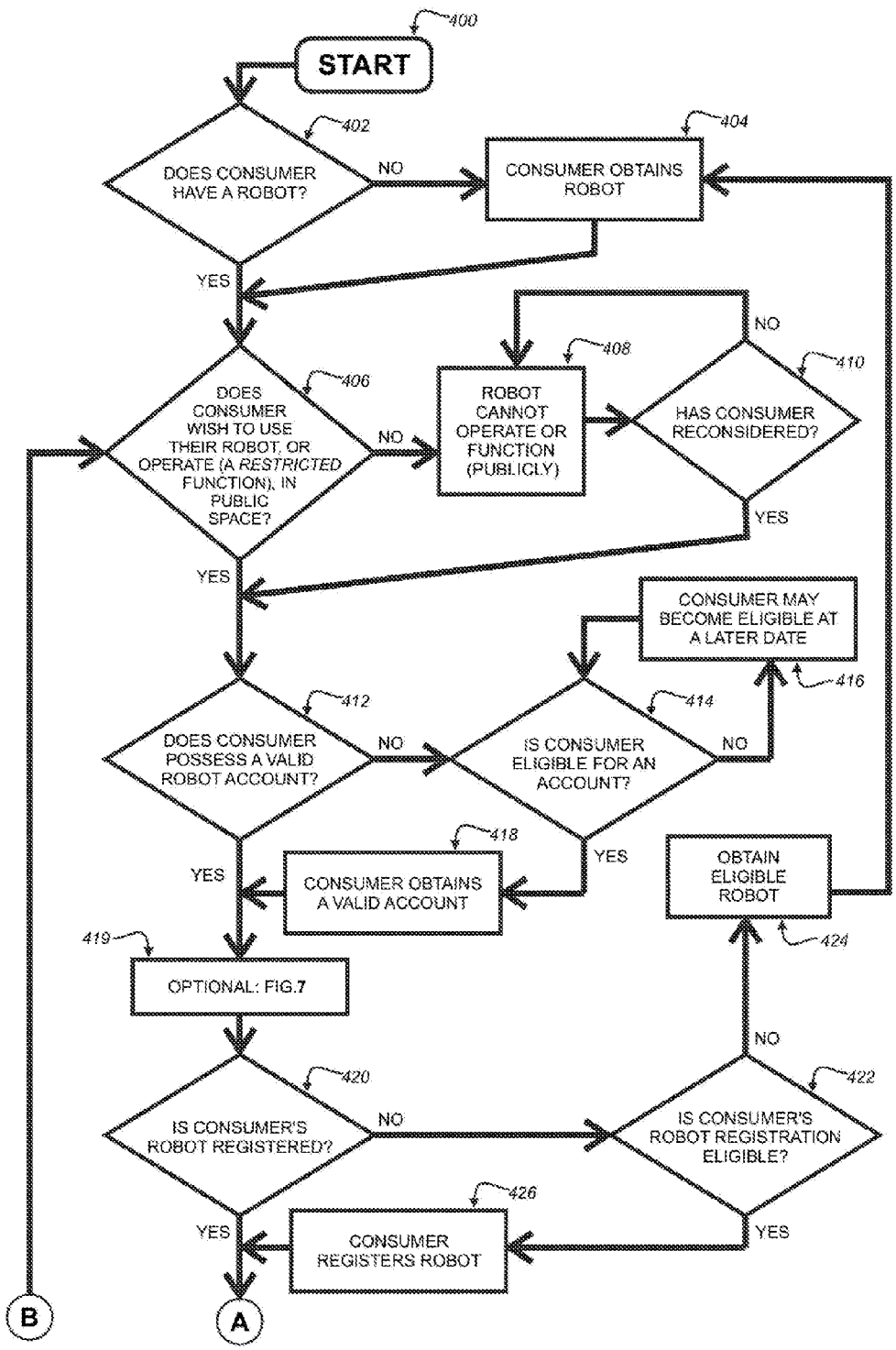
FIG. 4 is a flowchart depicting a computer implemented registration process in accordance with an embodiment of the invention.

Referring to FIG. 4, there is shown a typical process flow for a registry in accordance with the registries shown generally at FIG. 3 (i.e. server 300) and with the server system generally shown at FIG. 2 (i.e. server cluster 100*a*).

At step 402, a user typically wishes to utilize a robot for a particular function. If the consumer does not have a robot, the consumer may wish to purchase or otherwise obtain a robot at step 404, before proceeding to step 406, where a user makes a determination as to whether the robot will be used in a public space.

If the consumer wishes to operate their robot in a public space, the process flow continues to step 412, where a determination is made as to whether the consumer possesses a valid robot account. If the consumer does not have an account, a further determination is made at step 414 to determine whether the consumer is eligible for an account. If the consumer is not eligible for an account, the consumer may register to determine whether they may be eligible for an account at a later date at step 416.

If the consumer is eligible for an account, at step 418, the consumer obtains a valid account.

Once the system has determined that the consumer has a valid account, a check is made to determine whether the consumer's robot is registered at step 420. If the robot is not registered, then at step 422, a determination is made as to whether the consumers robot is registration eligible. If the robot is not registrable, the consumer may obtain a robot at step 424, and the eligible robot can then proceed through the flow process at step 406. If the consumer's robot is registration eligible, the consumer registers the robot at step 426 and the process flow may continue as shown in FIG. 5.

Figure 5:
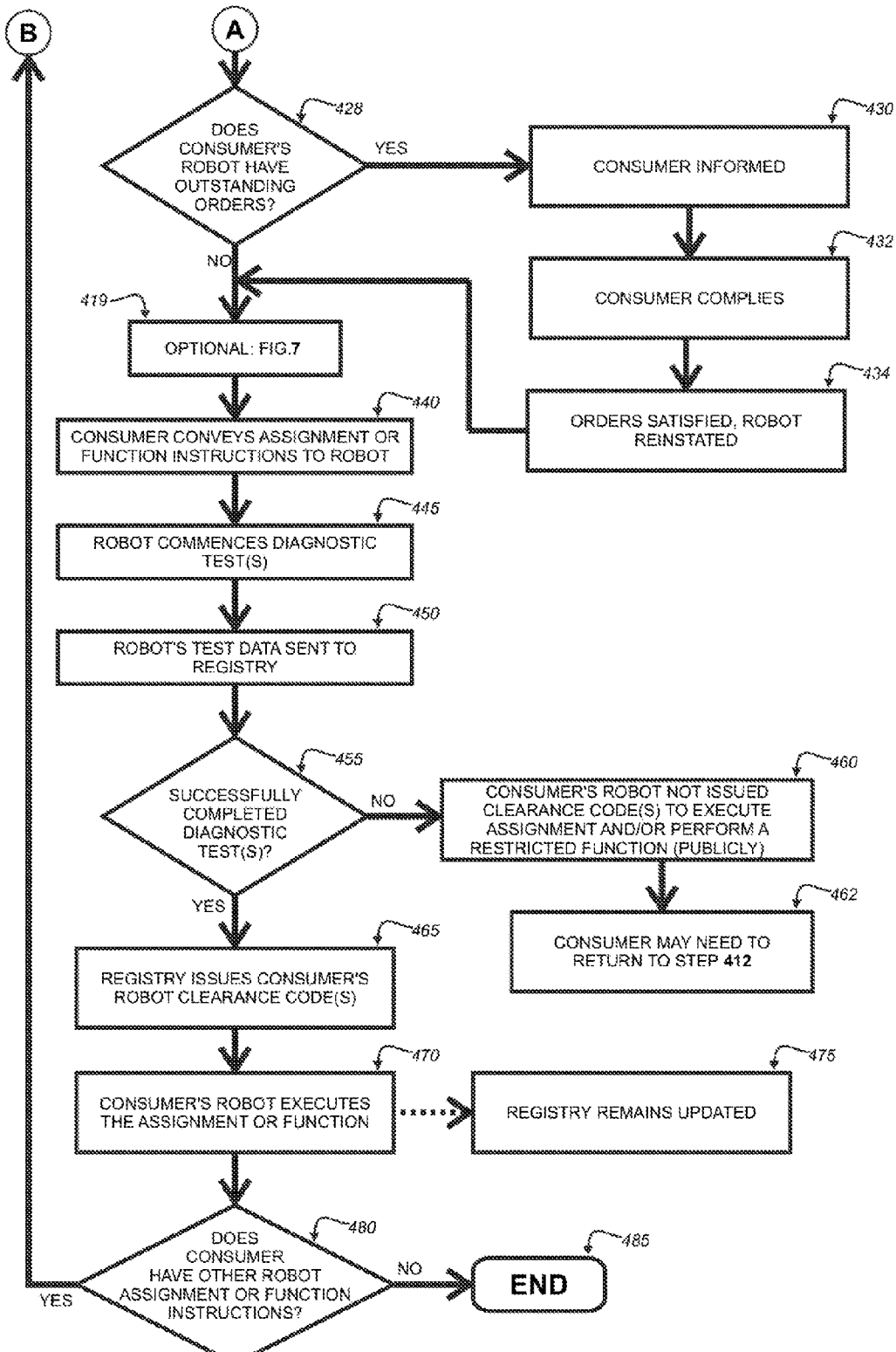
FIG. 5 is a flowchart depicting a computer implemented clearance process in accordance with an embodiment of the invention.

Referring now to FIG. 5, once it is determined that the consumer is authorised to operate the robot and that the robot is registered and authorised to carry out the action, then at step 428, a determination is made as to whether the consumers robot has outstanding orders. If so, the process flow continues to step 430 where the consumer is informed, the consumer complies at step 430 and the orders are satisfied and the robot reinstated at step 434. Thereafter, the robot is ready to receive future orders and the process flow continues at step 440, where the consumer conveys an assignment or function instructions to the robot.

Figure 5A:
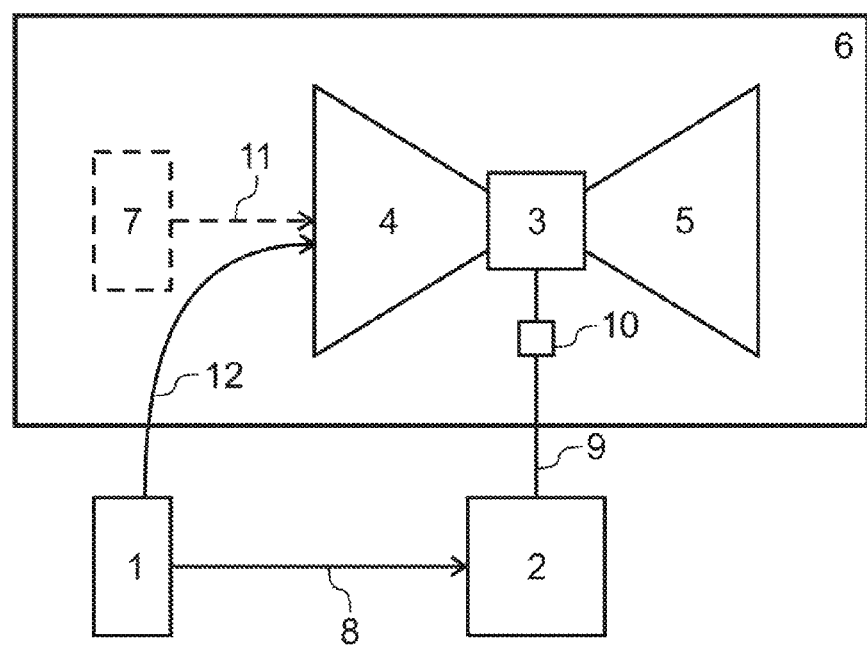
FIGS. 5a to 5d are computer implemented processes in accordance with an embodiment of the invention.

Referring to FIG. 5*a*, there is shown a diagram illustrating the concepts of a software application in accordance with the present invention.

Figure 5B:
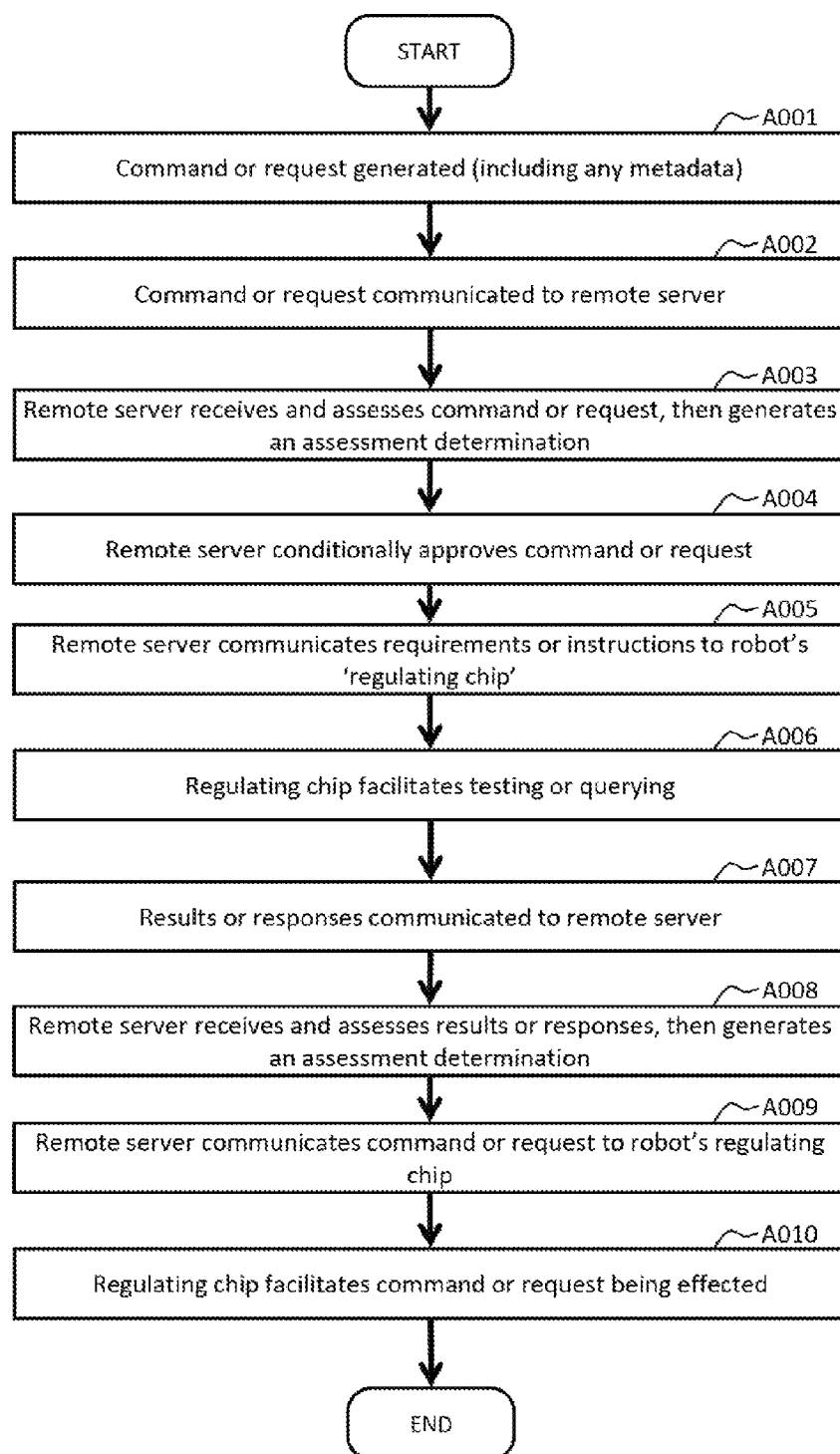

Referring to FIG. 5*b*, there is described a process flow for the manner in which a command is generated, processed and received by the robotic device. At step A001, external command or request generator 1 (e.g. a user and/or user's 'smart' device or robot pendant) generates a command or request (including any metadata).

At step A002, the command or request (which includes any attached information or metadata) is communicated 8 to the remote server 2 (or Robot Registry). At step A003, the remote server 2 receives and assesses the command or request, then generates an assessment determination.

At step A004 and A005, if the determination was to conditionally approve the command or request subject to approval of results or responses from outstanding assessment requirements, the remote server 2 communicates 9 outstanding requirements or instructions (e.g. assessment, diagnostic or health test instructions) to the robot's 6 receiver/transmitter module 10.

Therefore, in one embodiment, the command or request (e.g. operation mission) is first approved, in-principle, then the robot may need to be vetted (e.g. to ensure it is up to the task) before it is authorised to effect the command or request (e.g. like a two-part procedure or assessment).

The receiver/transmitter module 10 transmits the requirements or instructions to the robot's 6 regulating 'chip' 3 (e.g. a robot-local Robot Registry device, which may be software, hardware and/or firmware, and may comprise one or more devices functioning together, separately, dependently or independently; such devices may be integrated into robot modules or units, e.g. central processing units, CPUs).

At step A006 and A007, the regulating chip 3 facilitates and/or supervises robot testing or querying, communicating 9 results or responses to the remote server 2 (e.g. via the robot's 6 receiver/transmitter module 10).

At step A008, the remote server 2 receives and assesses the results or responses, then generates an assessment determination. (Note: steps A004 to A008 may go through numerous rounds or be repeated e.g. to facilitate further querying or testing following receipt, assessment and determination of prior query or test results or responses).

At step A009, if a determination was to approve the command or request following receipt and assessment of the robot's 6 results or responses, then the remote server 2 communicates 9 the command or request to the robot's 6 receiver/transmitter module 10. The receiver/transmitter module 10 transmits the command or request to the robot's 6 regulating chip 3.

At step A010, the regulating chip 3 facilitates the command or request, transmitting to the robot's 6 output 5, which essentially results in the command or request being effected.

Figure 5C:
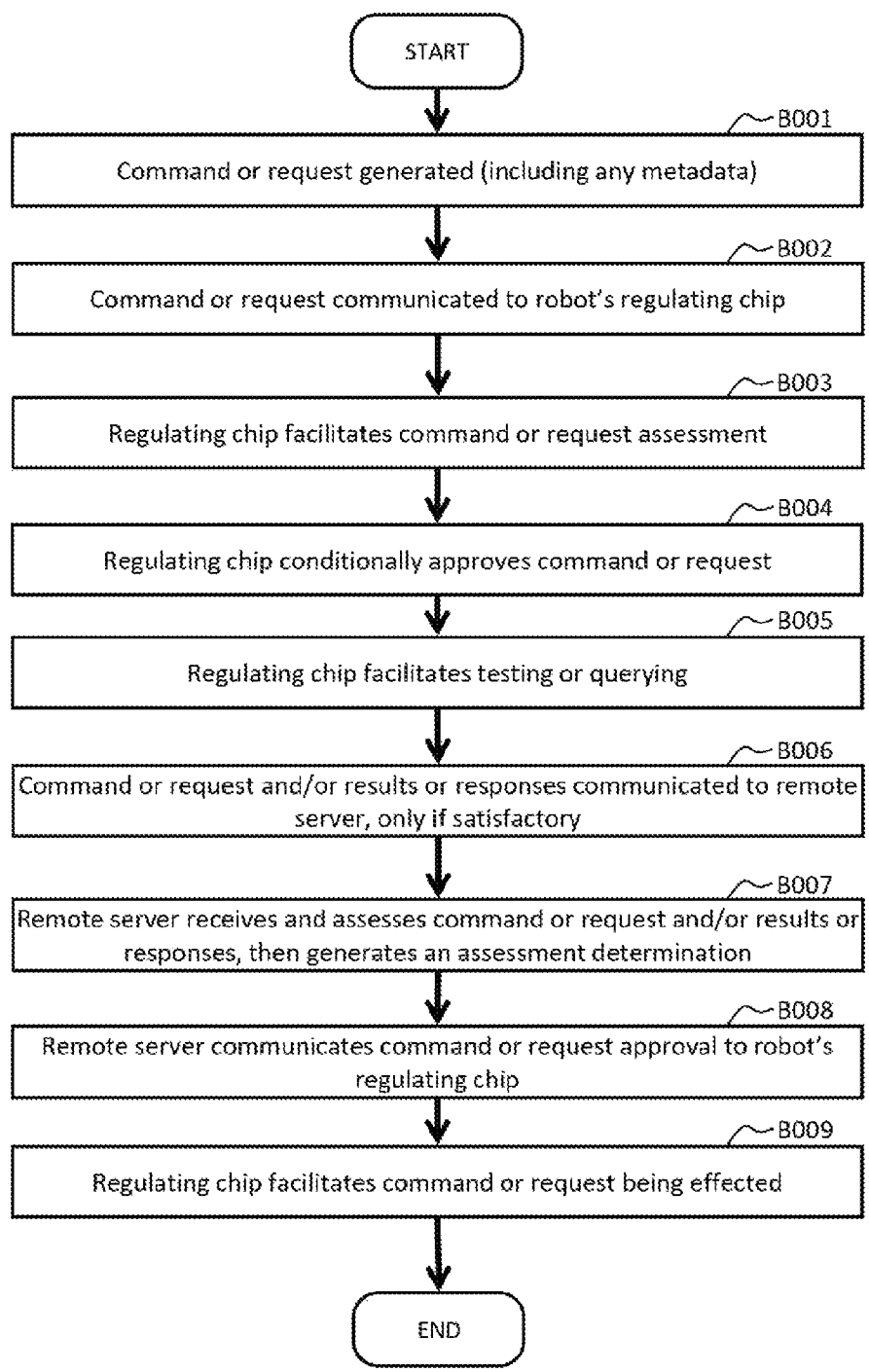

Referring to FIG. 5c, there is another example of a command and control sequence. At step B001, external command or request generator 1 generates a command or request.

In another embodiment, an internal command or request generator 7 (e.g. the robot's 6 autonomous logic or 'brain') generates a command or request. In one example, the robot detects something in its environment such as unfavourable or bad weather, which upon internal logic assessment results in the robot needing to generate a request such as permission to implement a detour to the destination, i.e. to avoid the bad weather.

Since the detour would involve a new travel path the robot would first need it approved before the robot is permitted to pursue the new route. At step B002, the command or request is communicated 12 (or transmitted 11, according to the other embodiment in step B001) to the robot's 6 input module 4. The robot's 6 input module 4 transmits the command or request to the robot's 6 regulating 'chip' 3.

At step B003, the robot's 6 regulating chip 3 assesses the command or request, then generates an assessment determination. At step B004 and B005, if the determination was to conditionally approve the command or request subject to approval of results or responses from outstanding assessment requirements, the regulating chip 3 then facilitates and/or supervises robot testing or querying to establish said results or responses.

At step B006, should the results or responses be satisfactory, in conjunction with the command and request, then the regulating chip 3 communicates 9 this data information to the remote server 2 (e.g. via the robot's 6 receiver/transmitter module 10) for further or final assessment and determination. In other words, the regulating chip 3 may pre-vet the command or request and/or robot's results or responses, i.e. before communicating with the remote server 2.

An advantage of this includes reducing the probability of the remote server 2 receiving and processing extraneous, redundant or purposeless data information traffic, e.g. the regulating chip 3 may act as a 'first screen', rejecting any commands or requests (which may be in conjunction with the robot's results or responses) that do not cut muster or are determined as not (likely) to be approved by the remote server 2.

At step A007, the remote server 2 receives and assesses the command or request and/or results or responses, then generates an assessment determination. At step A008, if the determination was to approve the command or request, the remote server 2 communicates 9 the command or request approval to the robot's 6 receiver/transmitter module 10.

The receiver/transmitter module 10 transmits the command or request approval to the robot's 6 regulating chip 3. At step A009, the regulating chip 3 facilitates the command or request, transmitting to the robot's 6 output 5, which equates to the command or request being effected by the robot 6. Note, as described in Scenario 1 (i.e. FIG. 5b), the Scenario 2 (i.e. FIG. 5c) process may also involve steps the same as or similar to steps 4 to 7 in Scenario 1, e.g. the remote server 2 may dictate further robot querying or testing before approving the command or request.

Figure 5D:
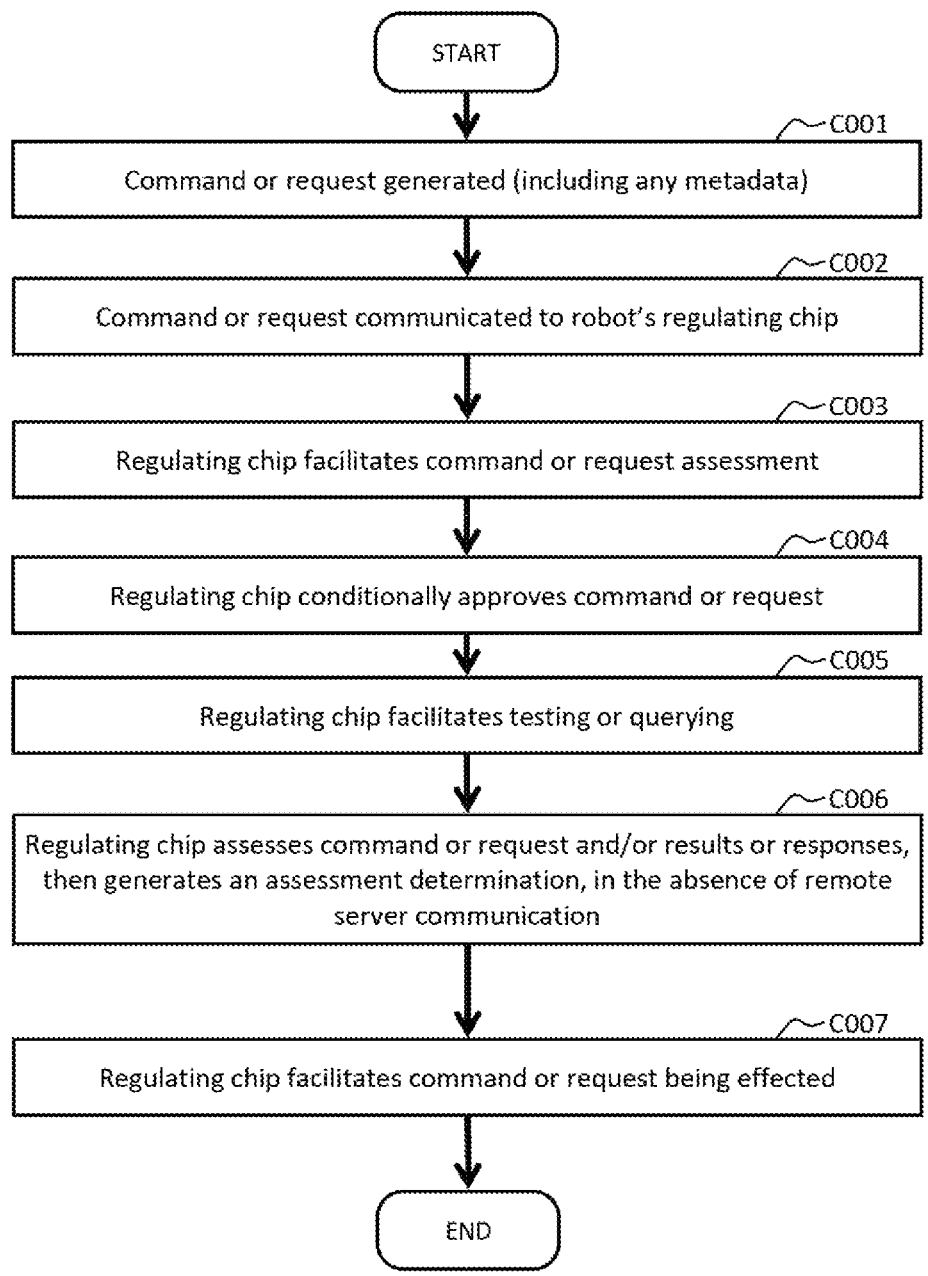

Referring to FIG. 5d, there is shown another example of a command and control state. At step C001, external command or request generator 1 (or internal command or request generator 7) generates a command or request.

At step C002, the command or request is communicated 12 (or transmitted 11) to the robot's 6 input module 4. The robot's 6 input module 4 transmits the command or request to the robot's 6 regulating 'chip' 3.

At step C003, the robot's 6 regulating chip 3 assesses the command or request, then generates an assessment determination. At step C004 and C005, if the determination was to conditionally approve the command or request subject to approval of results or responses from outstanding assessment requirements, the regulating chip 3 then facilitates and/or supervises robot testing or querying to establish said results or responses.

At step C006, it is here that the process may differ from Scenario 2, in that the regulating chip 3 may determine that there is no communication with a remote server 2 (e.g. the robot 6 may be 'out of range', in a wireless signal denied environment or not 'permanently' online), so the regulating chip 3 assesses to the best of its ability and/or programming the command or request and/or results or responses (e.g. it may take on the same or similar role as what the remote server 2 would have performed).

In one embodiment, the regulating chip 3 may occasionally communicate 9 with a remote server 2, e.g. via the robot's 6 receiver/transmitter module 10, and in doing so may facilitate the renewal of the robot's regulatory chip service subscription (or licence key) and/or the updating of relevant software, patches or flashes such as the latest Orders and/or Protocols that are to be obeyed or complied with by the robot 6.

In a further embodiment, should the robot's 6 regulating chip 3 not communicate with the remote server 2 within a specified time period or in respect of a currently proposed command or request the robot's 6 regulating chip 3 may cause commands or requests to not be approved in whole or in part—essentially, limiting or restricting the robot 6 or preventing it from operating.

A limitation or restriction example includes the command or request being 'travel around [this] location, taking surveillance footage'; however, since the robot had not been in communication with the remote server within a specified period of time the command or request was reduced or limited, for example, as follows: the robot was only permitted to travel within a specified radius of its 'home base' (or registered address) or was not permitted to travel within public spaces.

At step C007, if the determination was to approve the command or request, the regulating chip 3 facilitates the command or request, transmitting to the robot's 6 output 5, which equates to the command or request being effected by the robot 6.

Upon receiving the instructions, at step 445, the robot commences diagnostic tests and subsequently, at step 450, the robots test data is sent to the registry where, at step 455, a determination is made to determine whether the robot has successfully completed the diagnostic tests. If not, the process is terminated at step 460 as the consumer's robot is not issued a clearance code required to execute assignment and/or perform a restrictive function in a public space. If the robot successfully completes the diagnostic tests, the registry issues the consumer's robot with the appropriate instructions or clearance codes at step 465 and at step 470 the consumer's robot executes the assignment or function. Subsequent to the assignment or function being executed, the registry may optionally be updated at step 475 and a further determination is made to determine whether the consumer has other assignments or function instructions for the robot at step 480. If not, the process ends at step 485, but if there are further instructions, the process returns to step 406 at FIG. 4.

Profile Updating

Figure 6:
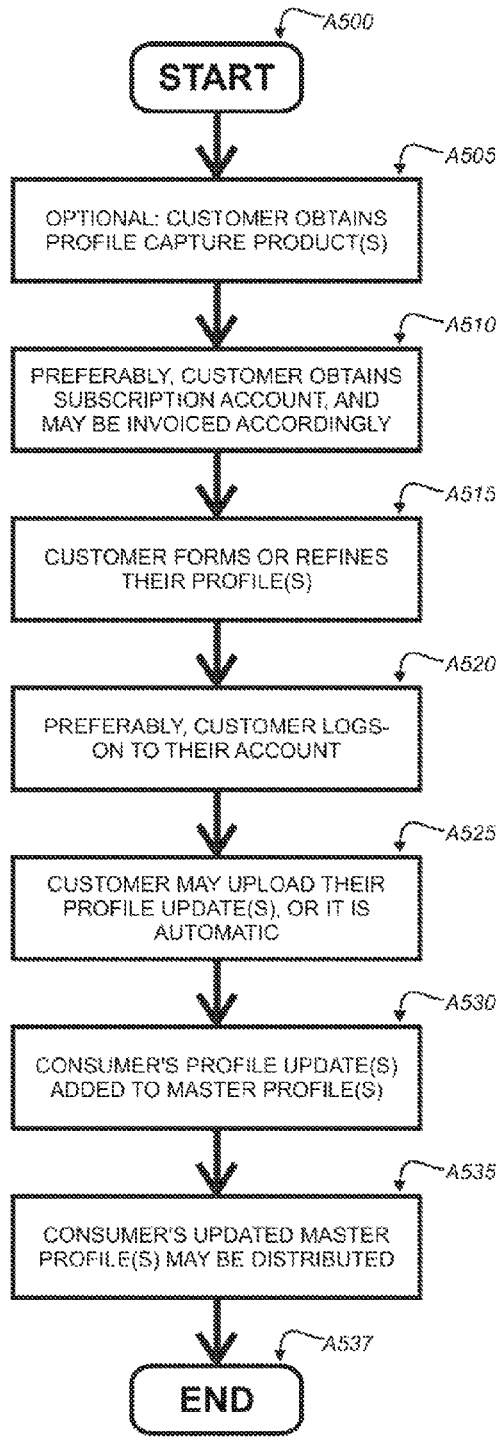
FIG. 6 is a flowchart depicting a computer implemented profile creation process in accordance with an embodiment of the invention.

Referring now to FIG. 6 there is shown a flowchart depicting a manner in which a profile may be updated. At step A505, a customer obtains profile capture products and ultimately at step A510 the customer obtains a subscription account and is invoiced accordingly if a subscription model is used.

Once the customer has obtained profile capture products and a subscription account, at step A515 the customer forms their profile. Once the profile is formed at step A520 the customer logs onto their account and subsequently at step A525 the customer may upload their profile update (or alternatively, the profile may be updated automatically).

In some embodiments, the file updates may be sent to a master profile and added to the master profile as shown at step A530. Subsequently, the customer's updated master profile is distributed.

Figure 7:
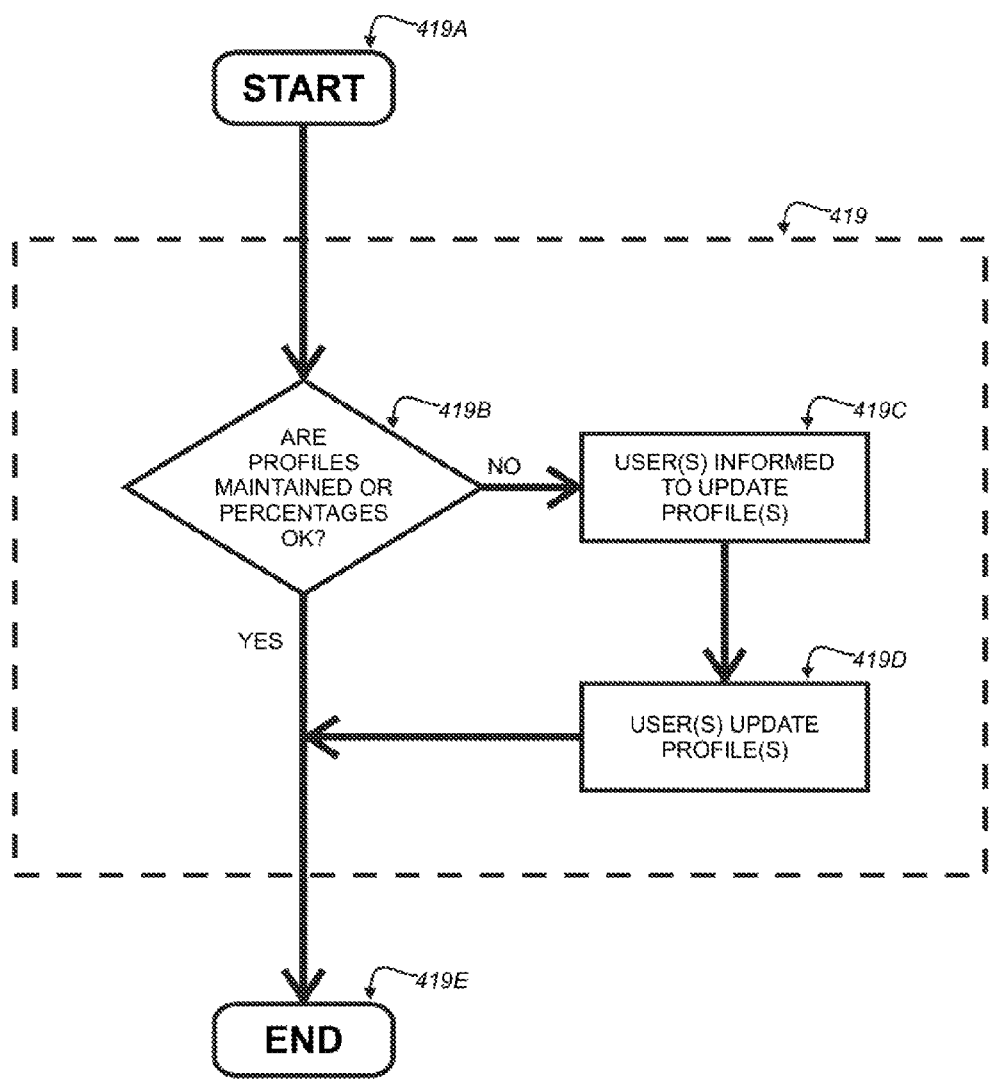
FIG. 7 is a flowchart depicting a computer implemented profile update process in accordance with an embodiment of the invention.

Referring now to FIG. 7, there is shown a shorter description of how a master profile is updated. At step 419b, a determination is made as to whether profiles are maintained. If not, at step 419c the user is informed it is required to update their profile. The user subsequently updates their profile at 419d and the process ends at step 419e. If the profile has been correctly maintained, no further steps are necessary and the process ends at step 419e.

Conditions or Constraints

Figure 7A:
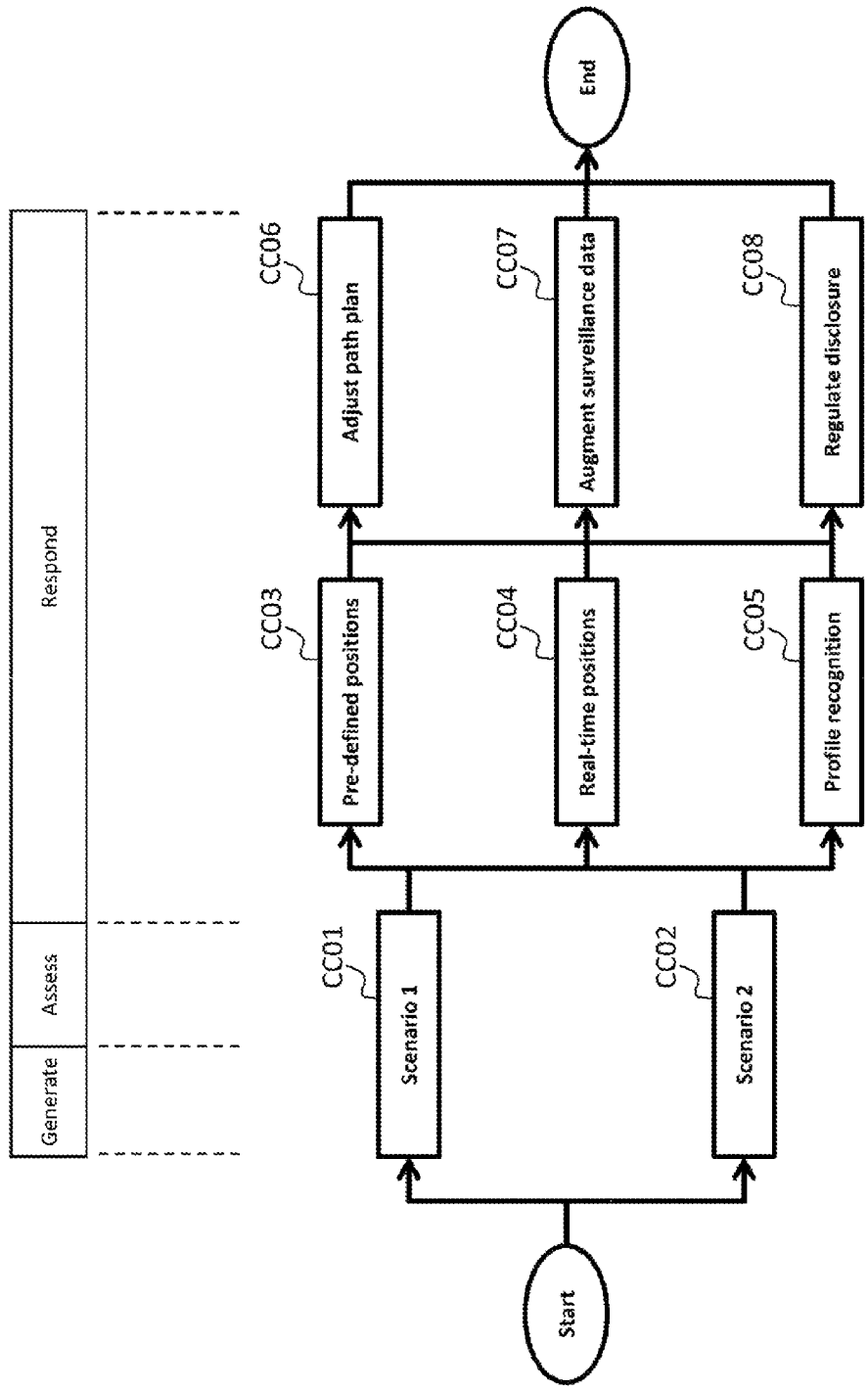

In the previous section, and with reference to FIGS. 5a-5d, there are described various examples of a methodology for the command and control structure. One step in the process is the imposition of "conditions or constraints" on the operation of the robotic device. Example embodiments are described with reference to FIG. 7a, each path defined by the flowchart route chosen.

FIG. 7b may conform to a similar structure of the broad process steps of:

(1) generating;
(2) assessing (optional);
(3) responding; and
(4) amending (optional).

Figure 7C:
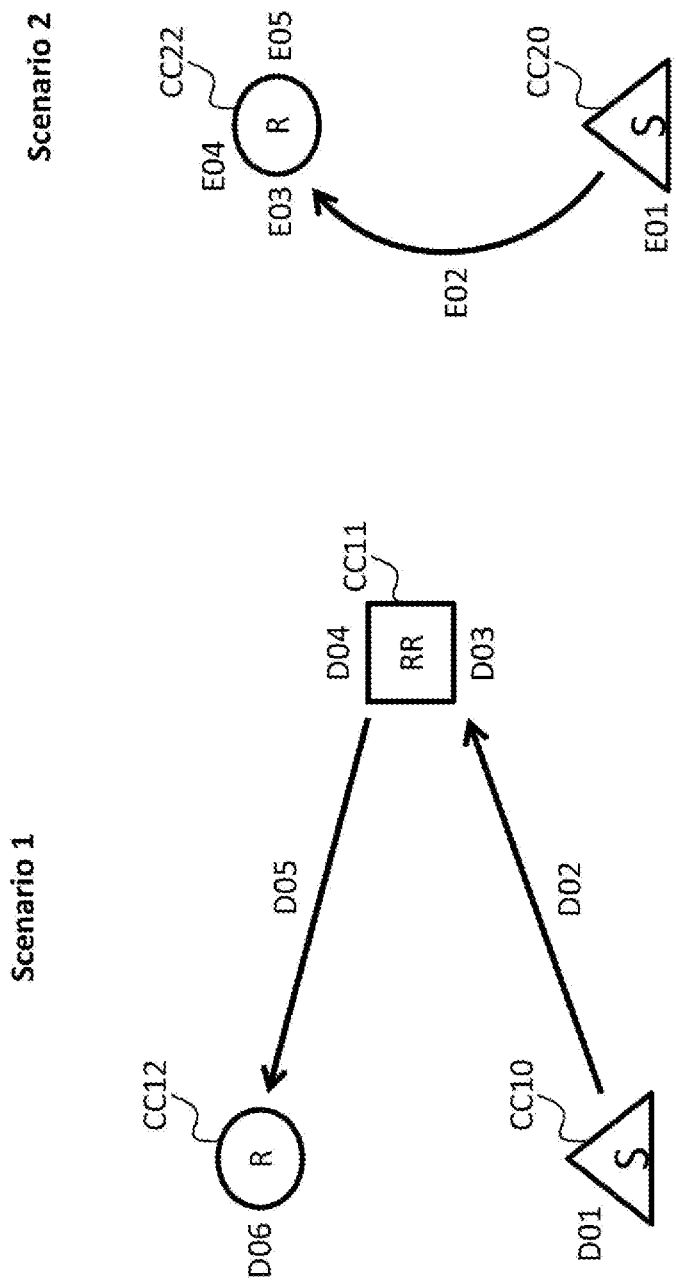
Figure 8:
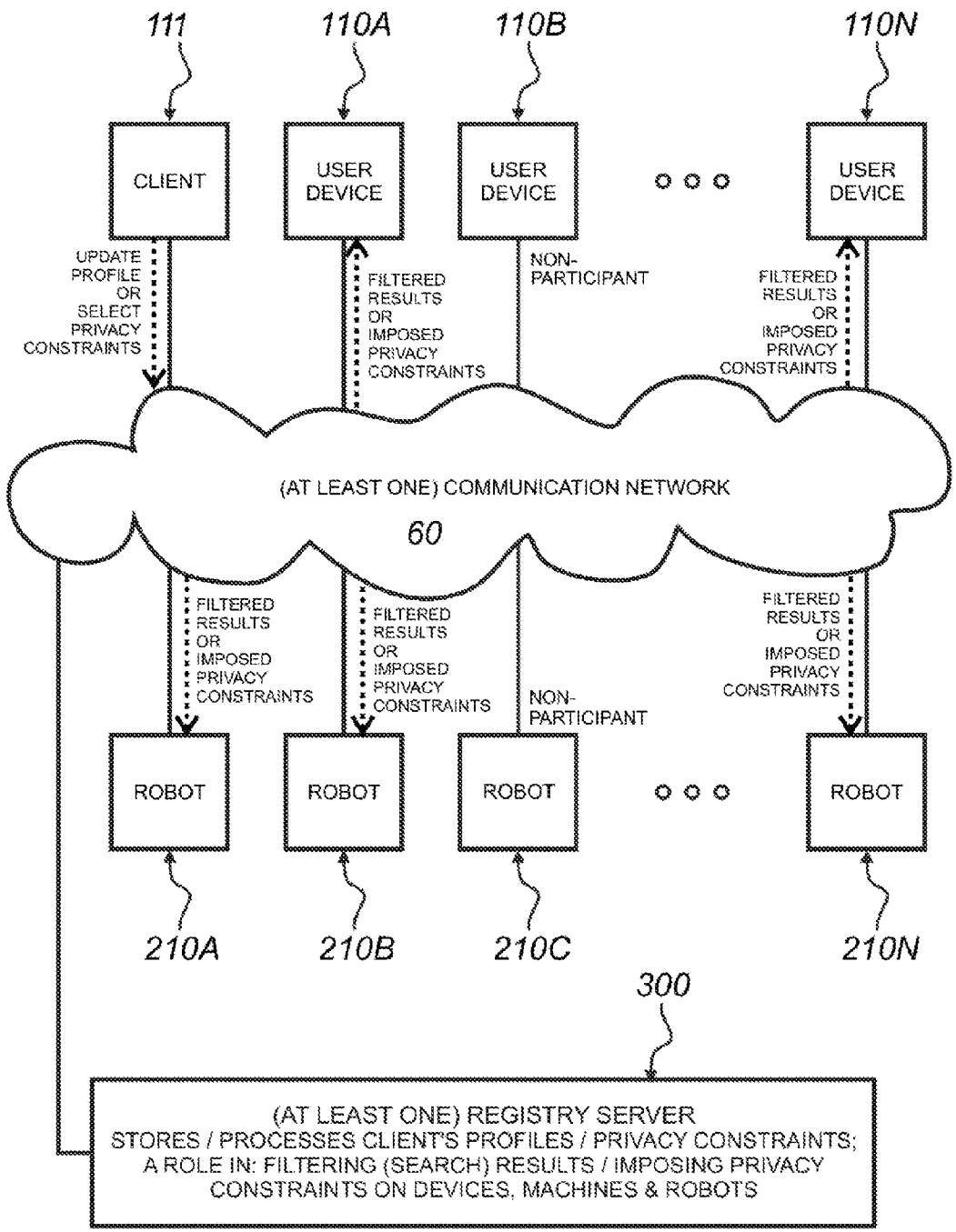
FIG. 8 is a diagram depicting a computer implemented system indicating process flows with regard to excluding, ghosting and shrouding processes in accordance with an embodiment of the invention.

With reference to FIGS. 7c and 7b, the following summarises two example processes of generating, assessing and imposing a condition or constraint. With regard to Scenario 1 in FIG. 7c, at step D01, the condition/constraint creator CC10 generates a condition or constraint (including any metadata).

At step D02, the condition or constraint (which includes any attached information or metadata) is communicated to the remote server CC11 (or Robot Registry). At step D03, the remote server CC11 receives and assesses the condition or constraint, then generates an assessment determination.

At step D04, the remote server CC11 may approve the condition or constraint being imposed. At step D05, the remote server CC11 communicates the condition or constraint to the robot's CC12 one or more 'regulating chips'. At step D06, the robot's CC12 regulating chip facilitates the condition or constraint being imposed.

At step D07, the condition or constraint may be amended or revoked for one or more reasons, e.g. the condition/constraint creator CC10 may no longer require the condition or constraint to be active, so it may be cancelled.

With regard to Scenario 2 in FIG. 7c, at step E01, the condition/constraint creator CC20 generates a condition or constraint (including any metadata). At step E02, the condition or constraint is communicated to the robot's CC22 one or more regulating chips. At step E03, the robot's CC22 regulating chip receives and facilitates assessment of the condition or constraint, then generates an assessment determination. At step E04, the regulating chip may approve the condition or constraint. At step E05, the regulating chip facilitates the condition or constraint being imposed. At step E06, the condition or constraint may be amended or revoked.

Privacy Issues and Ghosting

FIGS. 8 to 11 illustrate some examples of the techniques utilised by the server 300 to prevent users from capturing, viewing or recording surveillance data from any device, machine or robot, either due to being unregistered, the user unlicensed, it operating or functioning within or near a particular space, and so on. However, robots, for example, may still be able to use cameras or other surveillance functionalities for navigation or other purposes, but their users would not be approved or able to access, view or record such footage or data.

Privacy constraints may take the form of software code downloaded onto the robot, which then self-regulates its navigation movements. In one embodiment, the robot's navigation system may have 'blocks' or 'no go' zones placed upon its 'internal' map. These no go zones may be added, subtracted or amended accordingly, from time to time. Compatible navigation software code may utilise or feature multi-dimensional (geographical) coordinate systems/techniques. Such as, the robot's system is informed to avoid or not to travel within certain zones.

For example, unregistered robots would not typically receive clearance codes but they may receive privacy constraints. Being able to receive these constraints despite not being registered may be due to robot manufacturers supporting the 'privacy protocol standard', thereby, by default, designing robots to automatically receive these relevant transmissions—in whatever form they may be relayed to the robot (and whether from the registry or another party)—irrespective of the user being aware of such receipt.

In an alternative example, a registered robot may receive clearances codes; however not receive any privacy constraints. One reason for this may be because the consumer's instructed assignment or function did or would not cause the robot to venture in, on or near an exclusion zone (a zone that may be registered with the Registry or another party).

In more detail, the steps for facilitating exclusion zones (e.g. adjust travel path or plan):
  (1) condition or constraint position data information is received (e.g. by robot or by remote server);
  (2) prior to an Intention execution or approval, robot's travel plan or path is queried for conflicts with received condition or constraint position data information;
  (3) if there are conflicts, plan or path is adjusted to avoid (collision with) the space (or a subject within that space) as defined by the condition or constraint position data information.

The broad steps for facilitating shrouding or ghosting (e.g. augmenting of surveillance data and regulating disclosure):
  (1) condition or constraint position data information is received (e.g. by robot or by remote server);
  (2) prior to an Intention execution or approval (including the transmission of surveillance data for viewing and/or storing in non-buffered/-volatile memory; or the disclosure of data information, e.g. subject 'tagging'), robot's sensor field(s) of capture are queried for conflicts with received condition or constraint position data information;
  (3) if there are conflicts, robot's sensor field of capture is conditioned or constrained (e.g. augmented) such as by obstructing the sensor data feed or by blurring, censoring, blacking or whiting-out the capture field corresponding with the received condition or constraint data information. In one embodiment, this shrouding mechanism may be facilitated similar to creating 3D models in augmented reality environments, i.e. upon the recognition of a profile in the scene, the profile is virtually substituted/superimposed with a 'blank' shape, obstructing the profile.

Condition or constraint position data information is received by robot and/or remote server in the following manners:
  For pre-defined position data information (e.g. fixed coordinates and altitude) with reference to Scenario 1 (or 2) shown in FIG. 7*c*, the remote server (or robot's regulating chip) receives the generated condition or constraint, e.g. D03 (or E03), usually, in advance.
  For real-time position data information (e.g. collocated location module), the robot may receive the broadcasting device's transmission.
  For real-time profile recognition: robot may capture the profile, it be recognised locally (e.g. by regulating chip), then a determination made whether the profile is conditioned or constrained. In another embodiment, the robot captures but then communicates the capture data information to a remote server for processing (i.e. recognition or querying); if the profile is conditioned or constrained then a regulated response may be issued or no response.

The systems, methods, computer programs, data signals and apparatuses which may facilitate exclusion zones include those technologies deployed for Airborne Collision Avoidance Systems (http://en.wikipedia.org/wiki/Airborne Collision Avoidance System). Examples (non-limiting), include:
  (1) Traffic alert and Collision Avoidance System (TCAS) http://en.wikipedia.org/wild/Traffic Collision Avoidance System;
  (2) Portable Collision Avoidance System (PCAS) http://en.wikipedia.org./wiki/Portable Collision Avoidance System;
  (3) FLARM http://en.wikipedia.org/wiki/FLARM;
  (4) Terrain Awareness and Warning System (TAWS) http://en.wikipedia.org./wiki/Terrain awareness and warning system;
  (5) Obstacle Collision Avoidance System (OCAS) http://en.wikipedia.org/wiki/Obstacle Collision Avoidance System Profile Recognition The main differences with exclusion zones being facilitated via Profiles rather than collocated location module or fixed coordinates and altitude include the substitution of position announcing transmitting devices and signals with Profile recognition technology and the generation of a prescribed exclusion zone around that recognised Profile, which may be facilitated within the robot's Geospatial Information System (GIS), navigation and path planning system.

Returning now to FIG. 8, there is shown a diagram illustrating a number of clients, user devices and robots. A client 111 selects privacy constraints, which are transmitted via a communication network 60 and, through server 100*a*, to a plurality of robots 210*a*, 210*b* and 210*n*. The privacy constraints are filtered by the system such that only robots that are participants in the network receive the privacy constraints. As can be seen, non participant robot 210*c* does not receive the imposed privacy constraints.

Similarly, user device 110*b* which is a non participant does not receive the imposed privacy constraints. However, user devices 110*a* and 110*n* do receive the privacy constraints.

Figure 9:
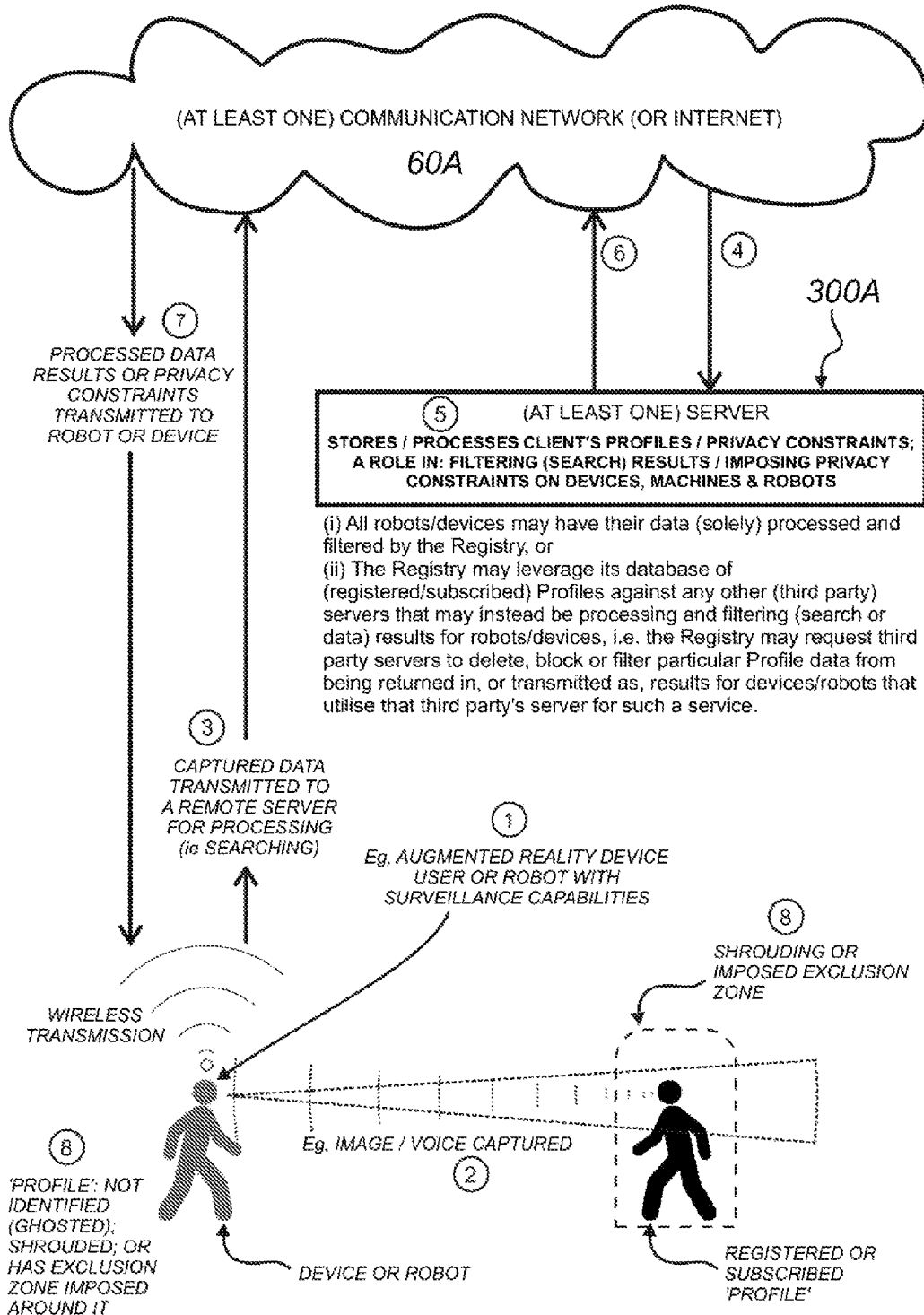
FIG. 9 is a stylised diagram depicting a series of computer implemented process flows with regard to excluding, ghosting and shrouding processes in accordance with an embodiment of the invention.

Referring now to FIG. 9, there is shown an example of how exclusion, shrouding or ghosting operates in practice. The registry may utilise its resources to exclude spaces from being travelled (or traversed) by robots, essentially by enacting 'no go' or 'no fly' zones, for example, that robots obey. Additionally, other devices or machines may also be regulated, by not being permitted to operate unencumbered within or near these exclusion zones. These devices or machines may be caused to switch off or reduce functionality.

In one embodiment, the Registry's server implements an exclusion zone and all robots must adjust their subsequent travel plans and tracks accordingly.

In addition there may be provided a software application for robots that prevent any (on-board) equipment (e.g. cameras) from conducting surveillance operations when faced or encountered with a shrouded zone to protect, for example, public privacy.

In more detail, before explaining the process flow of FIG. 9, it will be understood that when a participating robot or device captures a registered Profile (not limited to a tangible object, such as a person) the data captured would trigger, upon processing, that it is privacy registered and then that subject is instantly shrouded (e.g. blurred). Profiles may be stored and processed locally, on participating robots or devices (reducing lag or latency times), or remotely, stored and processed on, for example, the Registry's cloud servers. Not storing such data on non-registry devices or robots would be preferred in order to securely maintain (a client's) sensitive Profile data.

In another embodiment, select Profile data is stored (and processed) locally of a user's devices or robots. For example, the registry may transmit to participating robots and devices Profile data of registered clients (subscribers) present in the vicinity of those participating robots and devices. So if they were to encounter each other (i.e. come into capture view) then these privacy measures could be effected. Then, once participating robots or devices have moved away from a registered client, that client's Profile data is deleted from those robots and devices. This embodiment would help ease the latency problem, by storing and processing data locally, and slightly solve the issue of having sensitive Profile data (of others) stored and processed locally, rather than just by the Registry's servers.

Profile data is stored, processed and filtered (with respect to database queries) in any number of manners. For example, the end user's device or robot may locally store a copy (and receive relevant updates) of all database Profiles; and the device or robot may subsequently process and filter such queries as well.

In one embodiment of the invention, the user may be presented with a map (that is at least one-dimension), however, preferably a three-dimensional mapping computer program like one or more of the following: Bing 3D Maps; Placebase; Google Tour Guide or Maps GL, 3D Maps Mobile; Amazon's UpNext app; Whereis 3D City Models; Uniden TRAX 5000; Aviation Mapper; Nokia 3D Maps (e.g. Ovi), and so on.

The user would be presented with the opportunity to select in the map (by directing a mouse cursor or equivalently operable pointer) areas or spaces, perhaps, by dragging the cursor or pointer across a screen or by using gesture control, voice commands or other effecting action that may be or become applicable methods from time to time.

One example of shrouding would be a resident wishing to shroud their apartment's windows and balconies from robot surveillance (perhaps, aerial robotic devices), would access the system, locate their property's windows and balconies, drag the cursor over those areas or spaces to shroud (that may be illustrated on-screen by a size-changing rectangle or rectangular prism), confirm selection, enter and accept payment terms, confirm transaction, shrouding effected with specified timeframe.

Only applicable or allowable zones may be available for selection by the user. For example, parties may not have the option available to select a space that they do not have control over, do not own or are not named on the land's title. If a party selects a zone for exclusion (i.e. to prevent other robots from travelling in this space or on this area) and this zone not be a space legally associated with the party, for example, then to prevent robots that are related to a party legally associated with that space (due to the exclusion imposed by the other disassociated party) those robots may be approved to override such imposition. There is a need to account for antagonists, i.e. dissociated parties that may attempt to prevent other parties' robots from genuinely accessing or travelling in a particular space.

Referring now to FIG. 9, at step 1, an augmented reality device or a robot with surveillance capabilities captures data, which may be image or voice data at step 2. At step 3 the captured data is transmitted to a remote server for processing via the communications network 60a. The captured data is received at step 5 by at least one server such as server 300a and the data is stored and compared against privacy constraints. At step 6 the data is uploaded through the communication network. At step 7 the processed data is transmitted to the robot or device, so that appropriate action may be taken by the robot or device at step 8.

Figure 9A:
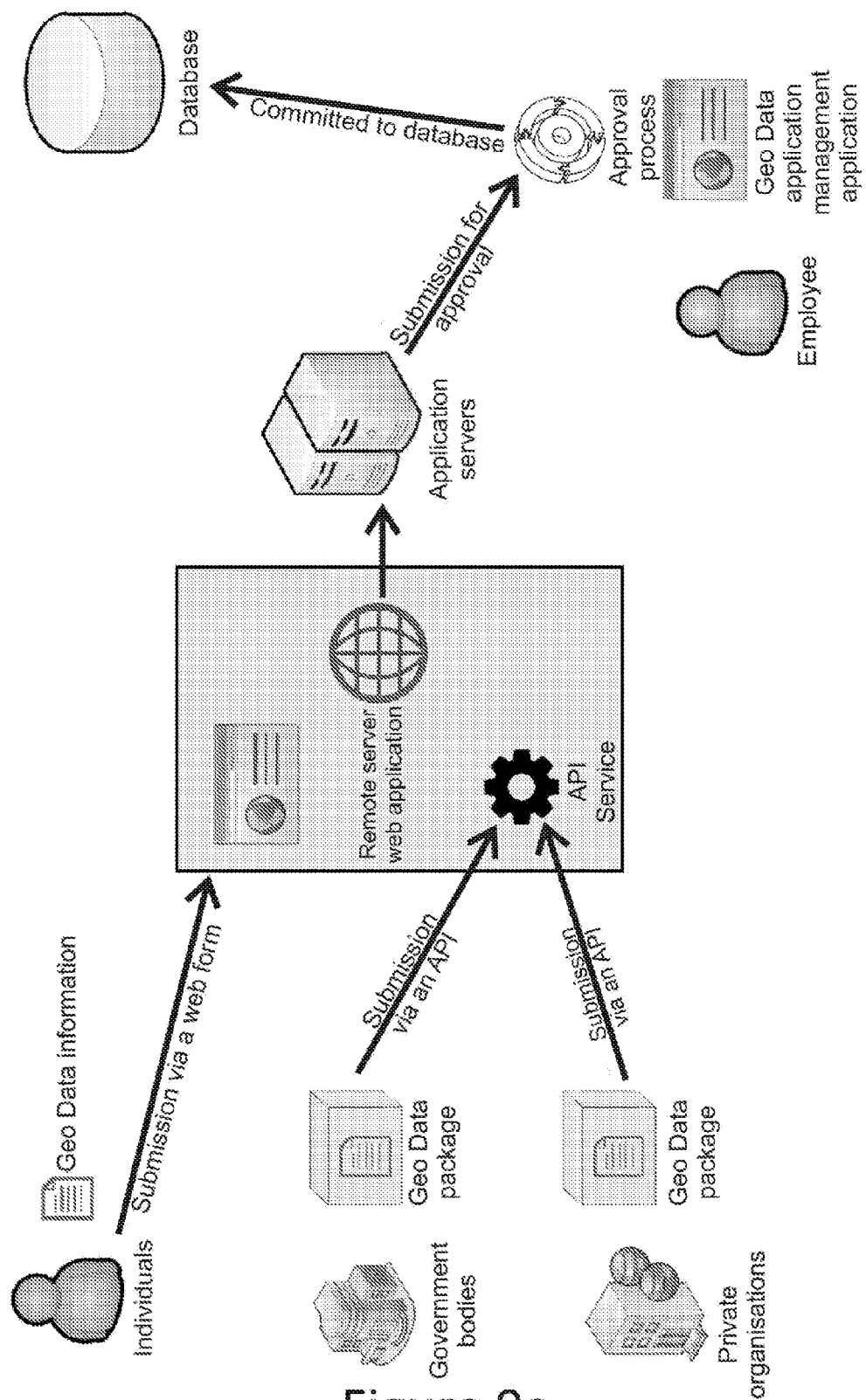
FIGS. 9a to 9c are diagrams illustrating a computer implemented process in accordance with an embodiment of the invention.
Figure 9B:
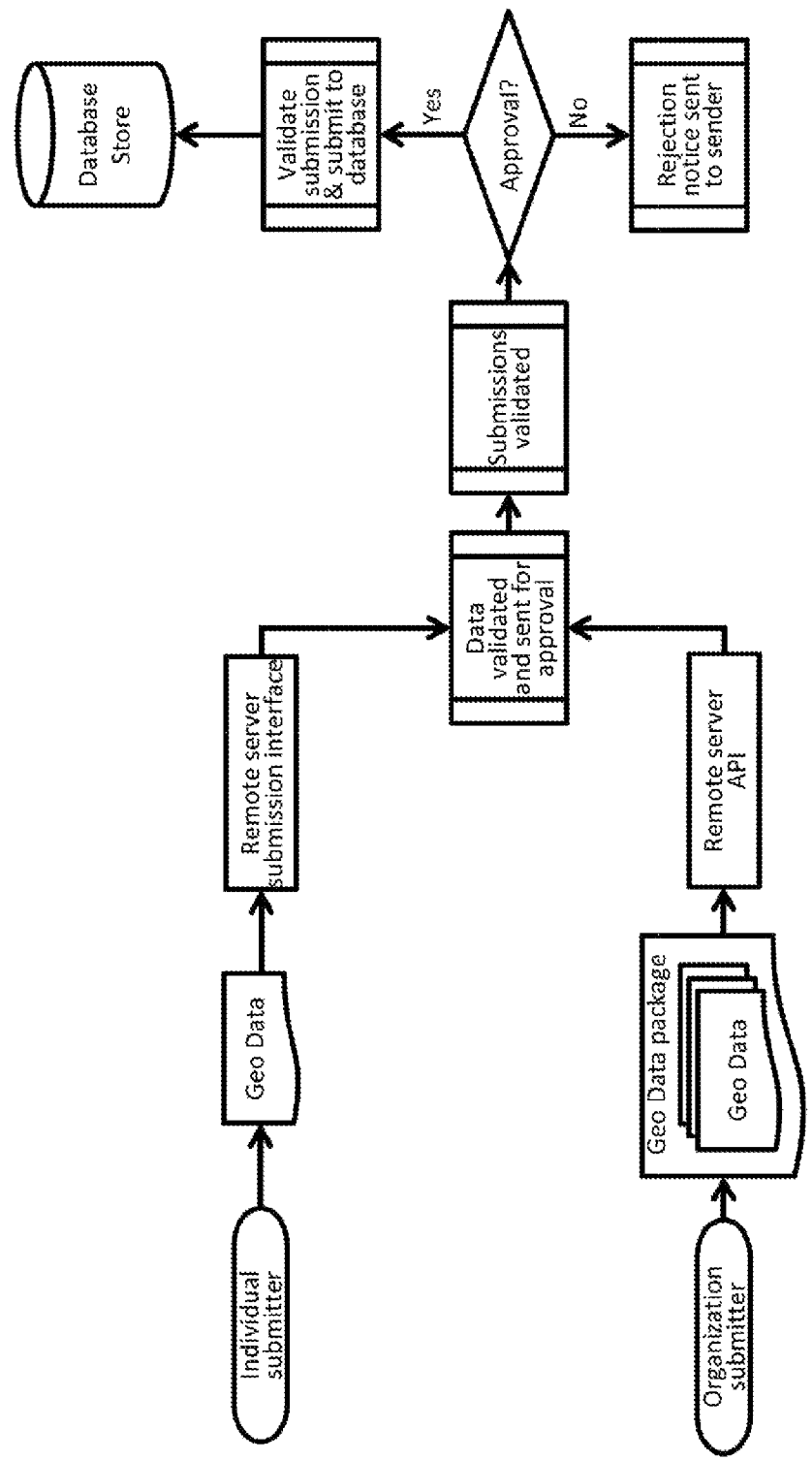

Referring now to FIGS. 9a and 9b, there is described an example of how exclusion zones may be created (e.g. how specific areas/volumes of a town are designated as non-operational areas to robots).

The remote server (Robot Registry) is responsible for ensuring all exclusion zone data is updated and maintained. This data arrives from various sources such as public aviation departments, defense departments, LEO groups, corporations and individuals. An exclusion zone (e.g. 'no fly zone') consists of various pieces of metadata that includes the following:

Geo-location data that defines a three-dimensional volume mapped against the surface of the earth;
Times that the condition or constraint is in place;
Dates that the condition or constraint is in place;
Specifications of what the exclusion zone applies to. For instance robots over a certain size/speed capability;
Explanation for the condition or constraint; and Body/individual that requested the condition or constraint.

The remote server allows data to be submitted via secure web forms or via automated Application Programming Interfaces, within the remote server web form interface individuals could enter data in several ways. Data is entered as a series of GPS locations creating a closed loop or a map could be displayed allowing the individual to plot the closed loop over the map. Once submitted a remote server validates geo-data and approves it for submission to the exclusion zone database. Additional screens allow for the editing and configuration of this data as required by remote server staff. Alternatively, once submitted, the remote server's automated assessment programs may determine suitability for approval.

To create an accurate three-dimensional volume all data is GPS based including altitude values. A default height may be applied to the zone.

The user can use any tool that creates a valid set of GPS coordinates which form a loop, or alternatively they could utilise an online mapping interface provided by a remote server (Robot Registry).

One example of an online mapping interface is Google Maps developer API. Specific information on the capabilities can be found here https://developers.google.com/maps/.

Figure 9C:
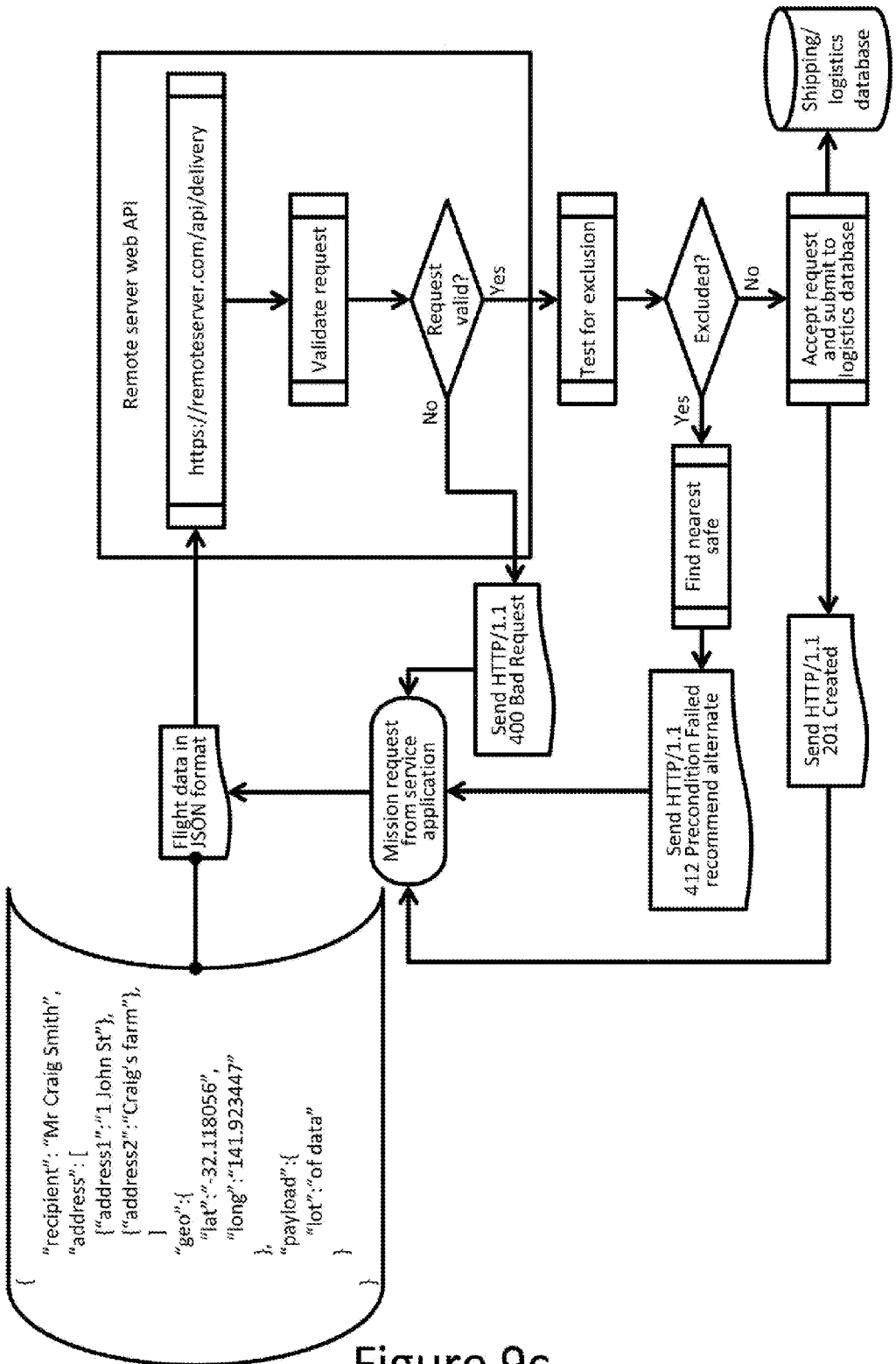

Referring to FIG. 9c, a user or service provider sends to the remote server the Intention request which holds the GPS location of the target landing site. This data is presented in a JSON compatible format and matches the remote server API requirements or is rejected. A typical request looks as follows:

```
{
    "recipient": "Mr Craig Smith",
    "address": [
```

```
        {"address1":"1 John St"},
        {"address2":"Craig's farm"}
        ],
    "geo": {
        "lat": "-32.118056",
        "long": "141.923447"
    },
    "payload": {
        "lot":"of data"
    }
}
```

The remote server processes this request to identify if it exists within its known database of exclusion zones.

If the destination is within an exclusion zone a rejection is sent and alternatives offered, such as nearest possible safe point or choice to abandon the request. If the destination is approved then a confirmation is sent approving the request.

Figure 10:
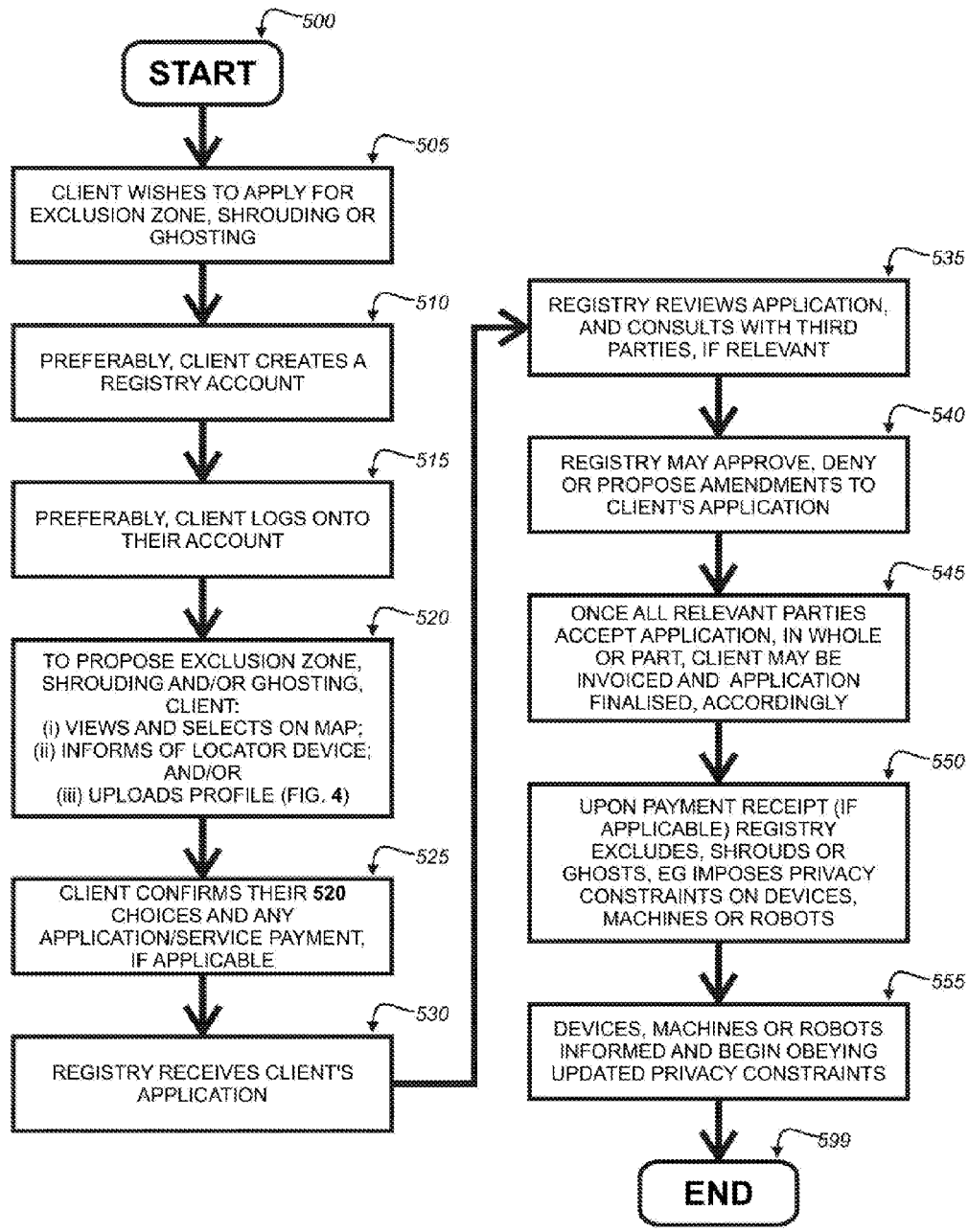
FIG. 10 is flowchart depicting a computer implemented process for creating an exclusion, shrouding or ghosting zone in accordance with an embodiment of the invention.

This process is described further with reference to FIG. 10. FIG. 10 illustrates a process flow, where a client wishes to apply for exclusion zone, shrouding or ghosting services at step 505. At step 510 the client creates a registry account if one does not exist and at step 515 the client logs onto their account. At step 520 the client is given the option or proposing exclusion zone, shrouding and/or ghosting options, which may be facilitated via the use of selecting, on a map, the area the client wishes to shroud, the area the client wishes to set as an exclusion zone.

At step 525, the client confirms their choices and any payments necessary. At step 530 the registry receives the client's application and step 535 the registry reviews the application and consults with third parties if relevant.

At step 540 the registry may approve, deny or propose amendments the client's application and, once all relevant parties accept the application at step 545, the client is invoiced and the application finalised.

At step 550 upon payment receipt, the registry takes the necessary action to update the database to exclude, shroud or ghost the area, device, machine or robot.

The devices, machines or robots are informed and begin obeying the updated privacy constraints.

In very select circumstances, waivers are obtainable to allow robots and participating devices to not be constrained by the 'privacy protocol'. In one embodiment, 'exclusion zones', 'shrouding (fixed)' and 'Profile shrouding (mobile)' may be waived for approved parents (running approved dedicated apps), so parents may monitor their children, for example:
  (i) Parents would apply to the registry for a waiver;
  (ii) Optional: parents would provide registry their child's Profile;
  (iii) Parents' granted waiver.

Another aspect of the invention to ultimately restrict unencumbered operation or function (e.g. surveillance) opportunitiesit will be understood that the user may be provided with a time-limiting camera viewing (perhaps, when travelling in a particular class of exclusion zone). After the permissible time has expired a latency period may apply before the user is permitted another timed viewing, for example.

Figure 11:
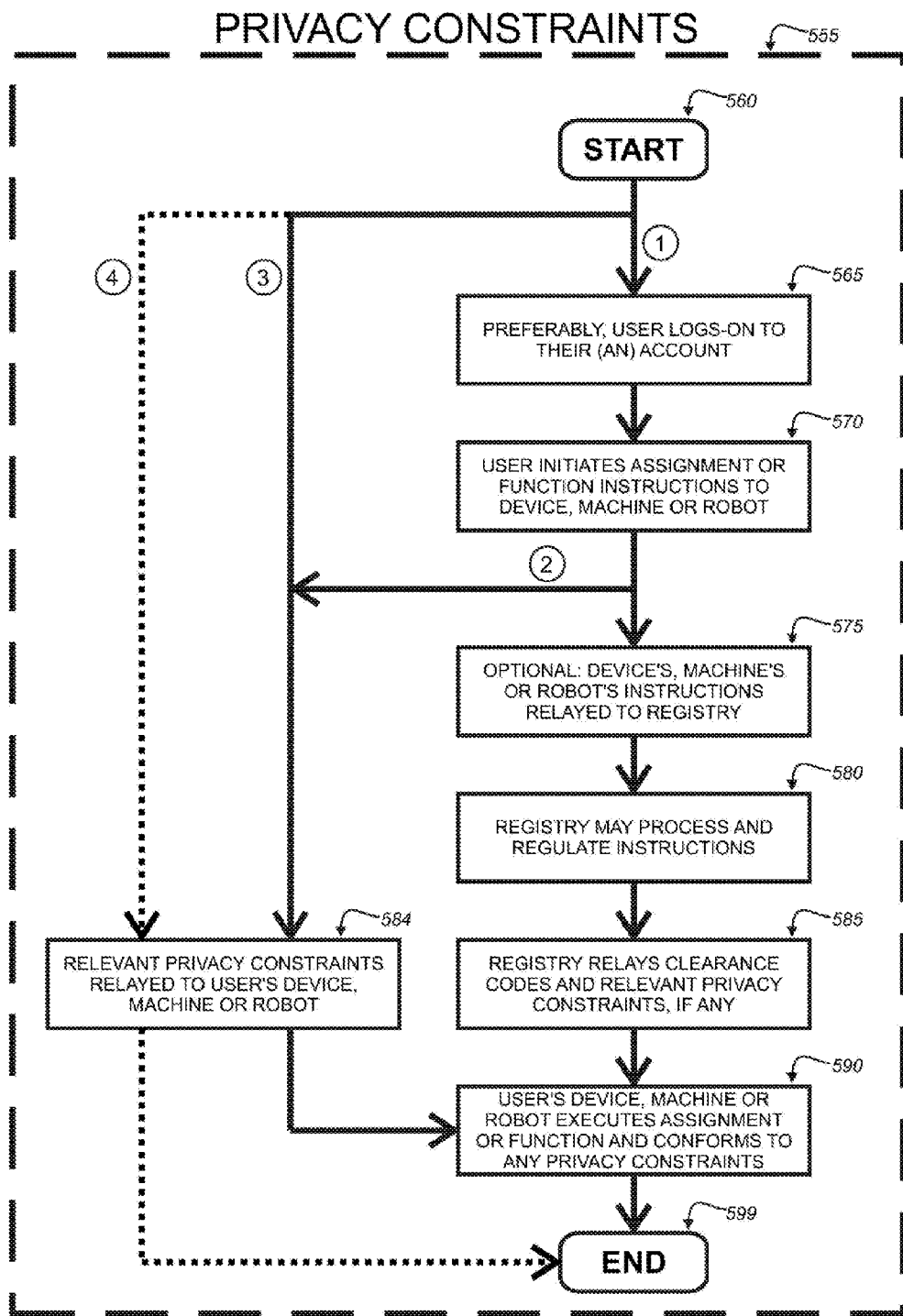
FIG. 11 is a flowchart depicting a computer implemented privacy constraints process in accordance with an embodiment of the invention.
Figure 11C:
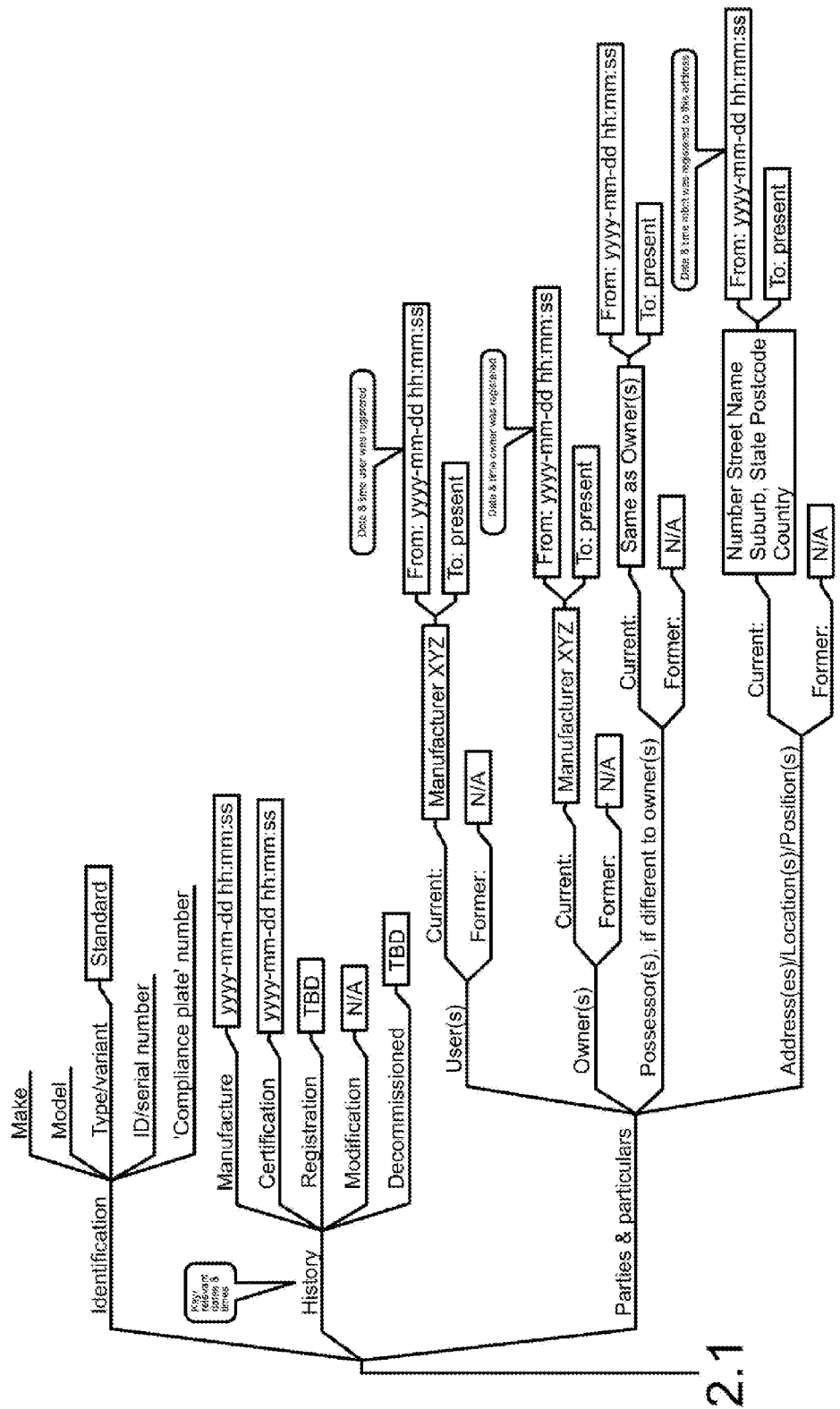
Figure 11D:
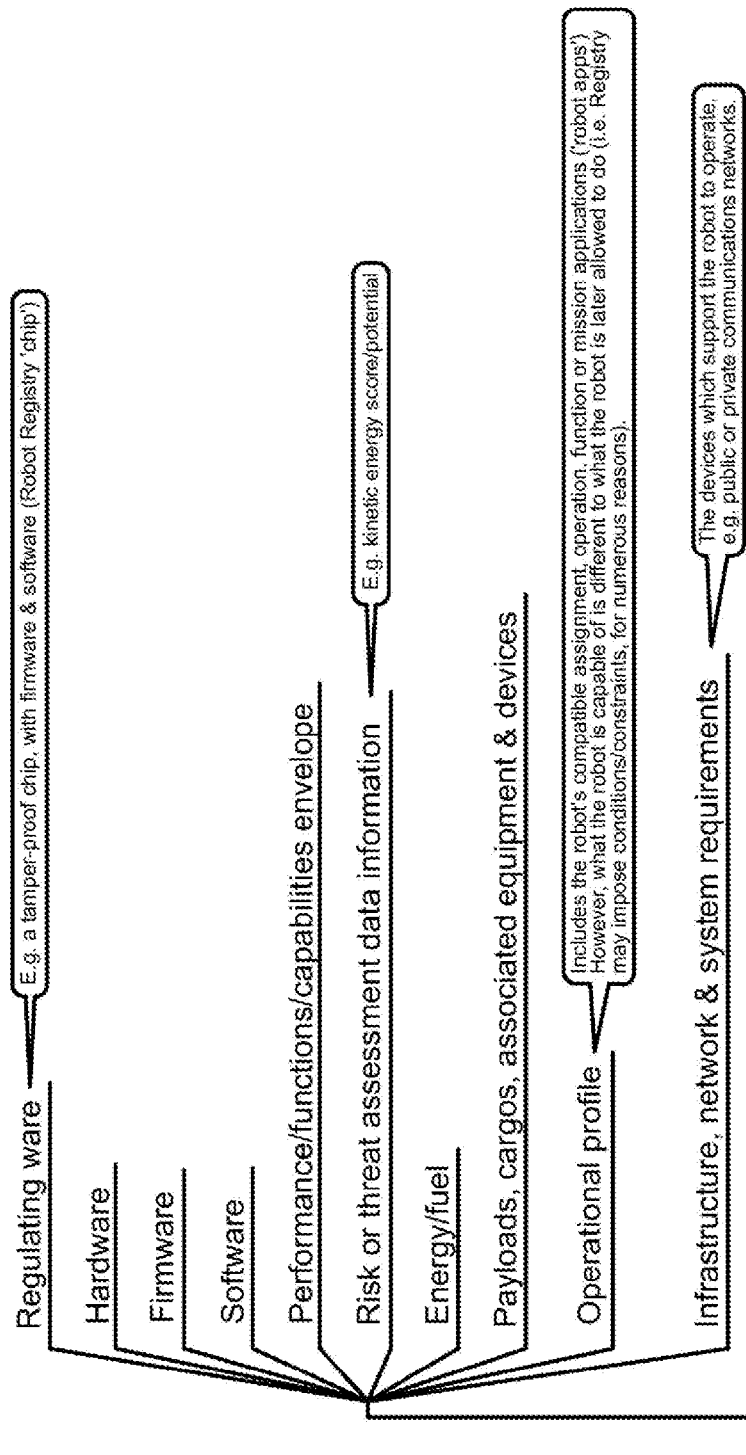
Figure 11E:
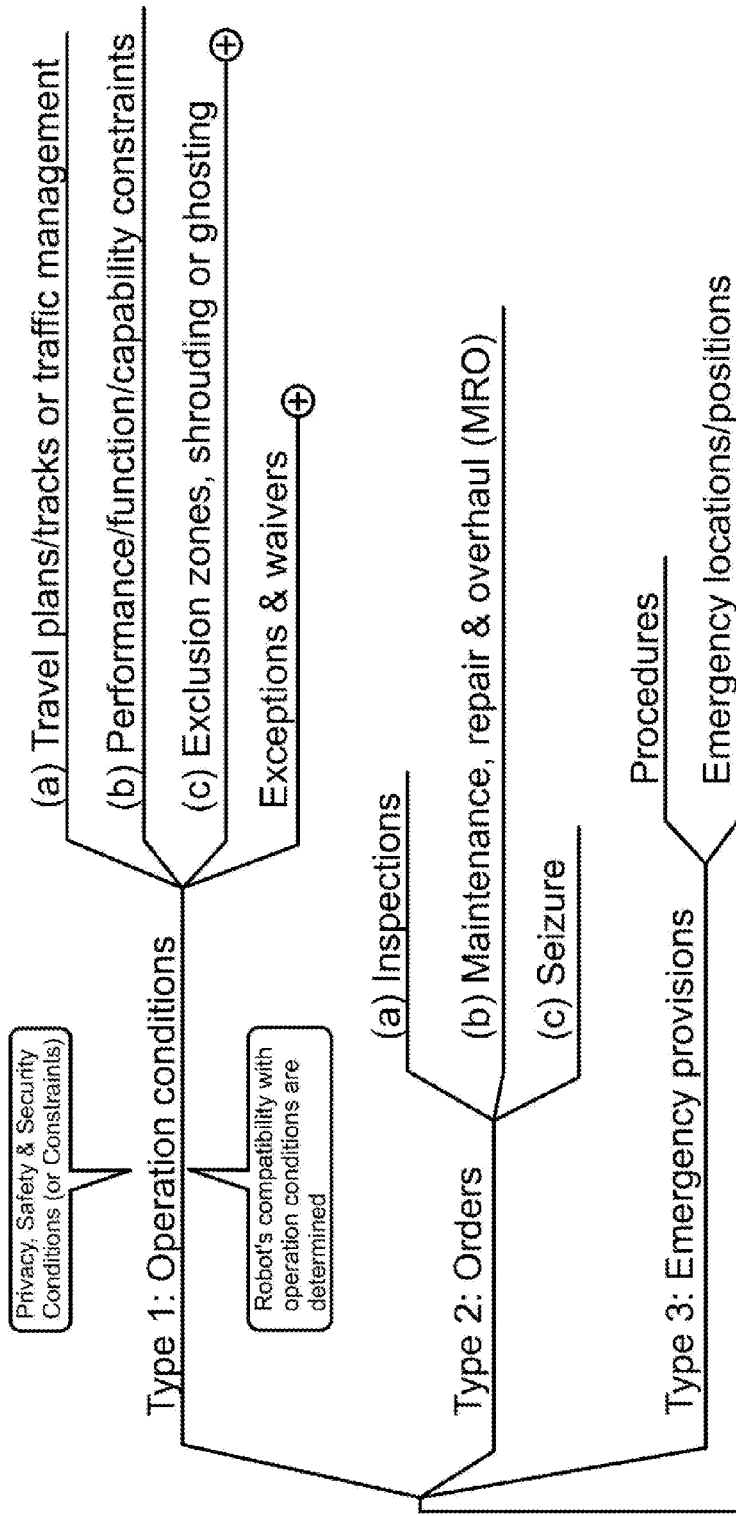
Figure 11F:
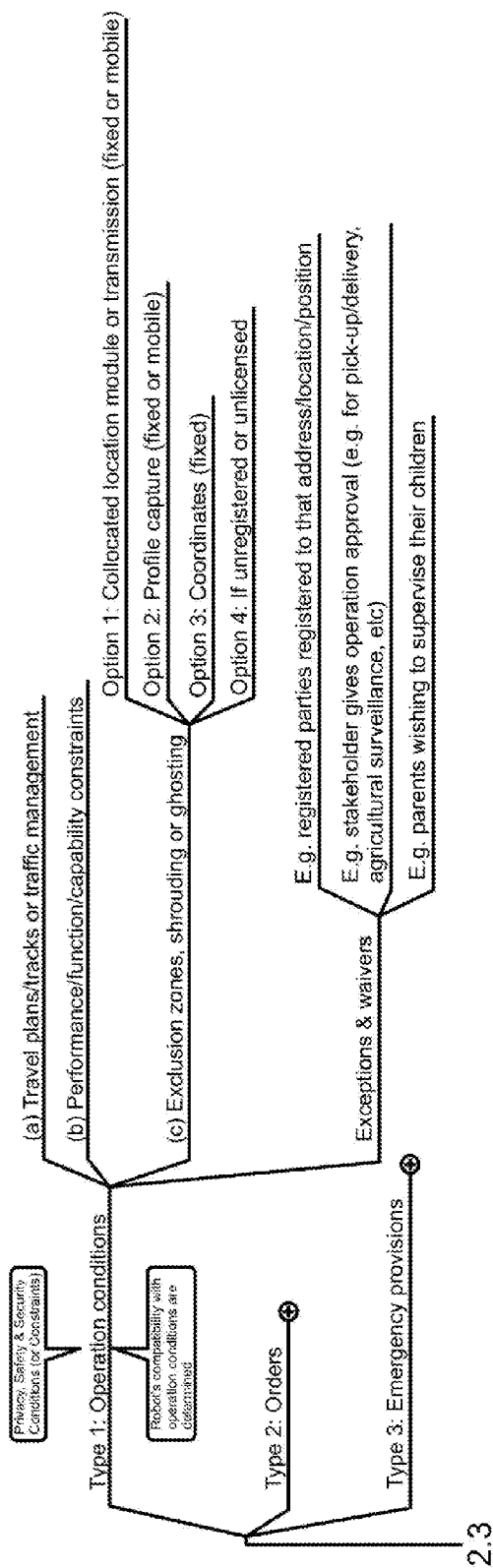
Figure 11G:
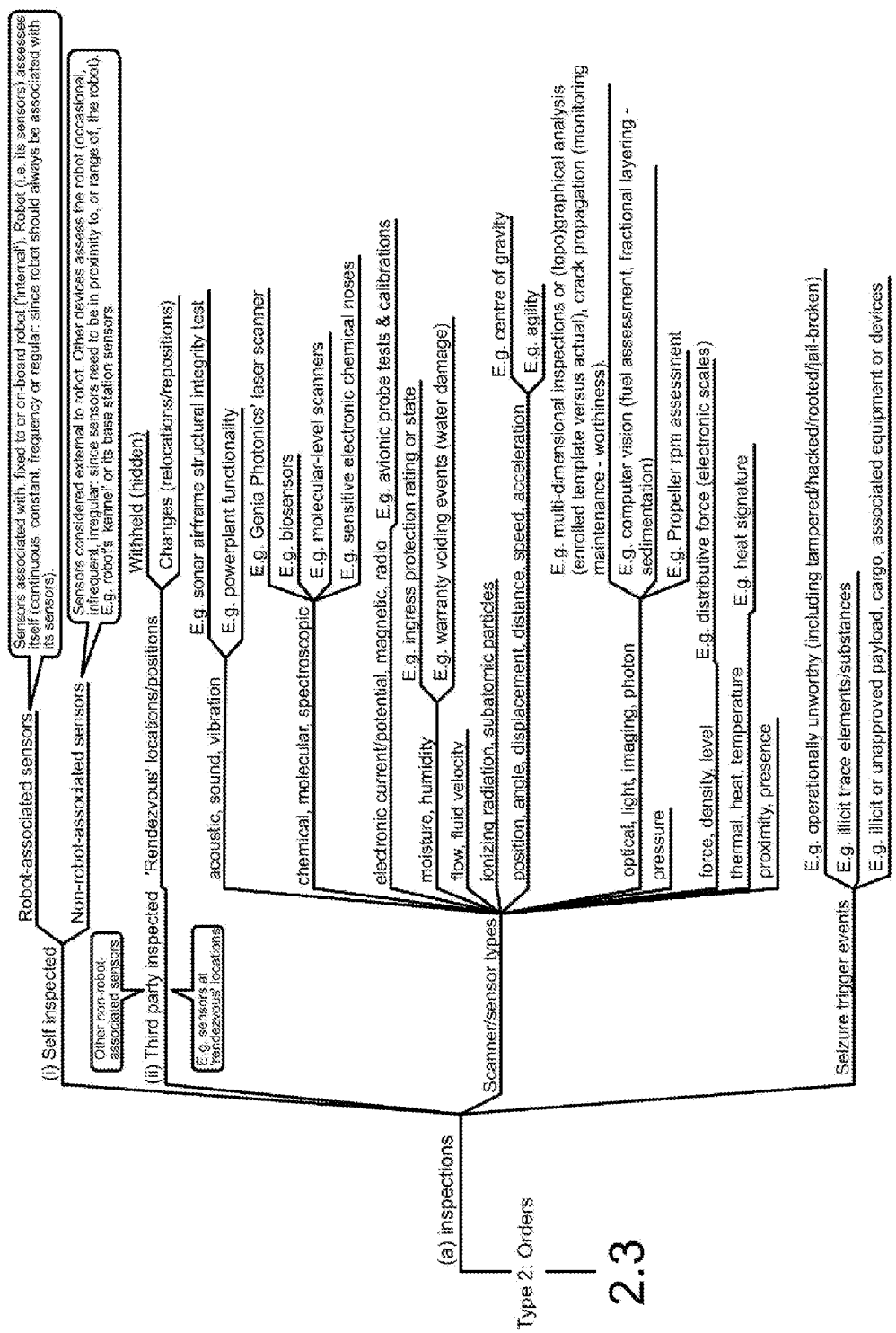
Figure 11H:
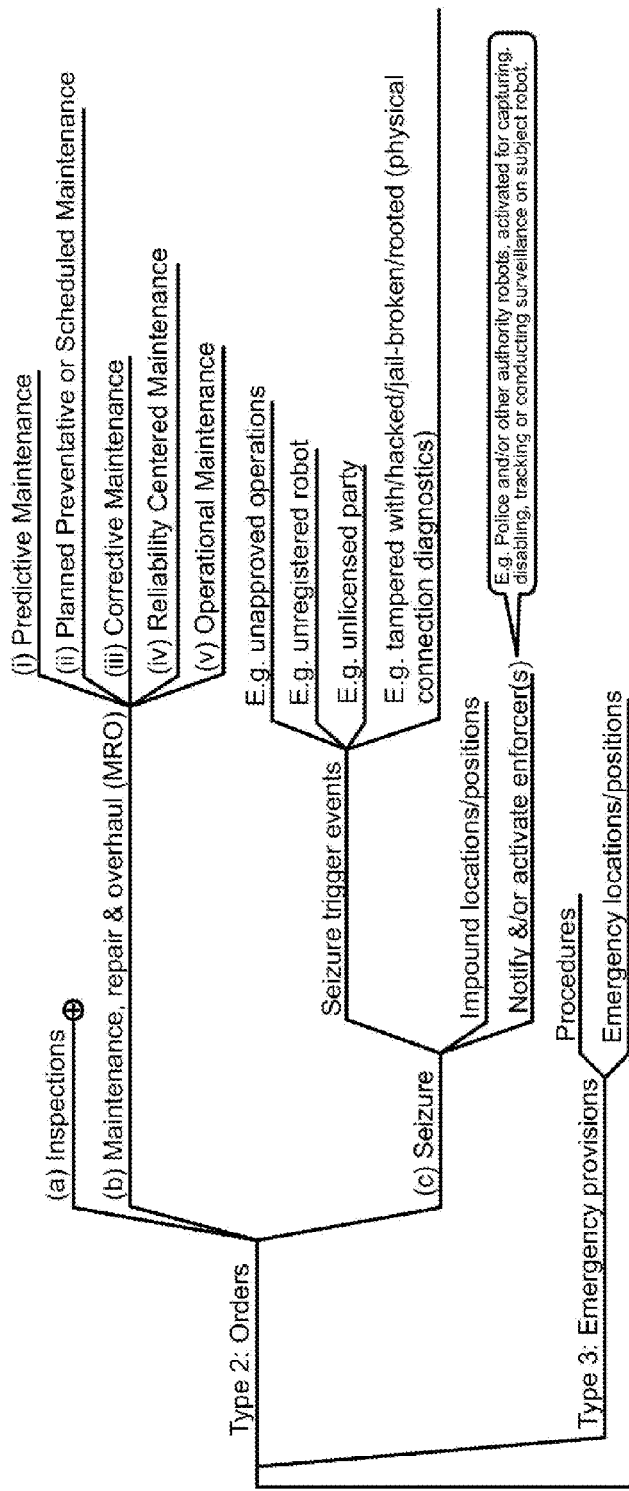
Figure 11I:
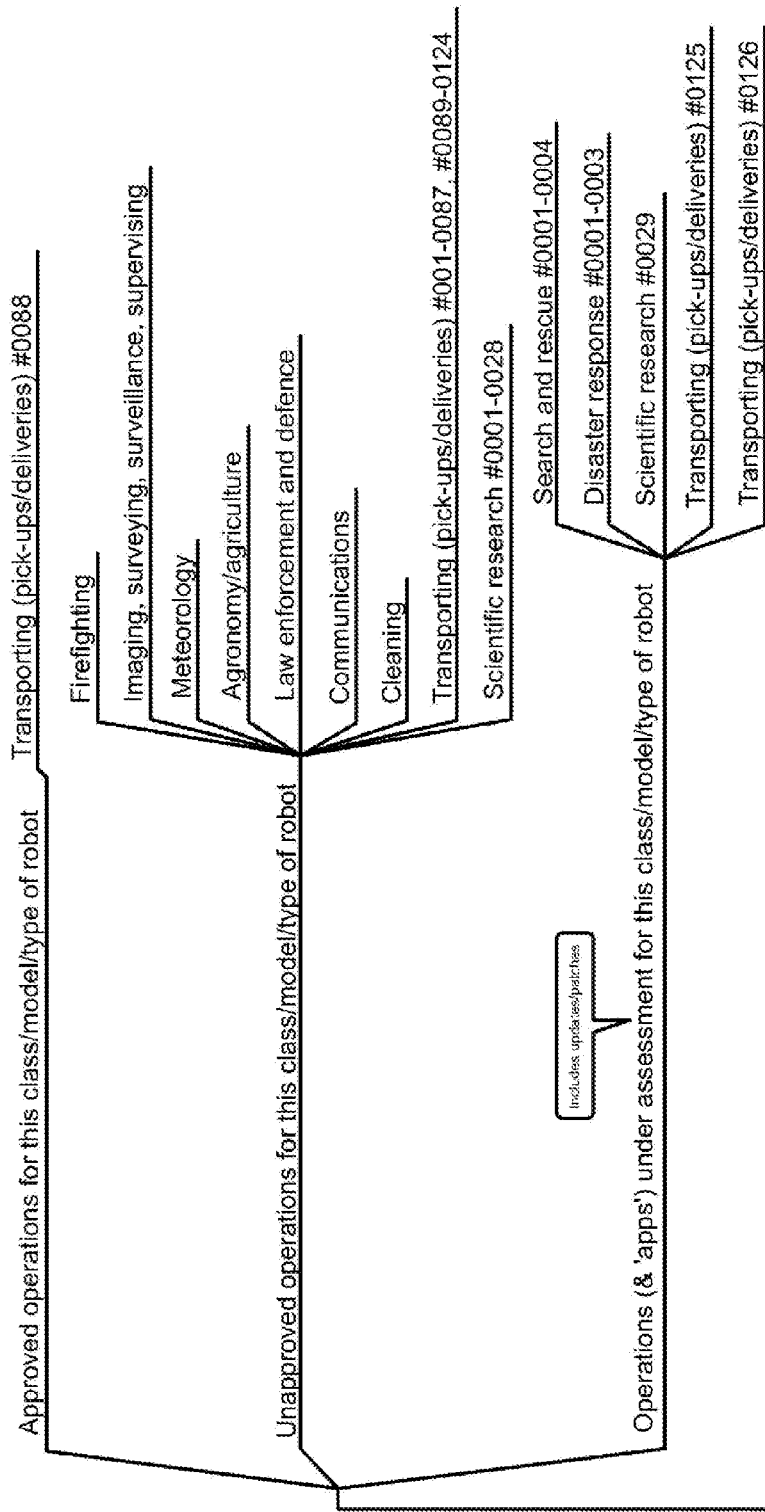
Figure 11J:
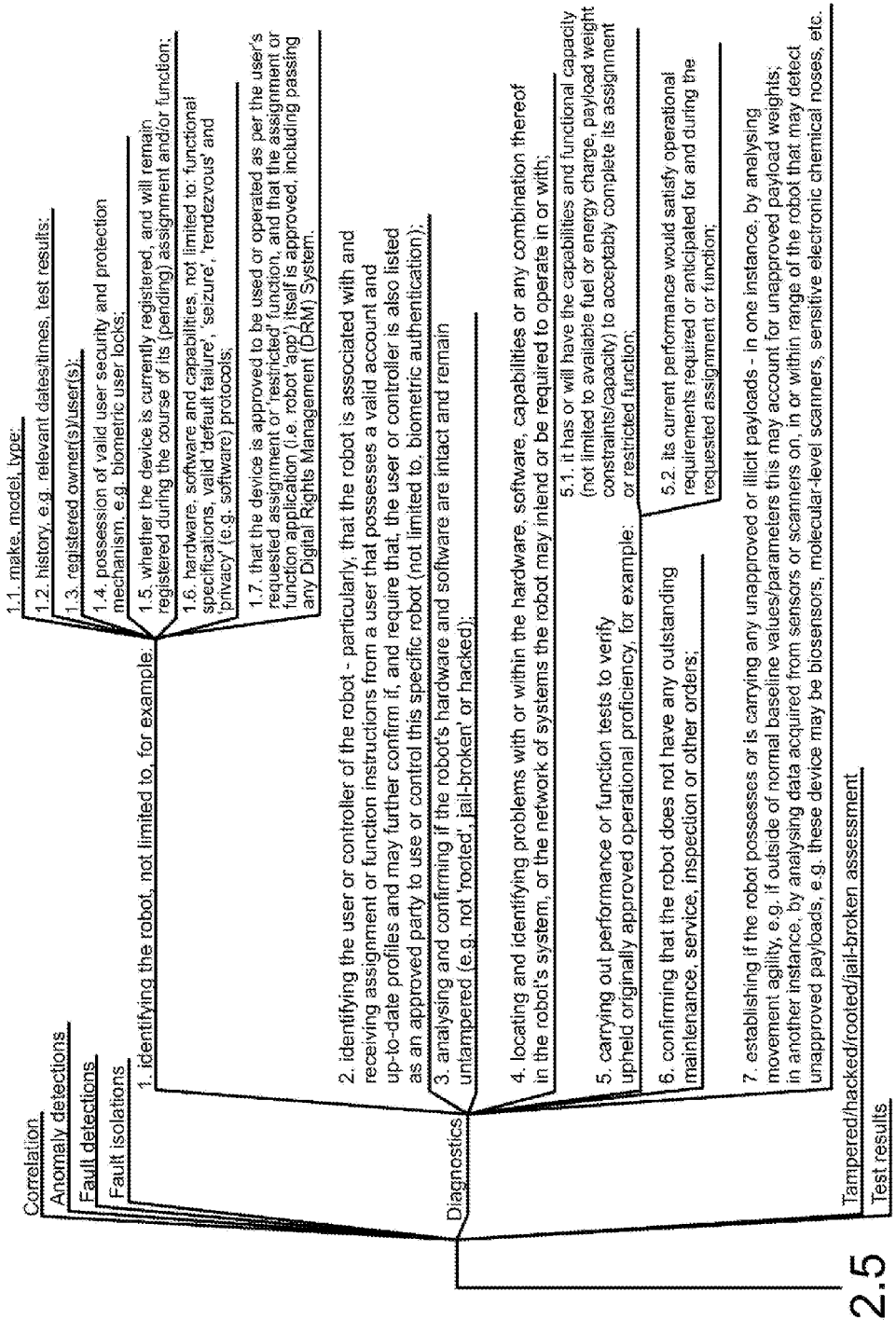
Figure 11K:
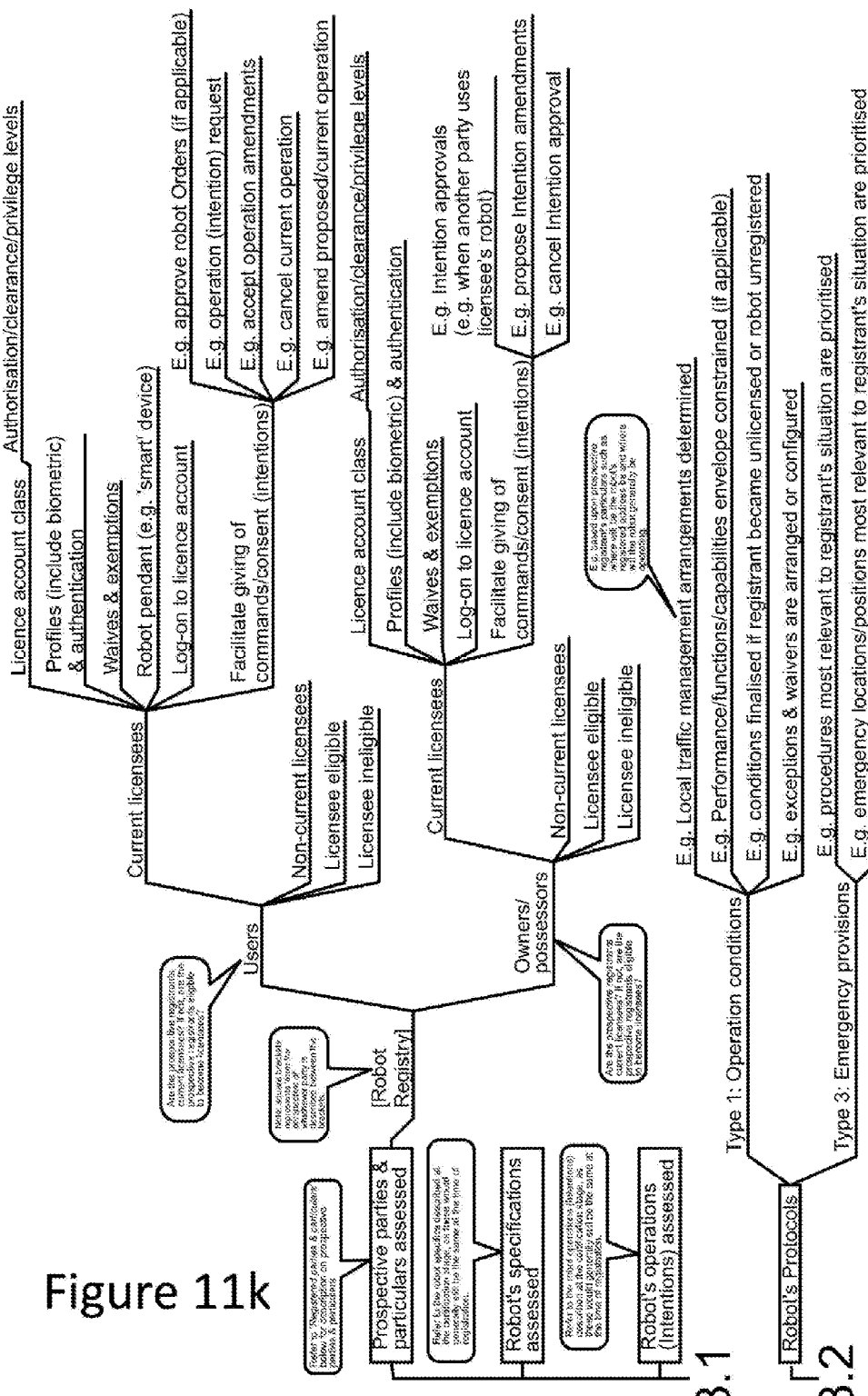

Turning to FIG. 11, the process flow for privacy constraints is described in more detail. At step 565, the user logs onto their account and at step 570 the user initiates assignment or function instructions to the device, machine or robot. At step 575 the device, machine or robot instructions are relayed to the registry and consequently at step 580 the registry may process and regulate any instructions.

At step 585, the registry may relay clearance codes and relevant privacy constraints if any to the devices, machines or robots and at step 590 the user's device, machine or robot executes the assignment or function and conforms to any privacy constraints.

It will be understood that in other embodiments, indicated generally by arrows 2, 3, and 4, variations on the process flow are possible. For example, in accordance with process flow 2, when a user initiates an assignment or function instructions, at step 570 the relevant privacy constraints may be relayed to the user's device, machine or robot directly, at step 584 and the robot subsequently executes the assignment or function, conforming to any privacy constraints at step 590.

Alternate embodiments are also envisaged, where the user is not required to log into their account or to initiate an assignment or function. As shown generally by process flows 3 and 4, privacy constraints may be relayed to the user's device, machine or robot. These privacy constraints may then be utilised to either perform a function as shown at step 590 or may simply be added to the robots store of information, for future use. The process flows shown generally by process flows 3 and 4 may be used in embodiments where instructions may be issued directly to the robot and not sent via the registry.

Referring to FIGS. 11a through to 11k, there are disclosed several computer implemented processes through which the policing process may operate. FIG. 11a describes a Broad Process for Policing. The process steps are described briefly below.

Broad Process Steps (Policing)
1. Generate
   Generate Policing Initiative
   (1) A template is generated through the use of 'robometrics' (i.e. the collection of data when the when robot was enrolled at certification). Testing is preferred to detect the presence of an illicit substance or object (e.g. chemical, molecular or tangible signature), such as a weapon or dangerous device.
   (2) A 'hail' signal is generated (e.g. identification request).
   (3) A 'scene screen' is generated (e.g. search for or identify non-participants or 'rogue' robots). This step is explained in more detail with FIGS. 14, 15 and 16.
2. Assess (Optional)
   (1) The enrolled template is tested to see if it matches a newly captured sample. For example, if a sample matches an enrolled template for an illicit or unapproved substance or object, or abnormal or unacceptable robometric, then this results in an enforcement trigger event.
   In another example, if a sample matches an enrolled normal or acceptable robometric, then this does not result in an enforcement trigger event.
   In yet another example, if a sample does not match an enrolled normal or acceptable robometric i.e. is outside tolerance or exceeding threshold, then this results in an enforcement trigger event.
   (2) Has a satisfactory reply response been received? If no satisfactory reply, an enforcement trigger event occurs. Trigger events could include the fact that the robot is unregistered, has unapproved operations, or is operationally unworthy (e.g. faulty).
   (3) Is there extraneous robots in a scene, e.g. present in scene but no entry in Travel Plans/Tracks Database results in an enforcement trigger event? For example, no transponder signal results in an enforcement trigger event.

3. Respond

Respond with Enforcement and/or Notify

Passive enforcement strategies may include:

seizing the robot (e.g. generate performance/functionality/capability conditions/constraints such as do not operate further, remain at rendezvous location/position); or launching a policing robot, track/trace/follow (e.g. to facilitate locating and apprehending user).

Active enforcement strategies may include:

launching a policing robot, rendezvous with or near subject robot, capture (e.g. Grab or Net); or launching a policing robot, rendezvous with or near subject robot, disable/disarm (e.g. Jammer, Spoof, EMP or Projectile); and notify relevant stakeholders.

4. Amend (Optional)

Amending or revoking enforcement may include cancel enforcement pursuit (e.g. 'call off the chase'), call in reinforcements (e.g. more policing robots to assist), and/or revert to enforcement (e.g. trigger event)

Broad Process Steps (Conditions)

1. Generate

Generating condition/constraint may include generating performance/functionality/capability constraint (e.g. regulations may stipulate constraints due to license class, inadequate supporting infrastructure, network or systems, emergency provision trigger event and/or enforcement trigger event generates constraint).

Generated exclusion zone conditions may include:

collocated location modules or transmission (fixed or mobile) (real-time or 'space teach');

profile captures (fixed or mobile) (upload templates or PA/eL Profiles);

coordinates and altitude (fixed); and/or

'no fly zone' or do not operate zone (in full or in part);

Generated shrouding conditions may include:

'do not watch' or no surveillance;

collocated location module or transmission (fixed or mobile) (real-time or 'space teach');

profile capture (fixed or mobile) (upload templates or PA/eL Profiles); and/or automatically recognise windows; similar to blurring out faces in Google Street View.

Generated ghosting conditions may include:

'do not ID' or no on-screen or HUD 'tagging';

collocated location module or transmission (fixed or mobile) (real-time or 'space teach');

profile capture (fixed or mobile) (upload templates or PA/eL Profiles); and/or coordinates and altitude (fixed).

Generated condition/constraint waiver or exemption may include:

registered parties registered to that address/location/position;

parents wishing to supervise their children;

special permission (research purposes, government, etc.);

stakeholder gives operation approval (e.g. for pick-up/delivery, agricultural surveillance, etc.); and/or 'condition' and 'constraint' can generally be used interchangeably.

2. Assess (Optional)

Assessing generated condition/constraint may include detecting:

Is the constraint consistent with others?

Is the exclusion zone suitable?

Is the shrouding suitable?

Is the ghosting suitable?

Is the waiver or exemption suitable?

3. Respond

Responding by imposing condition/constraint may include:

performance/functionality/capability constrained;

exclusion zone parameters imposed;

shrouding conditions imposed;

ghosting conditions imposed; and/or waiver or exemption imposed.

Figure 12:
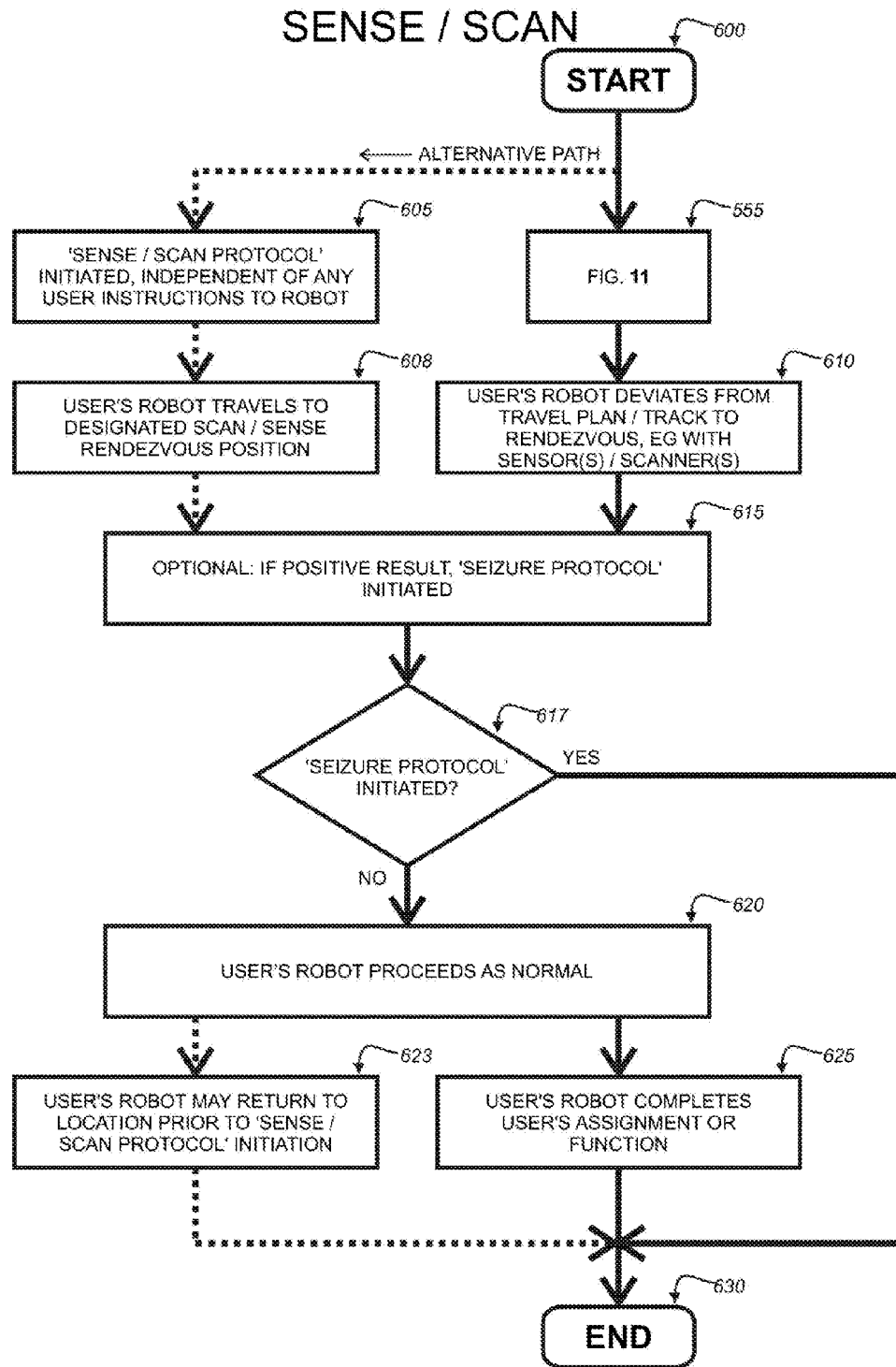
FIG. 12 is a flowchart depicting a computer implemented sense/scan process in accordance with an embodiment of the invention.
Figure 13:
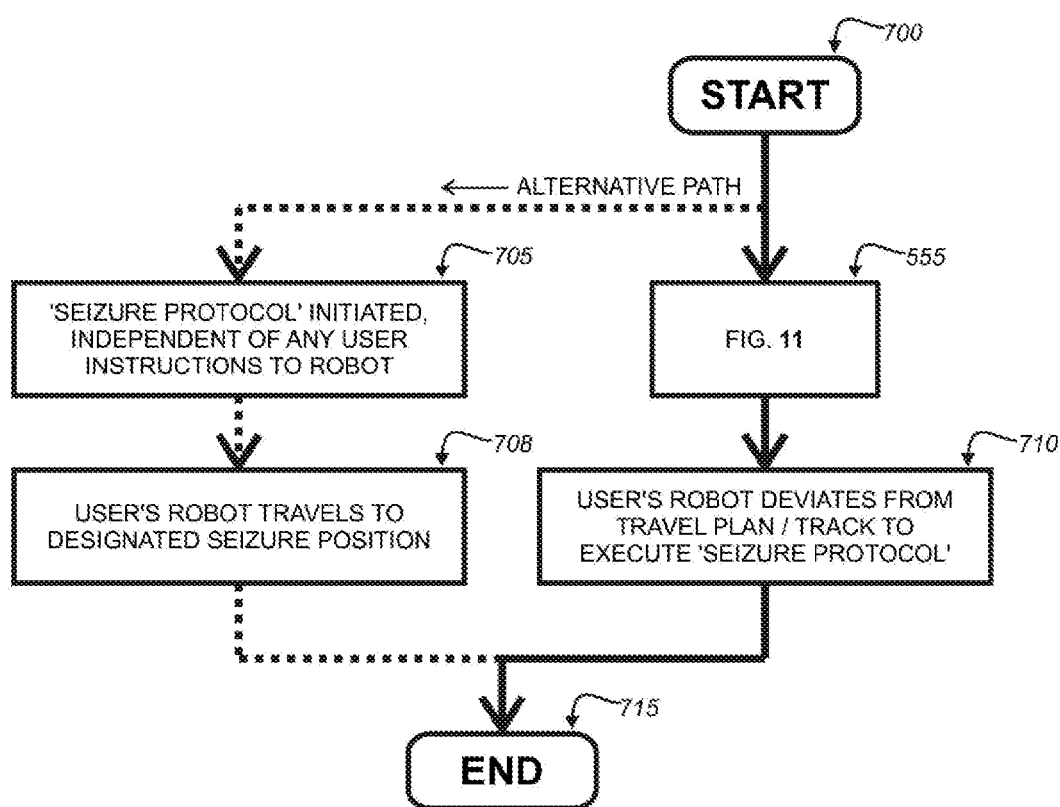
FIG. 13 is a flowchart depicting a computer implemented seizure process in accordance with an embodiment of the invention.

With reference to FIGS. 12 and 13, there may be provided mechanisms to allow for robots to be initially detected through a sense/scan protocol and to be subsequently seized using a seizure protocol.

Referring now to FIG. 12, there is shown a process flow for the process that occurs if a sense/scan protocol is initiated. A sense/scan protocol may be initiated as a result of the robot performing a function, such as the function process flow shown generally at FIG. 11 or a sense/scan protocol may be initiated independently of any user instructions to the robot at step 605.

At step 608 or 610, the user's robot becomes aware of a situation where a sense/scan operation is required.

If a positive result is achieved, at step 615 a seizure protocol may be initiated. If a seizure protocol is initiated at step 617 then the process of sense/scan ends at step 630. If a seizure protocol is not initiated then the user's robot proceeds as normal at step 620 and the user's robot may complete the user assignment or function at step 625 or alternatively the user's robot may return to the location prior to the sense/scan protocol being initiated at step 623 prior to the process ending at step 630.

Referring now to FIG. 13, there is shown a process flow for a seizure protocol, such as the seizure protocol referred to in FIG. 12. At step 555 or 705, a seizure protocol is initiated as a result of either an independent request or as a result of a sense/scan operation as shown FIG. 12. This may result in the user robot travelling to a designated seizure position at step 708 or the user's robot deviating from travel plans to execute seizure protocol at step 710. Once the seizure has been performed, the process ends at step 715.

A system that allows the registry to police the environment of robots that may be unregistered, unlawful, a danger to the public, an invasion to people's privacy or operating improperly, perhaps, even stolen. Herewith these robots will be referred to as 'rogue robots'.

The Registry's system utilises its monitoring, controlling and managing capabilities (not limited to the fact that it may oversee the travel paths and tracks of a vast variety of robots)—may, in one embodiment, grant it special abilities or opportunities to police the environment for rogue robots.

In another embodiment, the registry may 'discover' rogue robots by employing the assistance of non-registry robots (e.g. consumers' robots) operating in or near particular spaces. Preferably, consumers' robots may feed environmental data back to the registry or process environment locally then send results to the registry. In either method, the registry may utilise the on-board sensors and scanners of consumers' robots, specifically monitor their travel environment for rogue robots, i.e. robots that should not be encountered, perhaps, by the consumers' robot's 'anti-collision and avoid' detector or module.

This initiative of employing the help of consumer's robots may also allow the tracking of rogue robots that are initially detected. In one embodiment, as each consumer robot detects the presence or signature of a particular rogue robot the current position of each respective consumer robot that detected the rogue robot and/or the position the rogue robot was detected at by each consumer robot may allow track plotting (and this may be in multiple dimensions).

However, ghosting may also be applied to, preferably, tangibles that are recognised via other means, that is, not by Profile recognition methods. For example, a tangible may not be identified or tagged if it is located within a zone that has been excluded (perhaps, by a client selecting it on a 3D map) or if it is associated (e.g. collocated) with a location module device (e.g. smartphone with geo-location features).

In other words, the Registry's system may, in a first instance, 'spot' or identify all robots in a particular environment, then eliminate from its electronic field of view all robots that are registered or that are known to be operating there following the issue of clearance codes (i.e. removing robots that are not rogues). Thus, if there are any robots remaining after this elimination process, by deduction, the remaining robots may be deemed 'off the grid' or rogue operators.

In addition, the registry may conduct such investigations using a variety of methods. In one method, the registry deploys at least one robot of its own to track the rogue robot to its destination (hopefully, to where the user is located) or, perhaps, to (safety) deactivate the rogue robot using a number of means (e.g. one ideal embodiment may be overriding or 'spoofing' its communications system to inflict the Registry's 'seizure protocol').

The registry, over time, builds up a library or inventory of signatures (not limited to acoustic) for a variety of robots, such signatures may be assigned to particular robot types.

Figure 14:
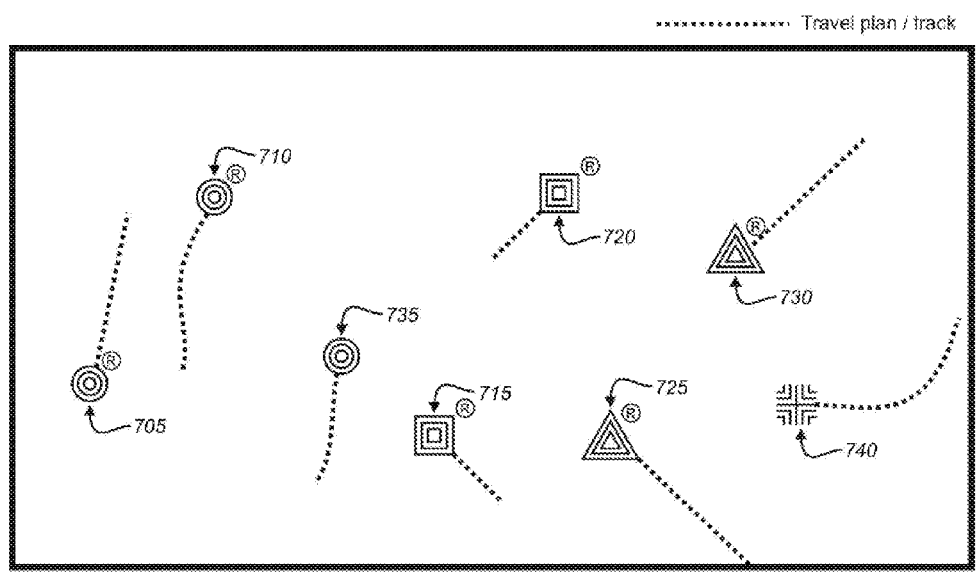
FIGS. 14 and 15 are stylised diagrams depicting a computer implemented identification process in accordance with an embodiment of the invention.

Referring to FIG. 14, there is shown an example of a two-dimensional environment with all detected robots identified pictorially by the Registry's system.

Figure 15:
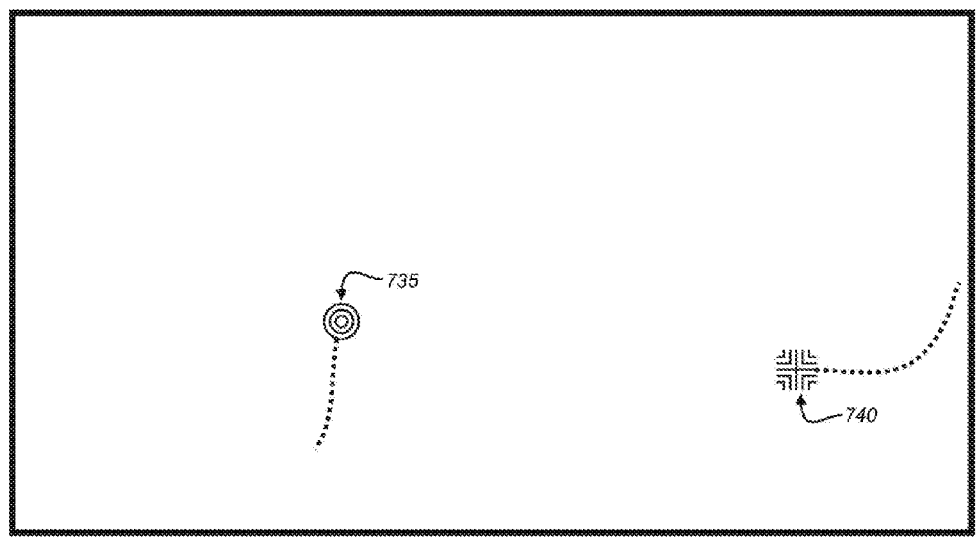

Referring to FIG. 15, there is shown an example of a two-dimensional environment with all registered or non-rogue robots eliminated from view (selectively removed) in order to show any remaining (rogue) robots.

Robots 735 and 740 remain in view. These robots are deemed not registered. Further, rogue robot 740 has been listed as having an unrecognizable signature (illustrated by its unique symbol). Whereas 735 was detected as having a familiar signature, was listed as being a 'Concentric Circle' Type robot, according to the Registry's database analysis.

Figure 16:
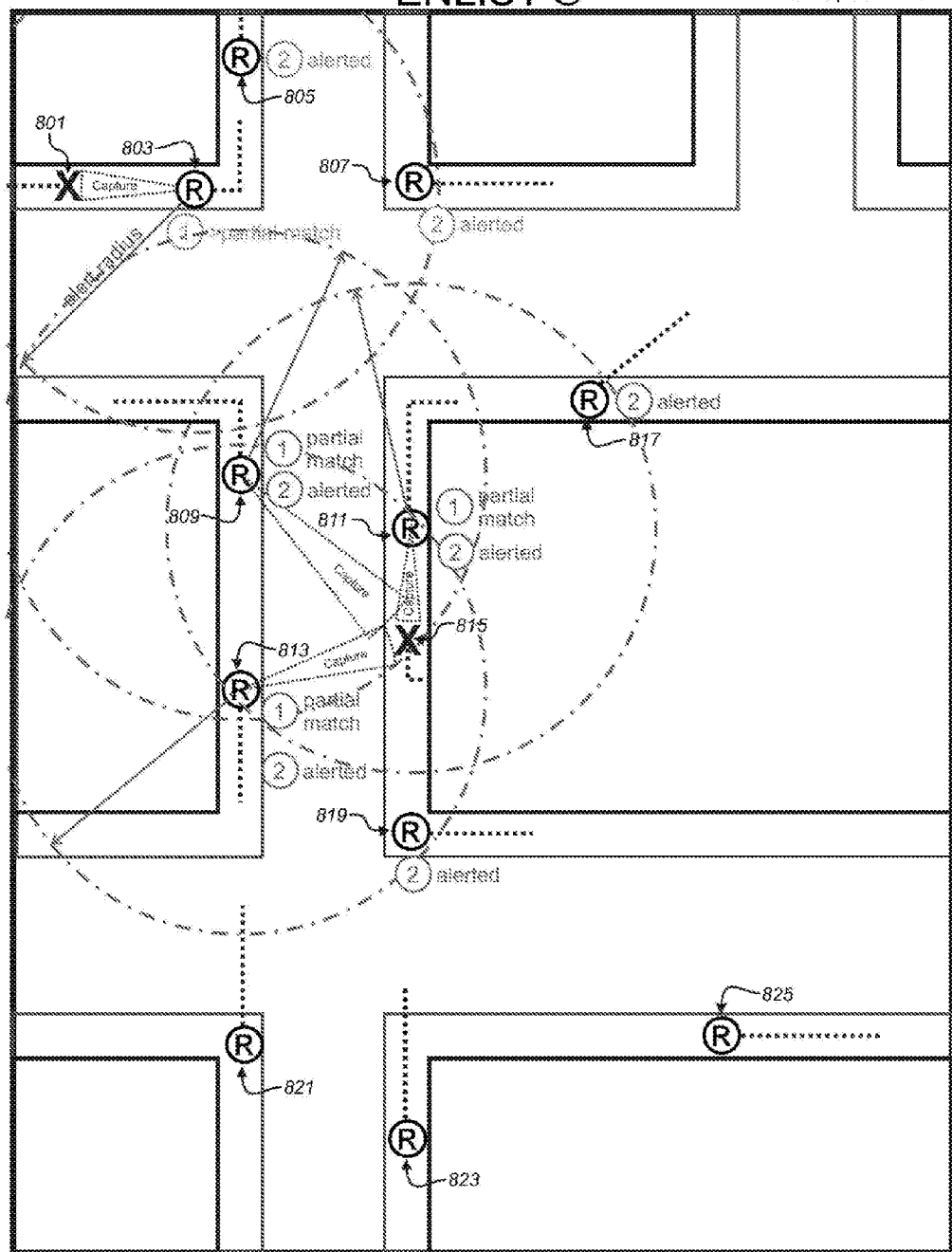
FIG. 16 is a diagram illustrating another example of a computer implemented identification process in accordance with an embodiment of the invention.

Referring to FIG. 16, there is shown an example situation, which is a streetscape with various participants 803, 805, 807, 809, 811, 813, 817, 819, 821, 823 and 825 and non-participants 801 and 815 present.

Participants may act as detector nodes and/or (mobile) repeater stations—respectively, facilitating detection of non-participants and assisting to relay any alert notices or other relevant data to other participants. The mechanism of action may resemble (signal) propagation. [In the figure, 'R' may equate to a 'registered' status.]

In the first instance, 803 captures a greater than partial match of a non-participating device, machine or robot 801. This match percentage value is deemed significant enough to warrant an alert be transmitted (in) directly to nearby participants 805 and 807, which both are positioned with the alert radius.

In another instance, multiple participants 809, 811 and 813 capture only partial matches of a non-participating device, machine or robot 815. Individually these partial matches may not be enough to elicit an alert be distributed, however considering there are multiple, these matches synergistically equate to a percentage value deemed significant enough to warrant an alert be transmitted (in) directly to nearby participants 819 and 817, which both are positioned within the alert radius; further, original detectors 809, 811 and 813 would similarly be alerted, advising them that, yes, their partial matches were relevant.

Meanwhile, participants 821, 823 and 825, since outside any alert radius or positioned away from any non-participant, have not been involved in any of the above instances.

Advantages

One of the advantages of the embodiments and broader invention described herein is that the invention removes the onus or control from consumers (i.e. owners of the robots) to assume full responsibility for the actions of the robots at any given time. So long as the commands are filtered or processed through a central server system, then illegal, immoral or accidental use of autonomous and robotic devices is greatly reduced.

If robots were unrestricted in their activities (operations or functions), were able to venture into particular spaces unhindered (with or without explicit instructions or control from the user), then this would cause or provoke contentious issues—some of which include, privacy, safety, security, liability, technical and ethical issues. Therefore, the system provides a mechanism and framework by which robots and/or their controllers are required to obtain the relevant clearance before an operation is allowed, particularly if that operation is to occur in a public space.

Moreover, as consumers are required to register and identify themselves, the system provides an ability to monitor, control or manage the actions or activities of consumers, in so far as it is related to their robot use. This reflects society's general interest in requiring people to obtain licenses to drive cars, pilot aircraft or own and use firearms.

That is, there is a public interest in preventing users from allowing their robots to be used by unapproved users, or from having their robots unknowingly used by unapproved users. Such robots may possess the capacity and capabilities to perform restricted (e.g. dangerous) functions. These occurrences would first and foremost present safety issues, e.g. robots (owned by parents) being used by underage children that are not listed as or approved to be registered users.

As a corollary, there are fewer onuses on robot and autonomous system providers for being responsible for facilitating vital robot updates. Instead, all updates would be processed by and issued from the system described herein, irrespective of the robot's origin of manufacture, country or space of operation. This ameliorates the legal liability of robot and autonomous system providers.

Advantages of the embodiments described herein where the embodiment is fulfilled by a separate device to the robot or by a remote server include:

(1) potential for the robot to have more frequent communication with an external regulating server (e.g. providing a greater assurance or security level of third party regulation or supervision);

(2) potential for a remote server to process or facilitate remote diagnostic services; and (3) more frequent receipt by the robot of software, updates and/or flashes from the remote server.

Further advantages of a user and/or the user's 'smart' device or robot pendant communicating indirectly, or not at all, with the robot, e.g. via the remote server, include no 'lost in translation' events as the remote server (Robot Registry) receives proposed commands or operation requests, directly from the source, i.e. the user or the user's device. In other words, the remote server acts as an intermediary between the user (or their device) and the robot.

Disclaimers

Throughout this specification, unless the context requires otherwise, the word "comprise" or variations such as "comprises" or "comprising", will be understood to imply the inclusion of a stated integer or group of integers but not the exclusion of any other inte.g.er or group of integers.

Those skilled in the art will appreciate that the invention described herein is susceptible to variations and modifications other than those specifically described. The invention includes all such variation and modifications. The invention also includes all of the steps, features, formulations and compounds referred to or indicated in the specification, individually or collectively and any and all combinations or any two or more of the steps or features.

Other definitions for selected terms used herein may be found within the detailed description of the invention and apply throughout. Unless otherwise defined, all other scientific and technical terms used herein have the same meaning as commonly understood to one of ordinary skill in the art to which the invention belongs.

Although not required, the embodiments described with reference to the method, computer program, data signal and aspects of the system can be implemented via an application programming interface (API), an application development kit (ADK) or as a series of program libraries, for use by a developer, for the creation of software applications which are to be used on any one or more computing platforms or devices, such as a terminal or personal computer operating system or a portable computing device, such as a smartphone or a tablet computing system operating system, or within a larger server structure, such as a 'data farm' or within a larger transaction processing system.

Generally, as program modules include routines, programs, objects, components and data files that perform or assist in the performance of particular functions, it will be understood that the functionality of the software application may be distributed across a number of routines, programs, objects or components to achieve the same functionality as the embodiment and the broader invention claimed herein. Such variations and modifications are within the purview of those skilled in the art.

It will also be appreciated that where methods and systems of the present invention and/or embodiments are implemented by computing systems or partly implemented by computing systems then any appropriate computing system architecture may be utilised. This includes standalone computers, network computers and dedicated computing devices (such as field-programmable gate arrays).

Where the terms "computer", "computing system" and "computing device" are used in the specification, these terms are intended to cover any appropriate arrangement of computer hardware for implementing the inventive concept and/or embodiments described herein.

Where the terms "robotic device", "autonomous device" and "smart device" are used in the specification, these terms are intended to cover any appropriate device which is capable of receiving a command and utilising the command to perform a function, which may be either a "physical" function (i.e. movement) or a "virtual" function (e.g. interact with another device via electronic commands).

Where reference is made to communication standards, methods and/or systems, robots or devices may transmit and receive data via a variety of forms: 3G, 4G (CDMA/GSM), Wi-Fi, Bluetooth, other radio frequency, optical, acoustic, magnetic, GPS/GPRS, or any other form or method of communication that may become available from time to time.

The invention claimed is:

1. A system comprising a computing device in communication with and remote to a robotic device, the computing device arranged to receive:
   a command from a command module remote to the computing device, the command containing at least one instruction which is arranged to, when executed by the robotic device, effect an operation on the robotic device, and
   identification information identifying at least one characteristic of the robotic device, user or the environment in which the robotic device operates,
   wherein the computing device includes a processor and a database, the processor being arranged to receive the command and the identification information and review the command and the identification information against information in the database to determine whether the command is associated with the identification information in the database and is suitable for execution by the robotic device,
   wherein the command is provided to the robotic device only if the command is suitable for execution.

2. The system in accordance with claim 1, wherein the processor determines whether the command is associated with an authorisation code.

3. The system in accordance with claim 2, wherein the authorisation code may be received independently of the command.

4. The system in accordance with claim 1, wherein the processor determines whether the command is one of a predetermined set of suitable commands by assessing a set of predetermined suitable commands stored in the database.

5. The system in accordance with claim 2, wherein the predetermined set of suitable commands is determined according to the authorisation code.

6. The system in accordance with claim 1, wherein the authorisation code is derived from the identification information.

7. The system in accordance with claim 2, wherein at least one of the command, the authorisation code and the identification information is encrypted.

8. The system in accordance with claim 7, comprising the further step of decrypting the at least one of the command, the authorisation code and the identification information prior to reviewing the command to determine whether the command is suitable for execution.

9. The system in accordance with claim 2, wherein at least one of the command, the authorisation code and the identification information includes a check, wherein the check is utilised to determine the correctness of the command, the authorisation code and/or the identification information.

10. A system in accordance with claim 1, wherein the robotic device is a vehicle configured to move in a public space.

11. A method for controlling a robotic device, the method comprising the steps of:
    receiving at a computing device, remote to the robotic device and a command module, at least one command from the command module, the command containing at least one instruction which is arranged to, when executed by the robotic device, effect an operation on the robotic device, receiving at the computing device identification information identifying at least one characteristic of the robotic device, user or the environment in which the robotic device operates, and reviewing the command and the identification information via a processor of the computing device against information in a database to determine whether the command is associated with the identification information in the database and is suitable for execution by the robotic device, wherein the command is provided to the robotic device only if the command is suitable for execution.

12. The method in accordance with claim 11, wherein the step of reviewing the command includes the step of determining whether the command is associated with at least one authorisation code.

13. The method in accordance with claim 12, wherein the at least one authorisation code is received independently of the at least one command.

14. The method in accordance with claim 11, wherein the step of reviewing the command includes the further step of determining whether the command is one of a predetermined set of commands.

15. The method in accordance with claim 11, wherein identification information comprises at least one identification code arranged to identify the user or the robotic device.

16. The method in accordance with claim 11, wherein the identification information is received with the command.

17. The method in accordance with claim 11, wherein at least one of the command, the authorisation code and the identification information is encrypted.

18. The method in accordance with claim 17, comprising the further step of decrypting the at least one of the command, the authorisation code and the identification information prior to reviewing the command to determine whether the command is suitable for execution.

19. The method in accordance with claim 12, wherein at least one of the command, the at least one authorisation code and the identification information includes a check, wherein the check is utilised to determine the correctness of the at least one command, the authorisation code or the identification code.

20. A computer readable medium storing a computer program, which, when executed on a computing device, controls a robotic device by performing the steps of receiving at a computing device, remote to the robotic device and a command module, at least one command from the command module, the command containing at least one instruction which is arranged to, when executed by the robotic device, effect an operation on the robotic device, receiving, at the computing device identification information identifying at least one characteristic of the robotic device, user or the environment in which the robotic device operates, and reviewing the command and the identification information via a processor of the computing device against information in a database to determine whether the command is associated with the identification information in the database and is suitable for execution by the robotic device, wherein the command is provided to the robotic device only if the command is suitable for execution.

21. A system in accordance with claim 1, comprising a check module arranged to perform a functionality check on the robotic device prior to the command being provided to the robotic device.

22. A system in accordance with claim 21, wherein the system is arranged to receive diagnostic information from the robotic device if the robotic device is incapable of carrying out the command.

23. A system in accordance with claim 22, wherein the processor receives the diagnostic information and reviews the diagnostic information against information in the database to determine whether a subsequent command is suitable for execution by the robotic device, wherein the processor requests further information to further assess an instruction, prior to initiating a response, and wherein the subsequent command is provided to the robotic device if the subsequent command is determined to be suitable for execution.

24. A system in accordance with claim 1, wherein the robotic device includes at least one processor arranged to receive and execute the at least one command.

25. A system in accordance with claim 1, wherein the robotic device is configured to perform at least one physical function.

26. A method in accordance with claim 11 wherein the robotic device is a programmable device.

27. A method in accordance with claim 11, wherein the robotic device includes at least one processor arranged to receive and execute the at least one command.

28. A method in accordance with claim 11, wherein the robotic device is capable of performing at least one physical function.

* * * * *